United States Patent [19]
Taki

[11] Patent Number: 5,404,345
[45] Date of Patent: Apr. 4, 1995

[54] OPTICAL RECORDING MEDIUM AND TRACKING SERVO CIRCUIT ADAPTED THEREFOR USING WOBBLED PITS

[75] Inventor: Kazunari Taki, Nagoya, Japan

[73] Assignee: Brother Kogyo Kabushiki Kaisha, Nagoya, Japan

[21] Appl. No.: 235,135

[22] Filed: Apr. 28, 1994

Related U.S. Application Data

[63] Continuation of Ser. No. 894,856, Jun. 5, 1992, abandoned.

[30] Foreign Application Priority Data

| Jun. 7, 1991 | [JP] | Japan | 3-136612 |
| Jun. 7, 1991 | [JP] | Japan | 3-136613 |
| Jun. 7, 1991 | [JP] | Japan | 3-136614 |
| Jun. 7, 1991 | [JP] | Japan | 3-136615 |
| Jun. 7, 1991 | [JP] | Japan | 3-136616 |
| Feb. 18, 1992 | [JP] | Japan | 4-030914 |

[51] Int. Cl.⁶ .............................. G11B 7/00
[52] U.S. Cl. .............................. 369/44.26; 369/44.34; 369/275.3; 369/275.4
[58] Field of Search ............. 369/44.26, 44.34, 275.3, 369/275.4, 275.5, 275.1, 44.27, 44.28

[56] References Cited

U.S. PATENT DOCUMENTS

| 4,020,278 | 4/1977 | Carré et al. | 369/275.3 |
| 4,288,510 | 9/1981 | Tinet et al. | 369/275.4 |
| 4,385,303 | 5/1983 | Akahira et al. | 369/275.4 |
| 4,779,253 | 10/1988 | Getreuer et al. | 369/44.26 |
| 5,034,940 | 6/1991 | Saito et al. | 369/44.34 |
| 5,063,546 | 11/1991 | Ito et al. | 369/44.26 |
| 5,095,478 | 3/1992 | Taki et al. | 369/275.5 |

FOREIGN PATENT DOCUMENTS

| 3833314 | 4/1990 | Germany | 369/44.26 |
| 63-300445 | 12/1988 | Japan | 369/44.26 |
| 64-35787 | 2/1989 | Japan . | |

Primary Examiner—W. R. Young
Assistant Examiner—P. W. Huber
Attorney, Agent, or Firm—Oliff & Berridge

[57] ABSTRACT

In an optical recording medium of the present invention, a plurality of tracks each extending in a first direction are arranged in a second direction which is different from the first direction in such a manner that the plurality of tracks are apart from one another along the second direction with a track-track between area being formed between each two tracks adjacent to each other. In the optical recording medium, at least one wobbling pit is formed in a track-track between area positioned between each two tracks. The wobbling pit is adapted for tracking operations for both the each two adjacent tracks. In order to discriminate between one track and the other track of the each two adjacent tracks, the optical recording medium is provided with a disrcimination pit, or the wobbling pits are arranged so that the number, position or dimension of the wobbling pit provided on a track-track between area may be changed.

32 Claims, 33 Drawing Sheets

FIG. 5
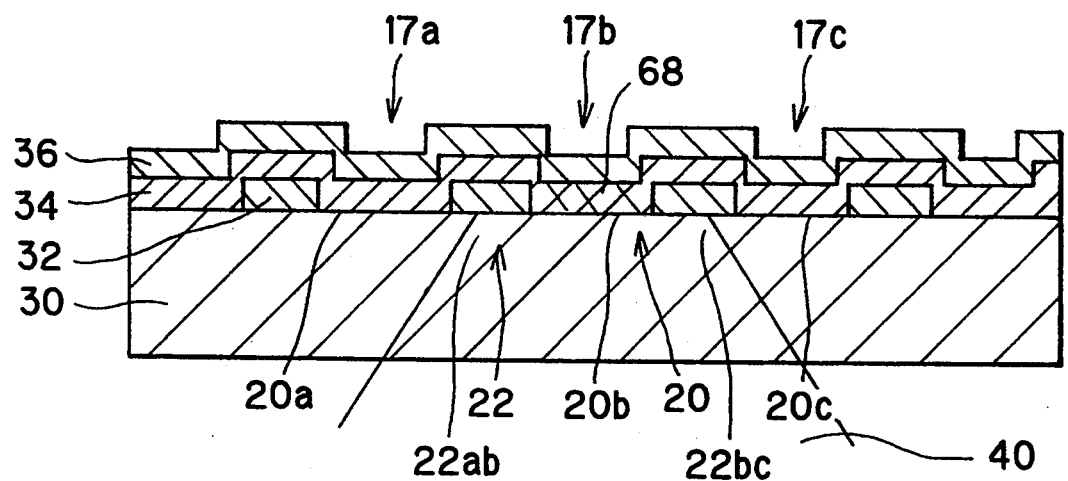
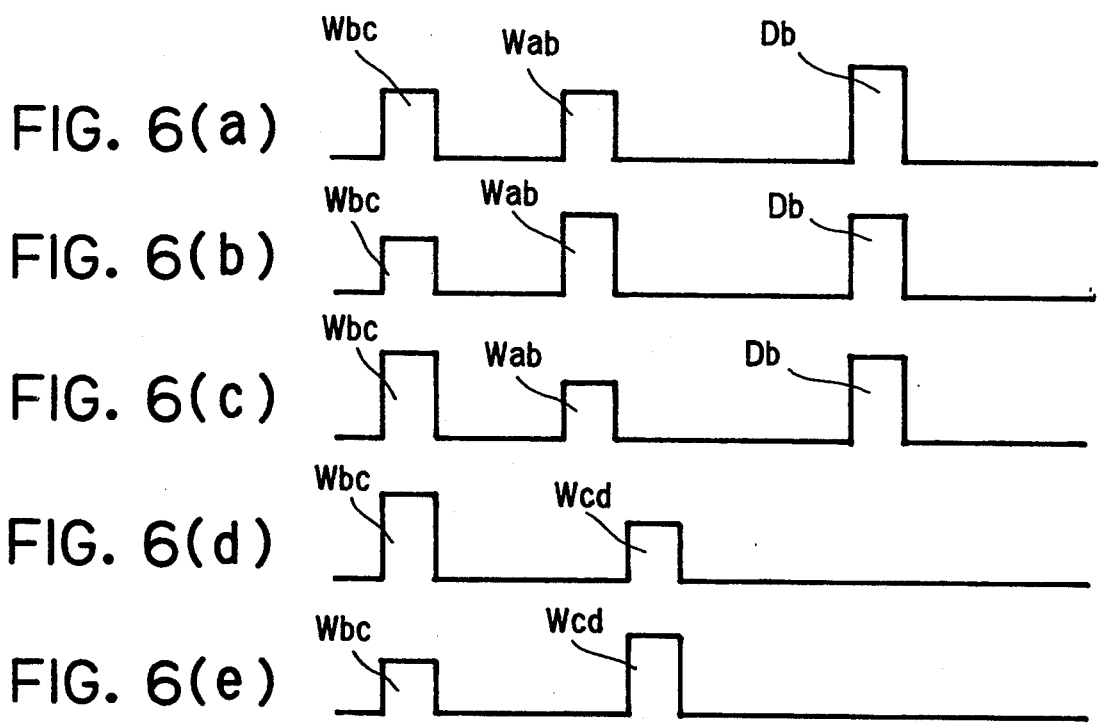

FIG. 23
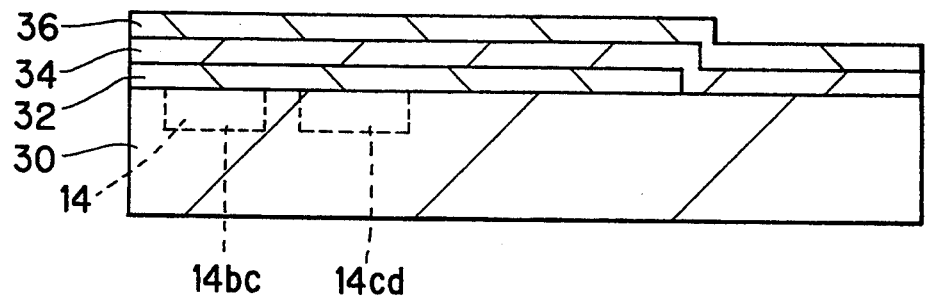
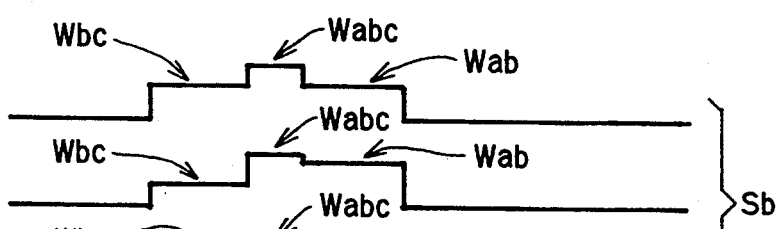
FIG. 24(a)
FIG. 24(b)
FIG. 24(c)
FIG. 24(d)
FIG. 24(e)
FIG. 24(f)

OPTICAL RECORDING MEDIUM AND TRACKING SERVO CIRCUIT ADAPTED THEREFOR USING WOBBLED PITS

This is a continuation of application Ser. No. 07/894,856, filed Jun. 5, 1992, now abandoned.

BACKGROUND OF THE INVENTION

1. Field of the Invention

The present invention relates to an optical recording medium for optically recording, reproducing or erasing information therein. Specifically, the present invention relates to an optical recording medium which is capable of performing a high density recording operation and a tracking servo circuit adapted for tracking operation of the optical recording medium.

2. Description of Related Art

Conventionally, there are proposed not only an optical recording medium of a type in which a tracking servo guide groove is formed on a substrate thereof for realizing a push-pull type tracking operation, but also an optical recording medium of a type in which wobbling pits are formed on a substrate thereof for realizing a sample-servo type tracking operation.

An essential part of one example of a conventional optical recording medium of the sample-servo tracking type is shown in FIG. 1. The conventional sample-servo tracking type optical recording medium 1000 includes a disk-shaped substrate in which tracks 1002 are formed in concentrical or spiral fashion around a center point (not shown in FIG. 1) of the disk-shaped substrate. It is noted that the center point of the disk-shaped substrate is positioned downwardly of the tracks 1002 in FIG. 1. In other words, upward direction in FIG. 1 indicate radially outwardly extending direction of the disk-shaped substrate.

The optical recording medium 1000 has a plurality of sector areas 1010, each sector area 1010 consisting of a servo area 1006 adapted for a tracking servo operation and a data area 1009 adapted for a data recording operation. In the servo area 1006, there are formed a pair of wobbling pits 1004 and 1004′ which are arranged in a wobbling fashion along each track 1002. More specifically to say, a wobbling pit 1004a is formed radially outwardly of one track 1002a with a distance between the wobbling pit and the track having a predetermined value. The wobbling pit 1004′a is formed radially inwardly of the track 1002a. A distance between the wobbling pit 1004′a and the track 1002a is equal to the distance between the wobbling pit 1004a and the track 1002a. The wobbling pits 1004a and 1004′a are apart from each other in a track extending direction. Each of the wobbling pits 1004a and 1004′a includes a concave or convex portion formed on a substrate of the optical recording medium on which a recording layer and a protective layer are laminated. In the data area 1009, a recording bit is formed, so that an information is recorded. It should be further noted that an address pit for supplying an address information and a clock pit for supplying a clock information are also formed in the servo area 1006, though those pits are not expressly shown in FIG. 1.

The sample-servo type tracking operation achieved by the above-described optical recording medium 1000 will be described below.

The optical recording medium 1000 is rotated so that laser beam spot 1001 irradiated on the optical recording medium 1000 is moved relatively with respect to the recording medium 1000 along the track extending direction in a rightward direction in FIG. 1. The laser beam is reflected by the optical recording medium, and an intensity of the reflected laser beam is detected by a photo-detecting unit of a sample-servo tracking circuit (not shown in the drawing). In the case where the laser beam spot 1001 is irradiated on the recording medium 1000 at a portion where no wobbling pit is formed, the intensity of the laser beam reflected from the recording medium is at a predetermined level (which will be referred to as a "background level", hereinafter). When the photo-detecting unit detects that the intensity of the reflected light is the background level, it therefore outputs a signal reprsenting the background level. In the case where the laser beam spot is irradiated onto the wobbling pit 1004 or 1004′, however, since the laser beam is diffracted by the wobbling pit, the intensity of the reflected laser beam is decreased from the background level. When the photo-detecting unit detects that the intensity of the reflected light is decreased from the background level, the photo-detecting unit generates a signal representing the amount with which the intensity of the reflected laser beam is decreased from the background level. (The signal generated by the photo-detecting unit will be referred to as a "intensity decreased amount representing signal", hereinafter.) Accordingly, in the case where the laser beam spot 1001 is moved along the track 1002a for the tracking operation with respect to the track 1002a, the photo-detecting unit generates the intensity decreased amount representing signals, at the time when the laser beam spot 1001 reaches the wobbling pits 1004a and 1004′a. In the case where the laser beam spot 1001 is moved exactly on the track 1002a, the intensity decreased amount signals 1020 and 1021 generated at the timings when the laser beam spot 1001 reaches the wobbling pits 1004a and 1004′a have values which are equal to each other, as shown in FIG. 2(a). In the case where the laser beam spot 1001 is moved along a line which is positioned radially outwardly of the track 1002a, i.e., along a line positioned above the track 1002a in FIG. 1, the value of the signal 1020 generated at the timing when the laser beam spot 1001 reaches the wobbling bit 1004a becomes larger than that of the signal 1021 generated at the timing when the laser beam spot reaches the wobbling bit 1004′a, as shown in FIG. 2(b). On the other hand, in the case where the laser beam spot 1001 is moved along a line positioned radially inwardly of the track 1002a, i.e., along a line positioned below the track 1002a in FIG. 1, the value of the signal 1020 becomes lower than that of the signal 1021, as shown in FIG. 2(c).

In the sample-servo tracking circuit (not shown in the drawing), the signals 1020 and 1021 generated from the photo-detecting unit are sampled and held in a sample-and-hold circuit and are supplied to a differential amplifier. The differential amplifier outputs a differential signal representing a difference between the values of the signals 1020 and 1021. The differential signal outputted from the differential amplifier serves as a tracking error signal representing a shift amount of the laser beam spot from the track. A tracking servo motor is controlled in accordance with the differential signal outputted from the differential amplifier, so that a value of the differential signal may become zero, to thereby allow the laser beam spot 1001 to be moved exactly on the track 1002a.

When the laser beam spot 1001 is irradiated onto the servo area 1006 of the optical recording medium, the above-described sample-servo tracking operation is achieved so that the tracking servo motor may be controlled into such a condition as for allowing the laser beam spot 1001 to be moved exactly along the track 1002. When the laser beam spot 1001 is irradiated onto the data area 1009, data processing operation (i.e., data recording operation, data reproducing operation, and data erasing operation, etc.) is achieved, while the condition of the servo tracking motor obtained through the tracking operation in the servo area 1006 is maintained to be fixed to that which has been controlled through the tracking operation in the servo area 1006.

The sample-servo tracking operation and the data processing operation are conducted for each sector area 1010 of the optical recording medium, so that the data processing operation can be properly achieved in the data area 1009 with the laser beam being maintained to be moved exactly along the track.

In the case where a track pitch, i.e., a distance between each two adjacent tracks is lowered to enhance the recording density, however, a wobbling pit 1004b provided for a track 1002b which is positioned next to the track 1002a inadvertantly affects the wobbling pit 1004a. More specifically to say, as shown in FIG. 1, the wobbling pit 1004'a is formed at a position which is placed radially inwardlly of the track 1002a and is apart from the track with a predetermined distance. The wobbling pit 1004'a serves to cooperate witch the wobbling pit 1004a to achieve a tracking operation with respect to the track 1002a, as described above. The wobbling pit 1004b is formed at a position which is placed radially outwardly of the track 1002b which is placed in a radially inner side with respect to the track 1002a and is next thereto. The distance between the wobbling pit 1004b and the track 1002b is equal to the distance between the wobbling pit 1004'a and the track 1002a. The wobbling pit 1004b serves to cooperate with a wobbling pit 1004'b to achieve a tracking operation with respect to the track 1002b. The wobbling pits 1004'a and 1004b are apart from each other along a radial direction of the disk-shaped optical recording medium with a distance which is smaller than the distance between the tracks 1002a and 1002b. In the case where the track pitch is small, therefore, the laser beam spot 1001 irradiated on the track 1002a for performing a tracking operation with respect to the track 1002a is liable to be erronesouly partly irradiated onto the wobbling pit 1004b. Such a partly irradiation of the laser beam onto the wobbling pit 1004b affects the intensity of the laser beam reflected from the optical recording medium, as a result of which the value of the signal 1020 is erroneously shifted from its correct value which will be obtained in the case where the laser beam spot is irradiated only onto the wobbling pit 1004a. The tracking error signal obtained based on the signal 1020 thus affected by the wobbling pit 1004b fails to correctly represent the shifted amount of the laser beam spot 1001 from the track 1002a. Accordingly, the tracking operation is improperly achieved, and the data processing operation is erroneously achieved with the laser beam spot 1001 being shifted from the track.

SUMMARY OF THE INVENTION

In view of the aforesaid problems, it is an object of the present invention to provide an optical recording medium and a tracking servo circuit which are capable of attaining a reliable tracking operation and which can avoid cross-talk involvement even in a case of high tracking density arrangement for the optical recording medium.

To achieve the above object, there is provided an optical recording medium in which a plurality of tracks extending along a first direction are arranged in a second direction which is different from the first direction. The plurality of tracks are apart from one another along the second direction so that an area is formed between each two tracks which are arranged adjacent to each other. The area will be referred to as a "track-track between area", hereinafter. According to the present invention, at least one wobbling pit is formed at the track-track between area positioned between each two adjacent tracks, the wobbling pit being adapted for tracking operations for both the each two adjacent tracks. In other words, wobbling pits formed on each two track-track between areas which are positioned adjacent to each other with a track sandwiched therebetween are adapted for a tracking operation of the track.

The optical recording medium of the present invention is further provided with discrimination means for discriminationg between one track and the other track of each two adjacent tracks.

The discrimination means may preferably include a discrimination pit formed on one of the each two adjacent tracks. More specifically to say, in the optical recording medium of the present invention, the discrimination pit may be formed on every other track.

The discrimination means for discriminating between one track and the other track of each two adjacent tracks preferably includes means for arranging the wobbling pits such that the number of the wobbling pits formed on two track-track between areas which are arranged adjacent to each other with one track of the each two adjacent tracks sandwiched therebetween is different from the number of the wobbling pits formed on two track-track between areas which are arranged adjacent to each other with the other track of the each two adjacent tracks sandwiched therebetween. More specifically to say, the number of the wobbling pits formed on a track-track between area is preferably changed at every two track-track between areas.

The discrimination means for discriminating between one track and the other track of each two adjacent tracks preferably includes means for arranging the wobbling pits such that a positional relationship in the first direction between a wobbling pit formed on one track-track between area and a wobbling pit formed on another track-track between area which are arranged adjacent to each other with one track of the each two adjacent tracks sandwiched therebetween is different from a positional relationship in the first direction between a wobbling pit formed on one track-track between area and a wobbling pit formed on another track-track between area which are arranged adjacent to each other with the other track of the each two adjacent tracks sandwiched therebetween. More specifically, the wobbling pits are preferably arranged so that a positional relationship in the first direction between a wobbling pit formed on each track-track between area and a wobbling pit formed on a track-track between area which is adjacent to the each track-track between area with a track sandwiched therebetween is different from a positional relationship in the first direction between the wobbling pit formed on the each track-track between area and a wobbling pit formed on another track-track between area which is adjacent to the each track-track between area with another track sandwiched therebetween.

The discrimination means for discriminating between one track and the other track of each two adjacent tracks preferably includes means for arranging the wobbling pits such that a dimensional relationship in the first direction between a wobbling pit formed on one track-track between area and a wobbling pit formed on another track-track between area which are arranged adjacent to each other with one track of the each two adjacent tracks sandwiched therebetween is different from a dimensional relationship in the first direction between a wobbling pit formed on one track-track between area and a wobbling pit formed on another track-track between area which are arranged adjacent to each other with the other track of the each two adjacent tracks sandwiched therebetween. More specifically, the wobbling pits are preferably arranged so that a dimensional relationship in the first direction between a wobbling pit formed on each track-track between area and a wobbling pit formed on a track-track between area which is adjacent to the each track-track between area with a track sandwiched therebetween is different from a dimensional relationship in the first direction between the wobbling pit formed on the each track-track between area and a wobbling pit formed on another track-track between area which is adjacent to the each track-track between area with another track sandwiched therebetween.

The optical recording medium further includes a substrate and a recording layer formed on the substrate for recording data therein, and the wobbling pit preferably includes a concave portion formed on the substrate. The discrimination pit preferably includes a concave portion formed on the substrate. The wobbling pit may preferably include a light reflecting material formed on the substrate. The discrimination pit may include a light reflecting material formed on the substrate. The optical recording medium may further includes a metal film formed between the substrate and the recording layer at least in a part of each track-track between area for preventing data from being recorded in the recording layer at the part of each track-track between area.

The optical recording medium further includes a layer of material with a high heat capacity formed on the recording layer at least in a part of each track-track between area for preventing data from being recorded in the recording layer at the part of each track-track between area.

In the case where the recording layer can transmit light therethrough, the optical recording medium is preferably provided with a reflective layer on the recording layer for reflecting light which has transmitted through the recording layer. The reflective layer preferably has a low reflectivity at least in a part of each track-track between area for preventing data from being reproduced from the recording layer at the part of each track-track between area.

The recording layer may have a heat-treated non-recording area at least in a part of each track-track between area for preventing data from being recorded in the recording layer at the part of each track-track between area.

The substrate may be formed with a groove in each track-track between area, the groove extending in the first direction.

According to another aspect of the present invention, the present invention provides a tracking servo circuit for generating a tracking error signal representing a tracking error state with respect to a track formed on an optical recording medium. The optical recording medium has: a plurality of tracks each extending in a first direction which are arranged in a second direction which is different from the first direction in such a manner that the plurality of tracks are apart from one another along the second direction with a track-track between area being formed between each two tracks adjacent to each other; at least one wobbling pit formed in a track-track between area positioned between each two tracks, the wobbling pit being adapted for tracking operations for both the each two adjacent tracks; and discrimination means for discriminating between one track and the other one track of the each two adjacent tracks. The tracking servo circuit of the present invention includes: wobbling pit detecting means for detecting wobbling pits formed on two adjacent track-track between areas which are positioned to sandwich therebetween a track, to thereby generate signals representing the wobbling pits; calculating means for calculating a difference signal representing a difference between values of the signals; discrimination detecting means for detecting, the discrimination means provided in the optical recording medium; and polarity changing means for changing a polarity of a value of the difference signal, based on the detected result of said discrimination detecting means, to thereby generate the tracking error signal representing a tracking error state with respect to the track.

In the case where the discrimination means of the optical recording medium includes a discrimination pit formed on one of the each two adjacent tracks, the discrimination detecting means of the tracking servo circuit detects whether or not the track is formed with the discrimination pit.

In the case where the number of the wobbling pits formed on a track-track between area is changed at every two track-track between areas of the optical recording medium, the discrimination detecting means of the tracking servo circuit detects the number of the signals generated by said wobbling pit detecting means.

In the case where the wobbling pits are arranged so that at least one of dimensional relationship and positional relationship in the first direction between a wobbling pit formed on each track-track between area and a wobbling pit formed on a track-track between area which is adjacent to the each track-track between area with a track sandwiched therebetween is different from at least one of dimensional relationship and positional relationship in the first direction between the wobbling pit formed on the each track-track between area and a wobbling pit formed on another track-track between area which is adjacent to the each track-track between area with another track sandwiched therebetween, the discrimination detecting means of the tracking servo circuit detects a wave form of the signals generated by said wobbling pit detecting means.

In this case, the discrimination detecting means preferably detects whether or not the values of the signals generated by said wobbling pit detecting means reaches a background level.

Other objects, features and advantages of the present invention will become apparent in the following specification and accompanying drawings.

BRIEF DESCRIPTION OF THE ACCOMPANYING DRAWINGS

FIG. 1 is a plan view of a conventional optical recording medium of a tracking servo type;

FIGS. 2(a) through 2(c) illustrate intensity decreased amount representing signals generated based on the wobbling pits formed on the conventional optical recording medium;

FIG. 5 is a cross-sectional view of the optical recording medium 10 (11. 21) taken along a line L5—L5 of FIGS. 3, 14 and 22;

Figure 7:
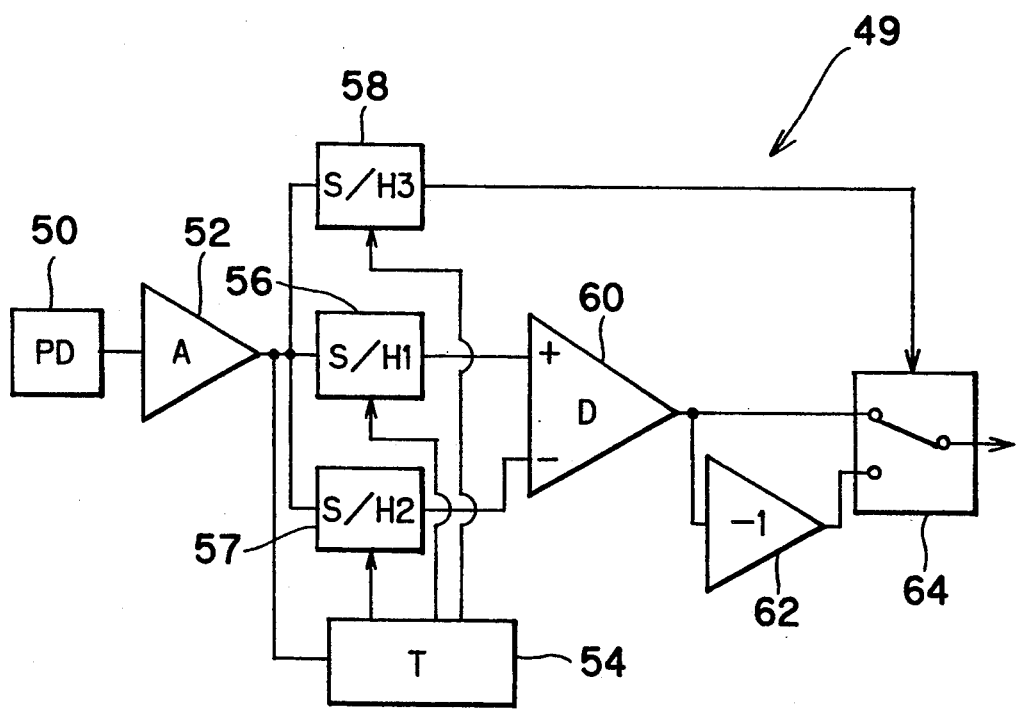
Figure 8:
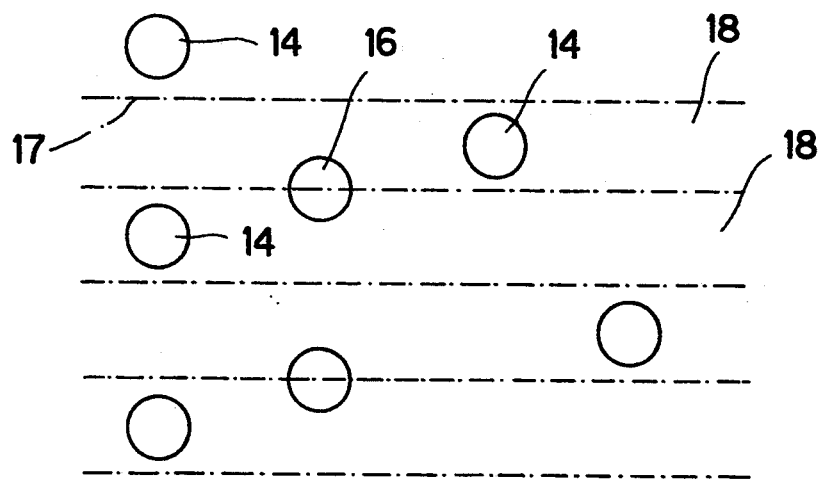
Figure 9:
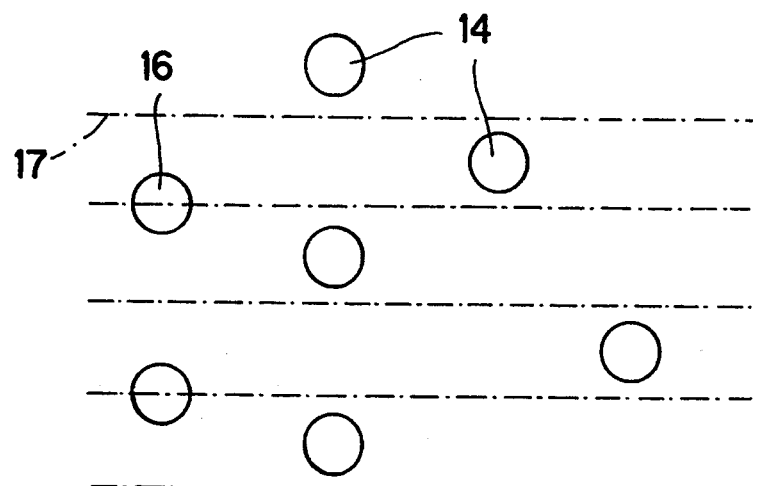
Figure 10:
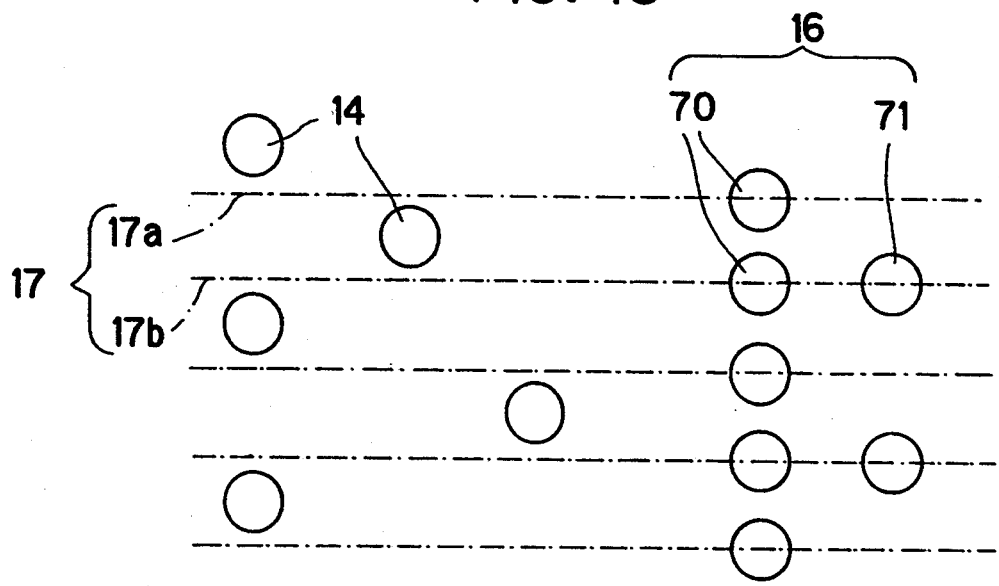
Figure 11:
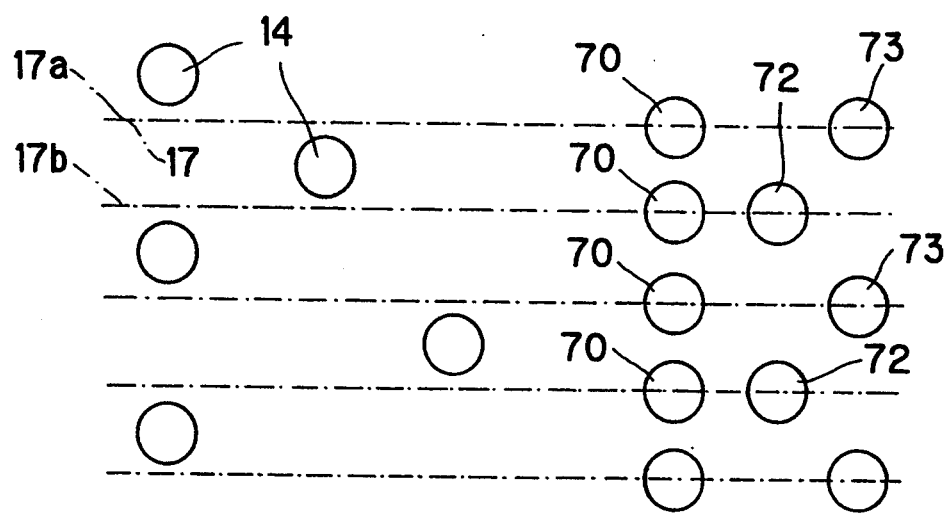
Figure 12:
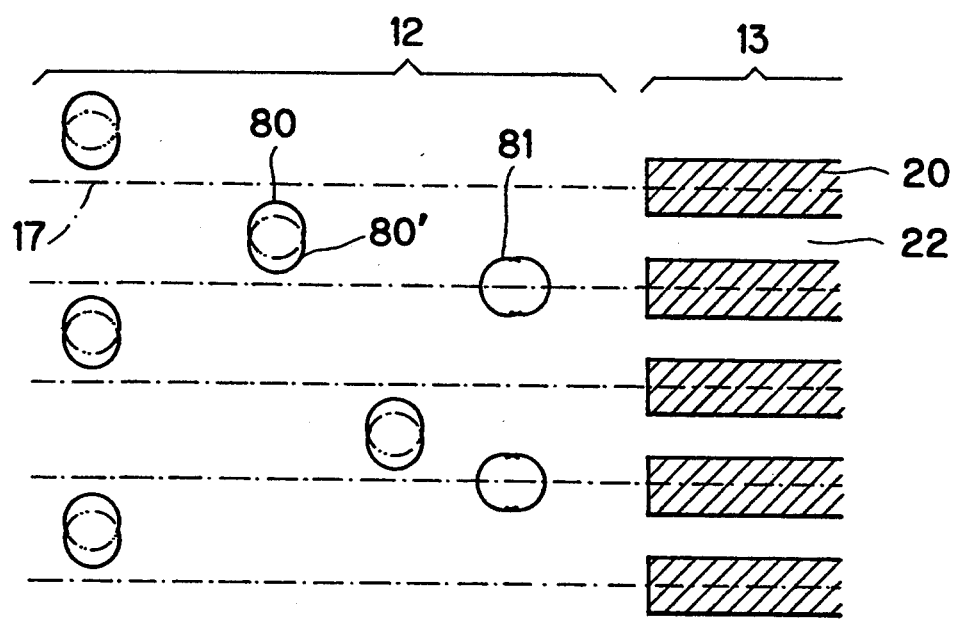
Figure 13:
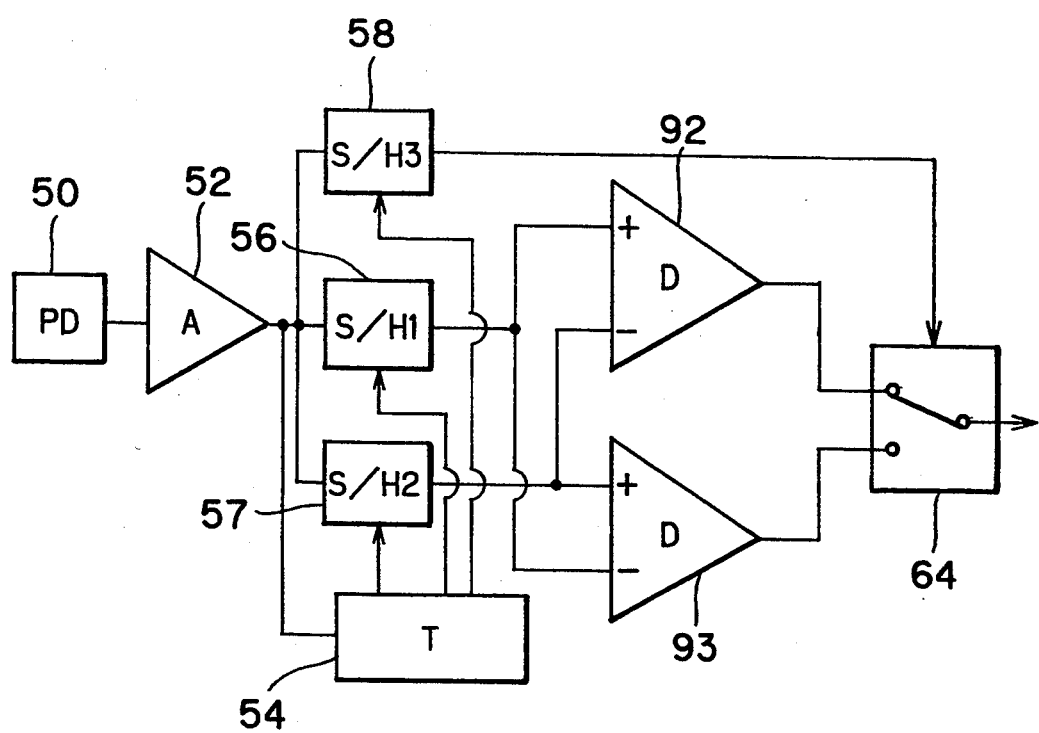
Figure 14:
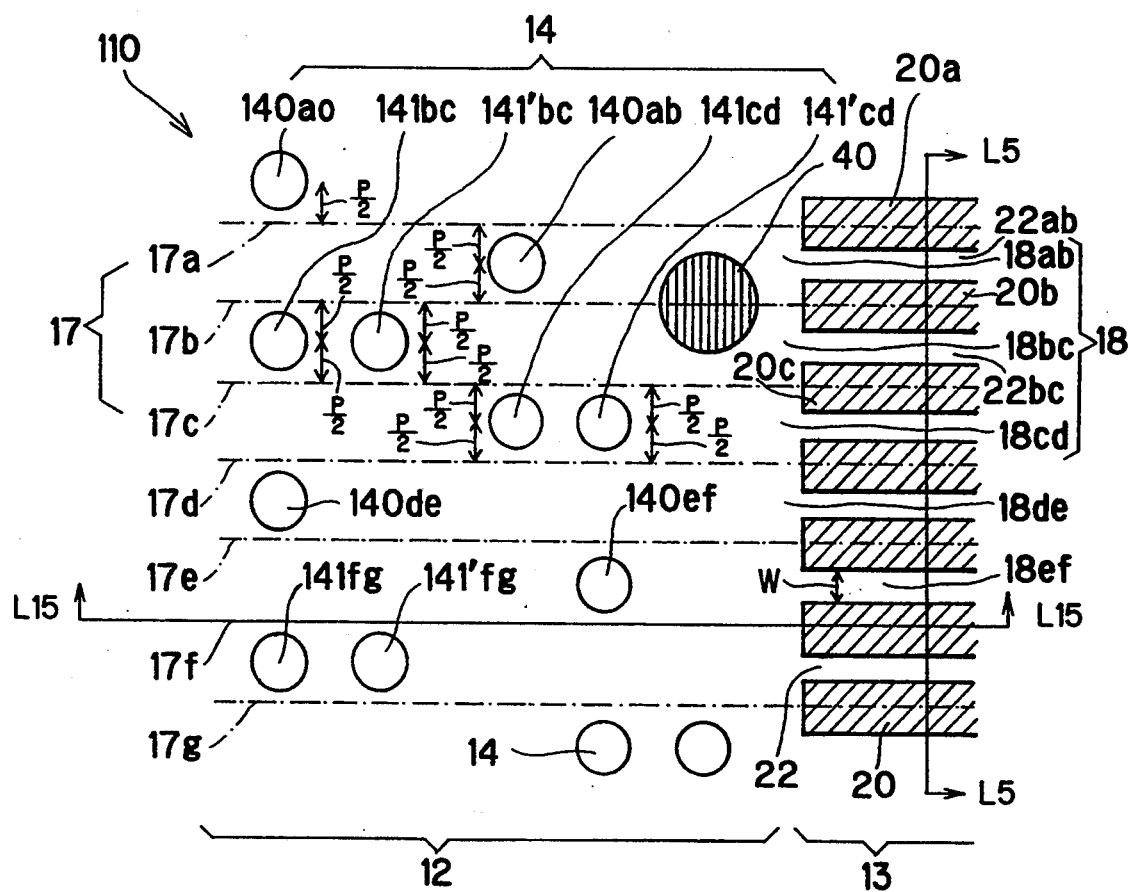
Figure 15:
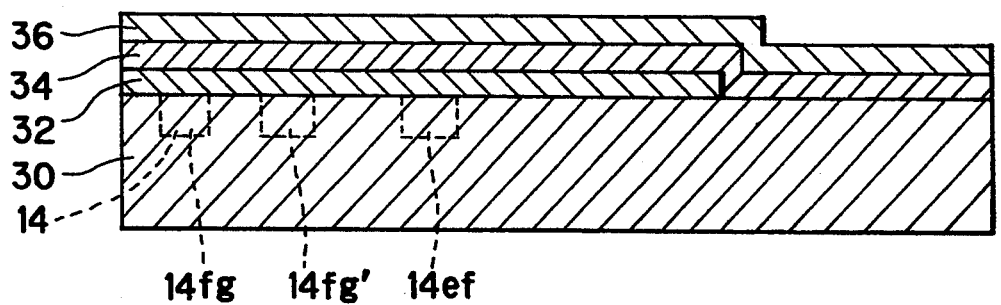
Figure 17:
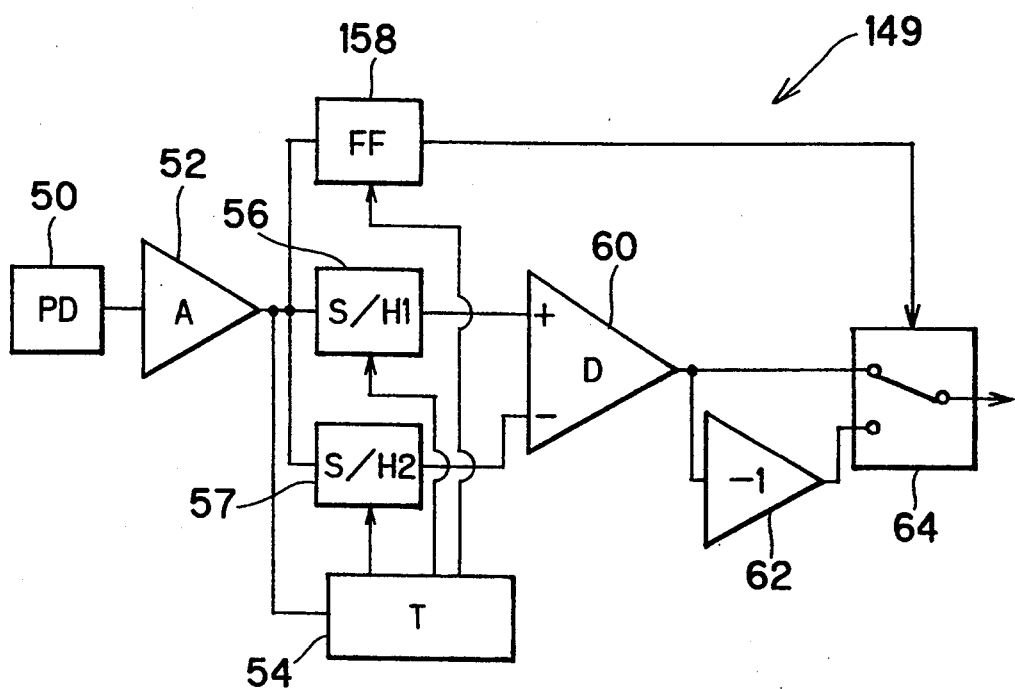
Figure 18:
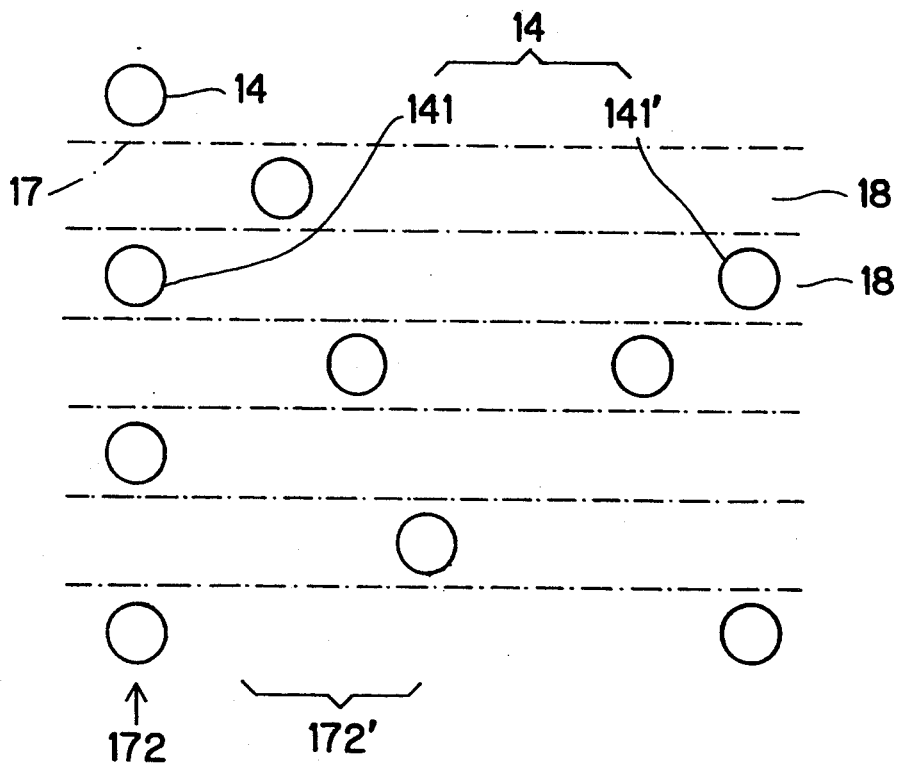
Figure 19:
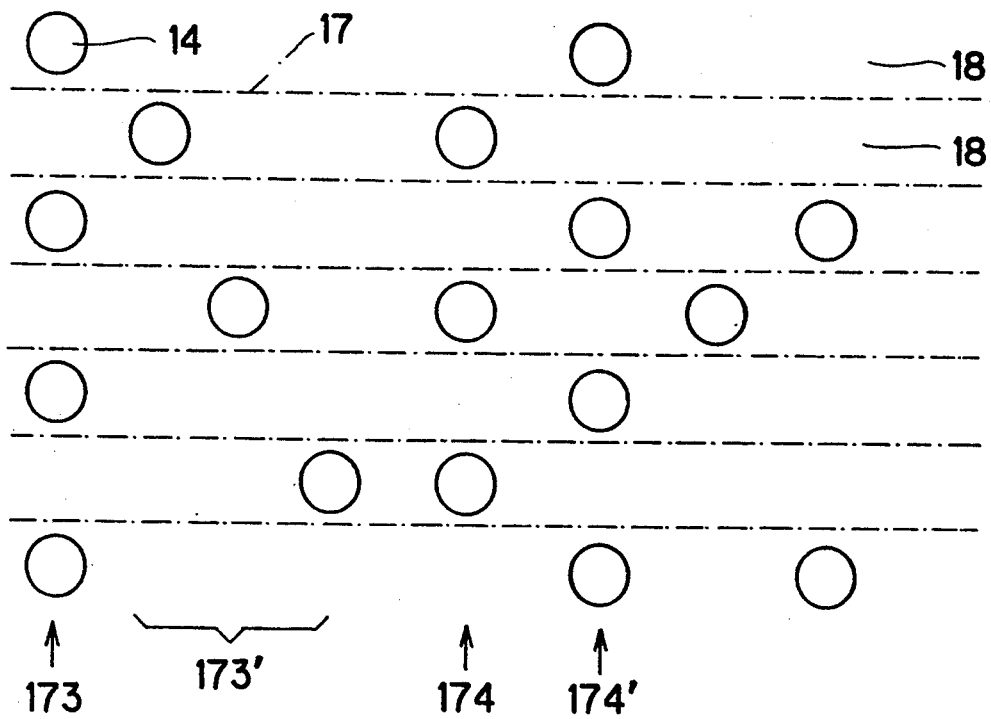
Figure 20:
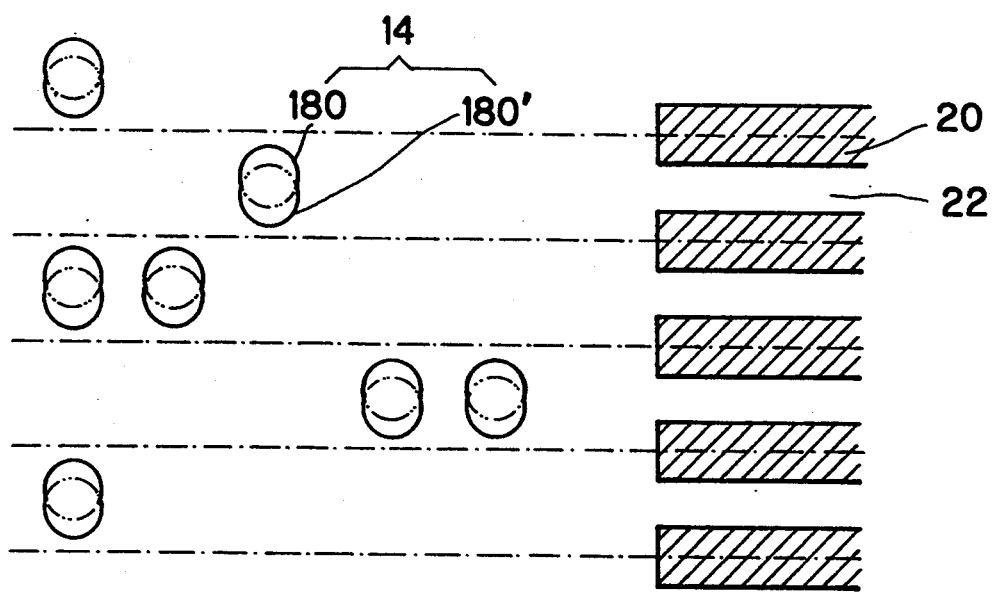
Figure 21:
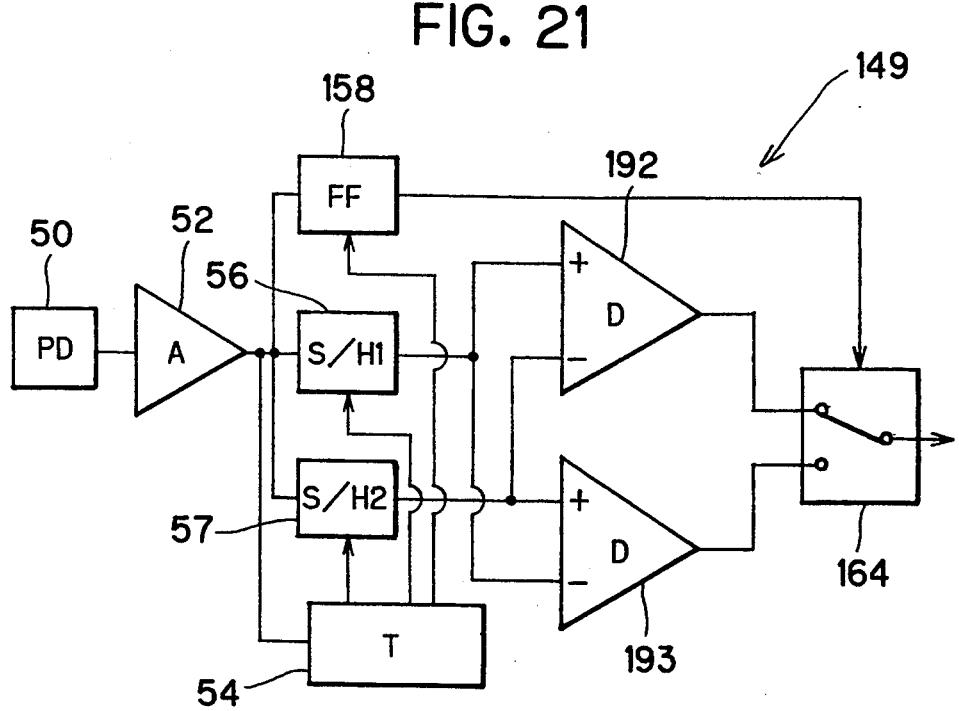
Figure 22:
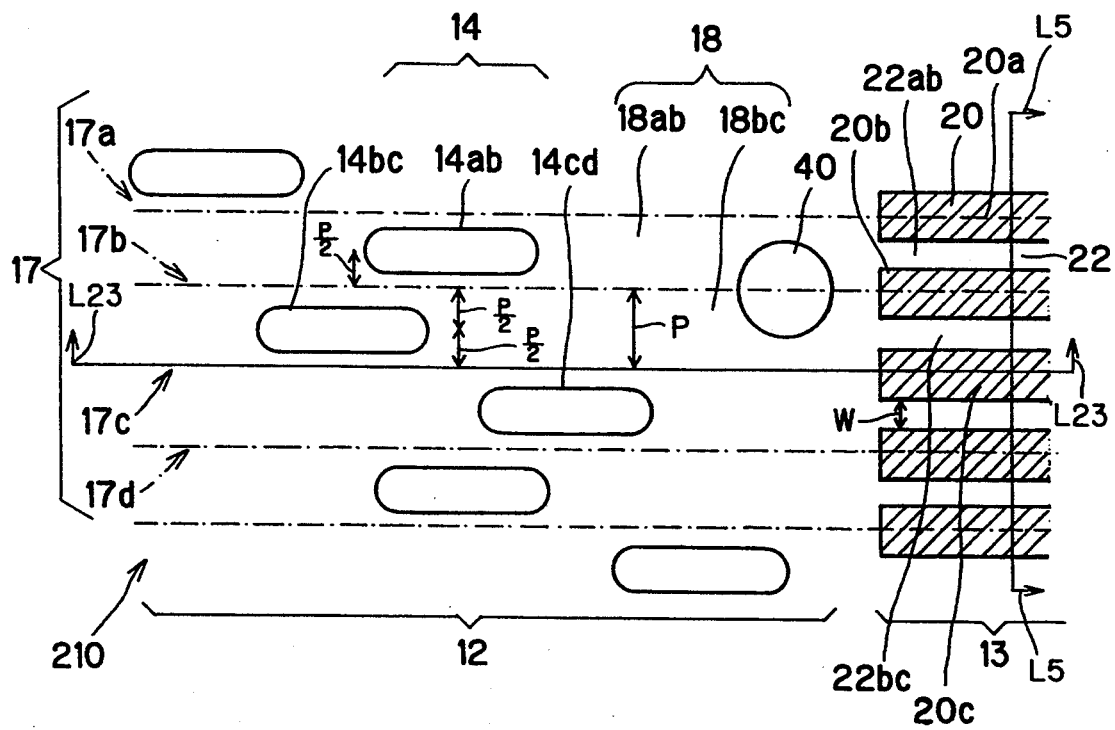
Figure 25:
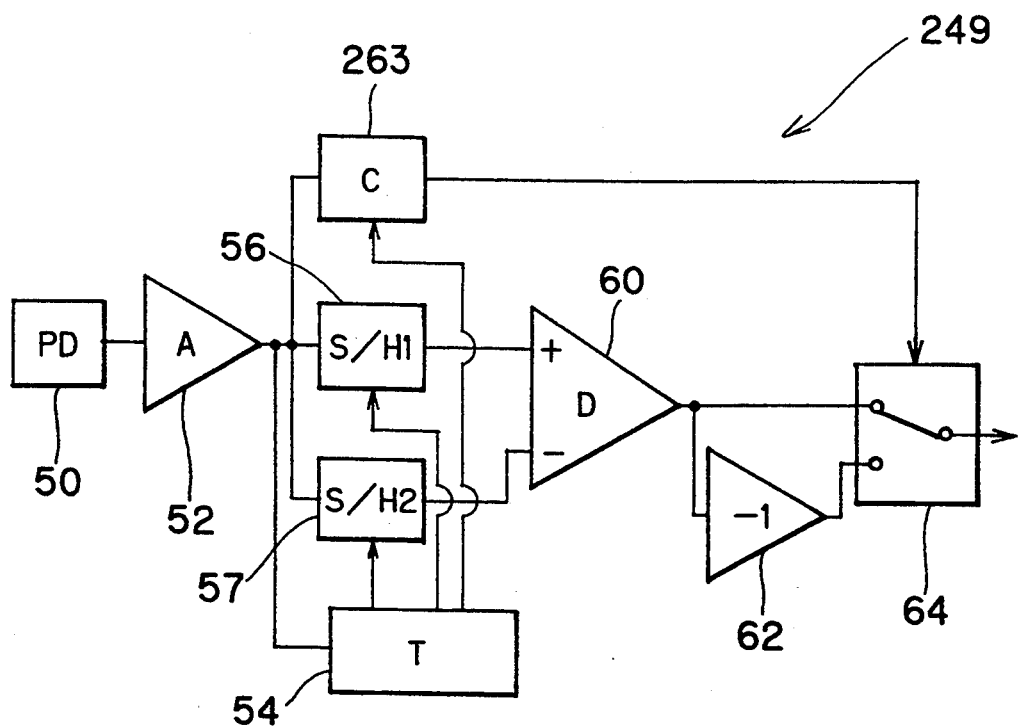
Figure 26:
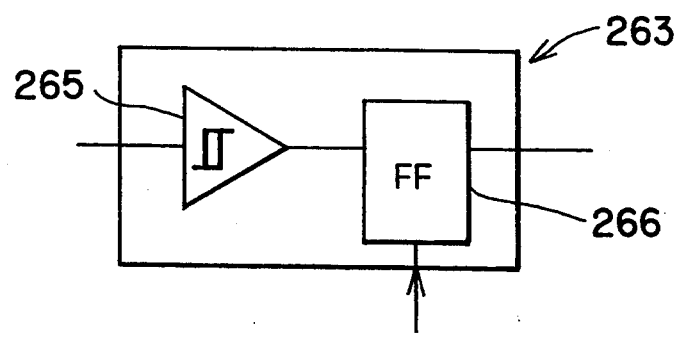
Figure 27:
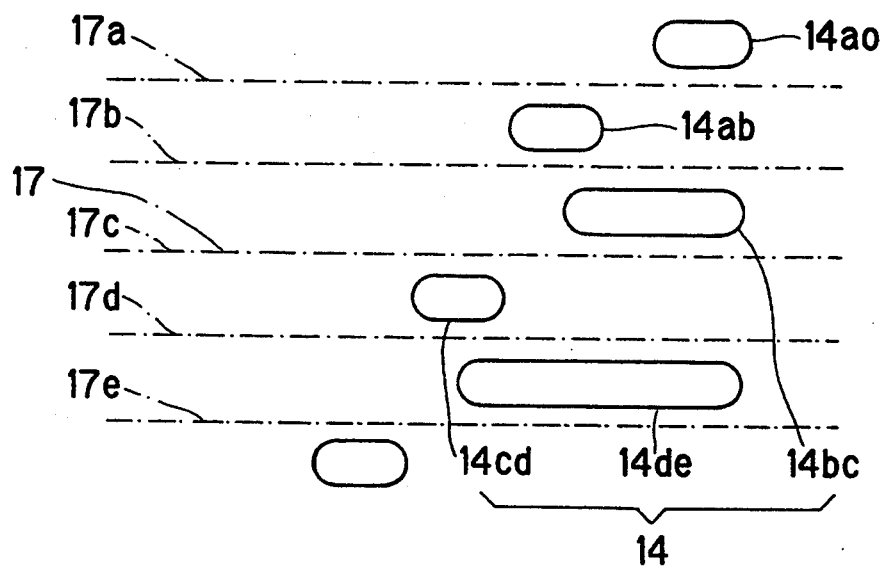
Figure 28:
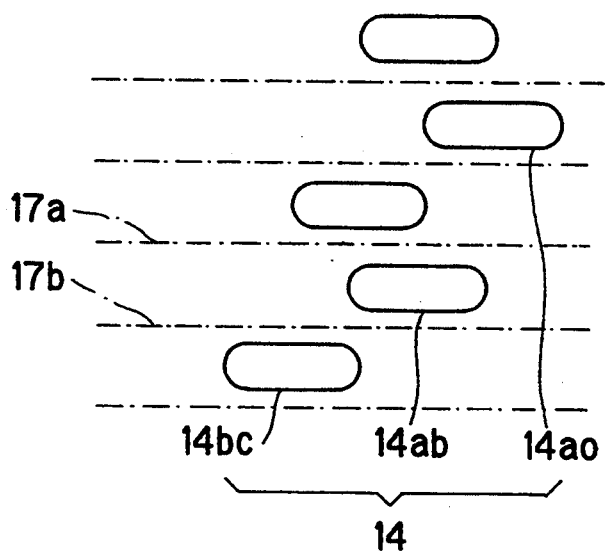
Figure 29A:
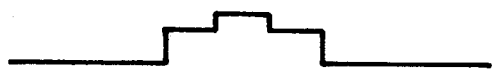
Figure 30:
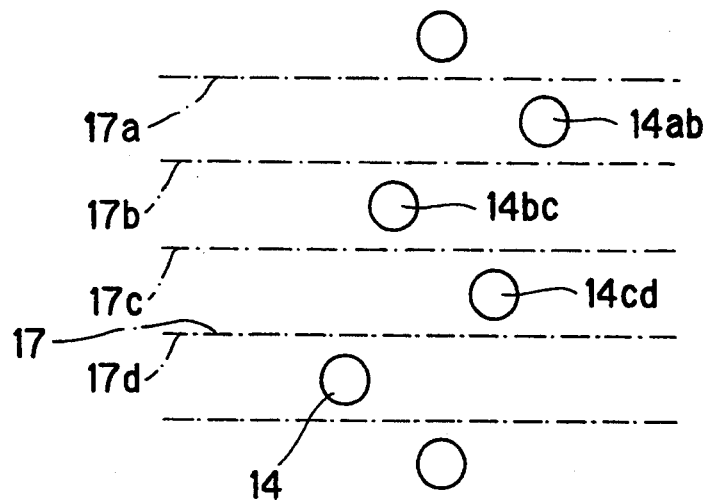
Figure 31:
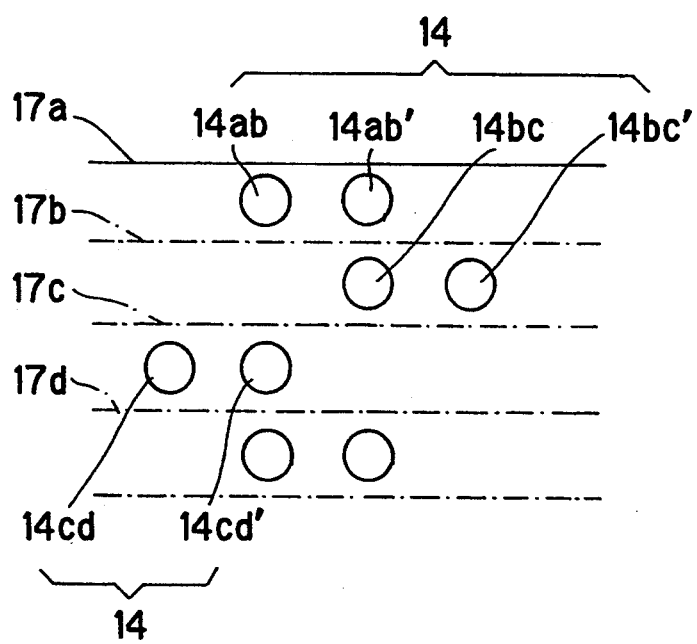
Figure 32:
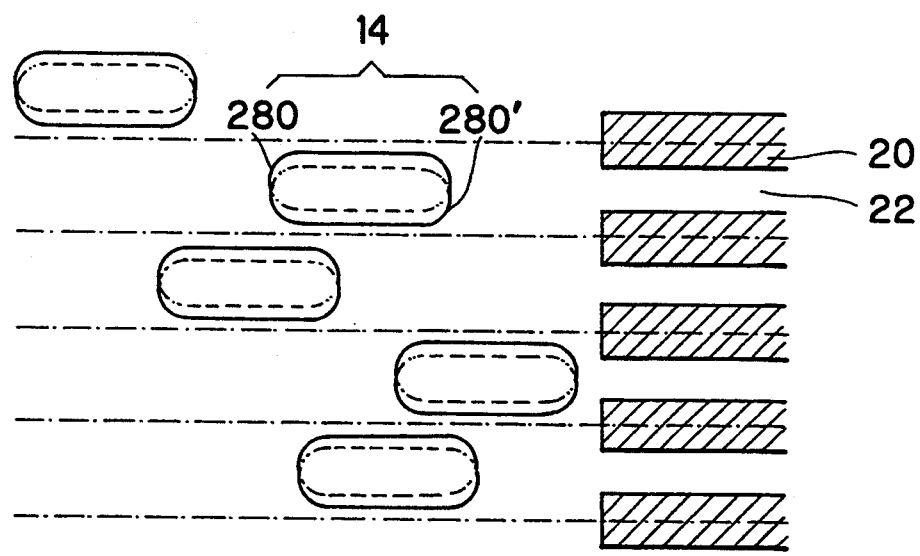
Figure 33:
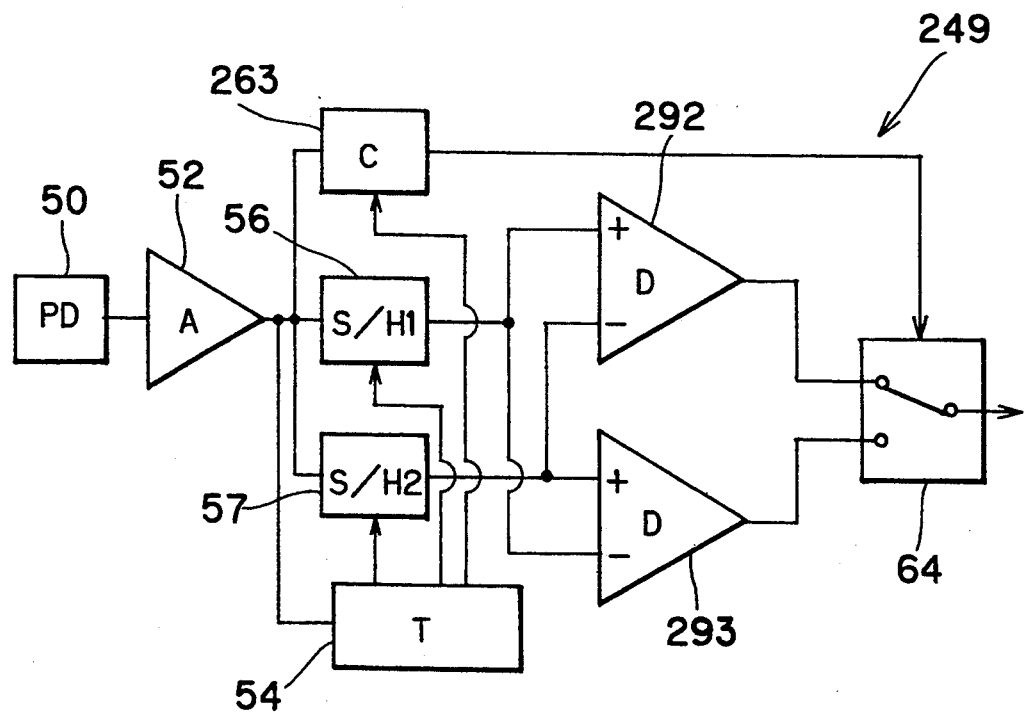
Figure 34:
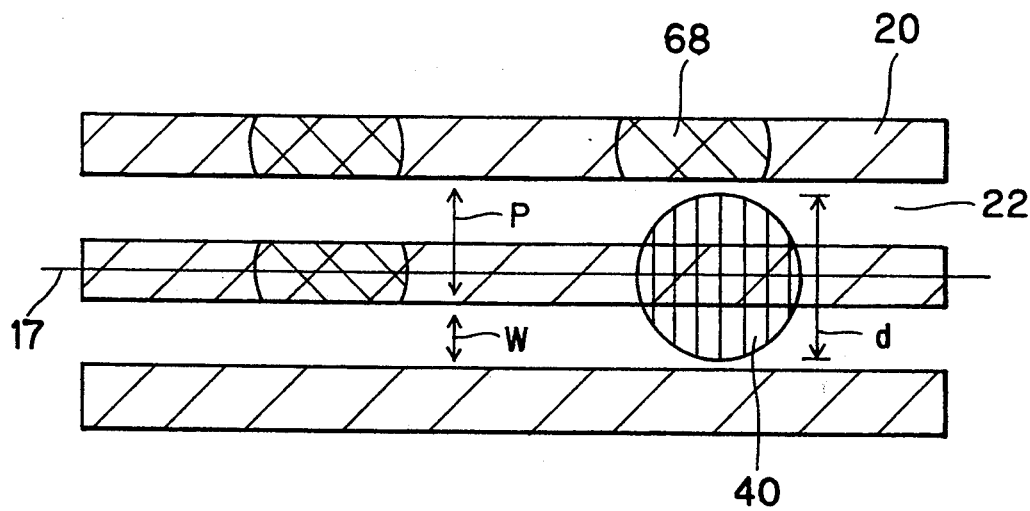
Figure 35:
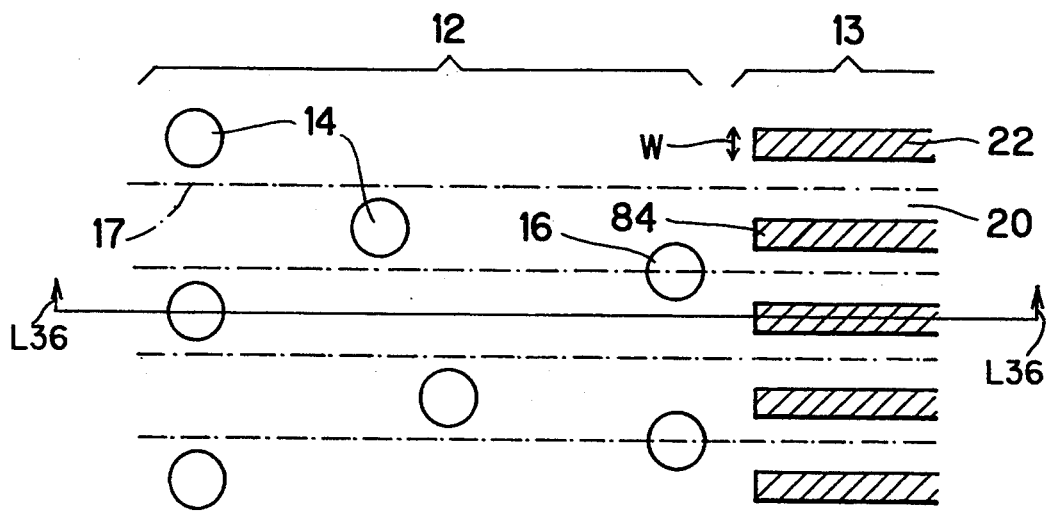
Figure 36:
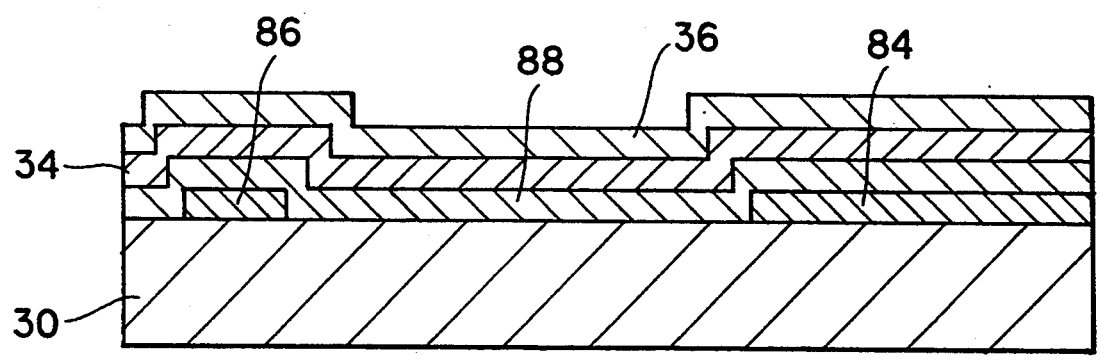
Figure 37:
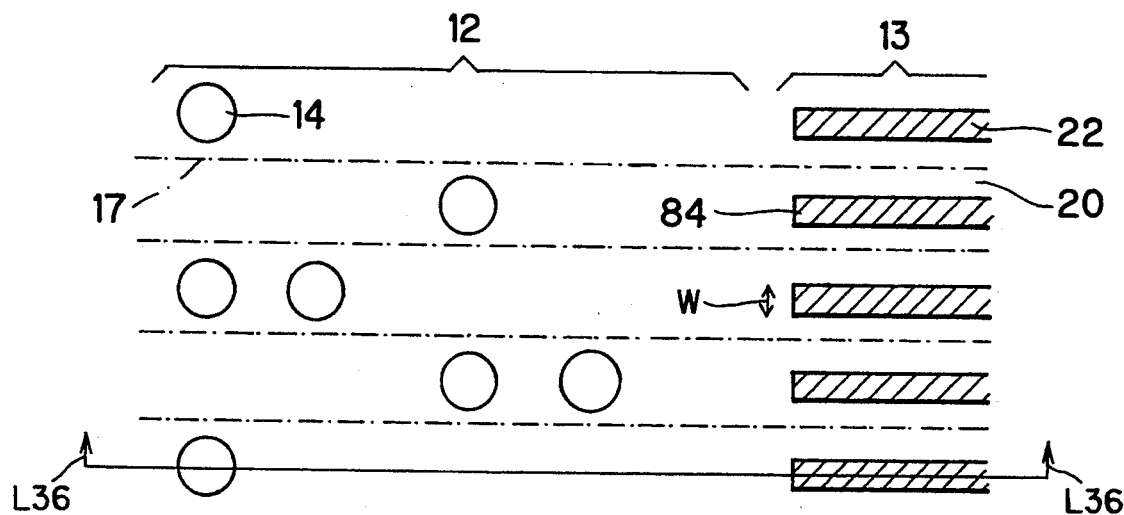
Figure 38:
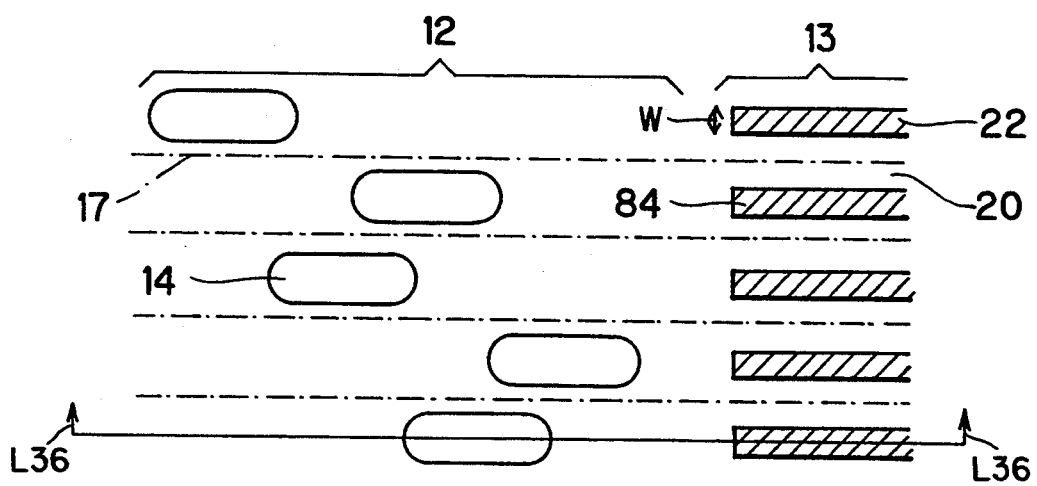
Figure 39:
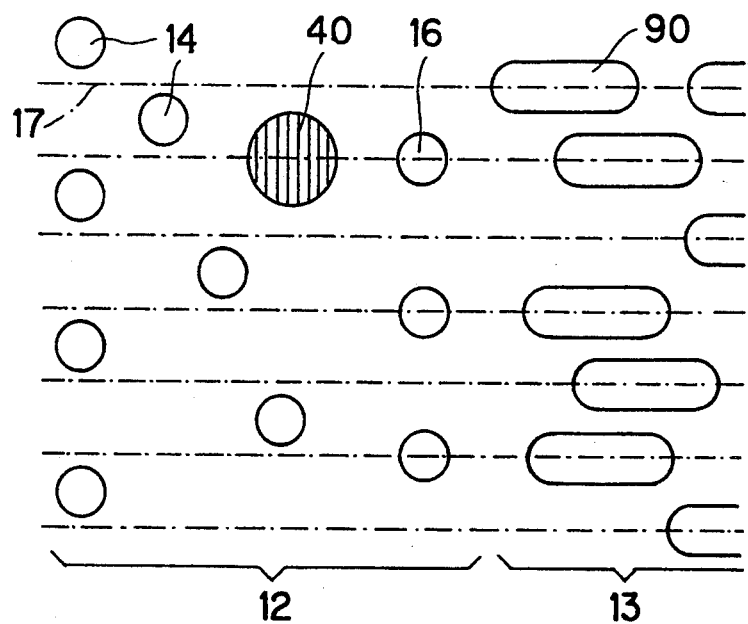
Figure 40:
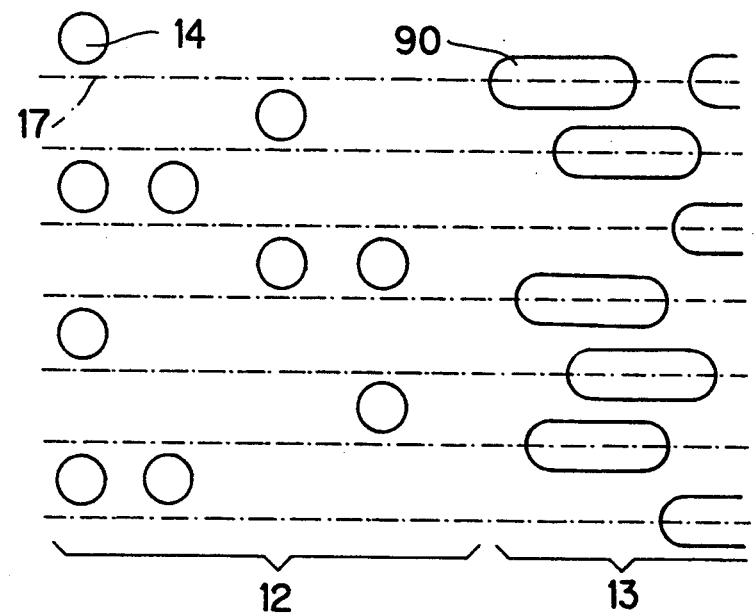
Figure 41:
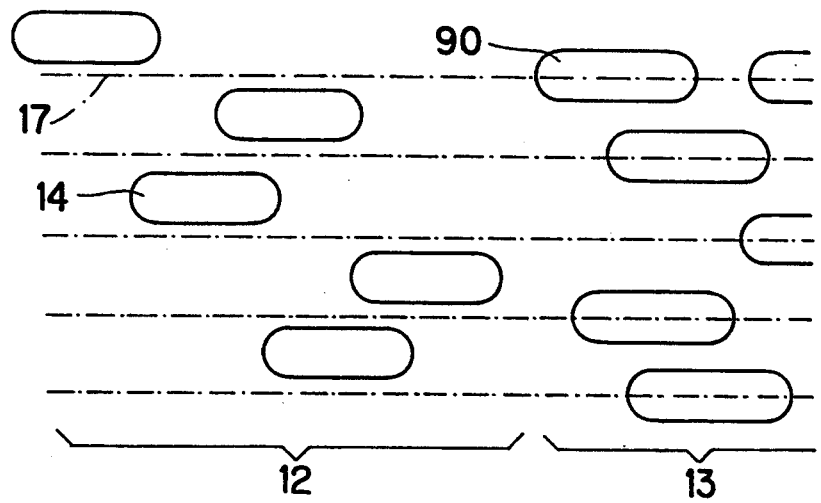
Figure 42:
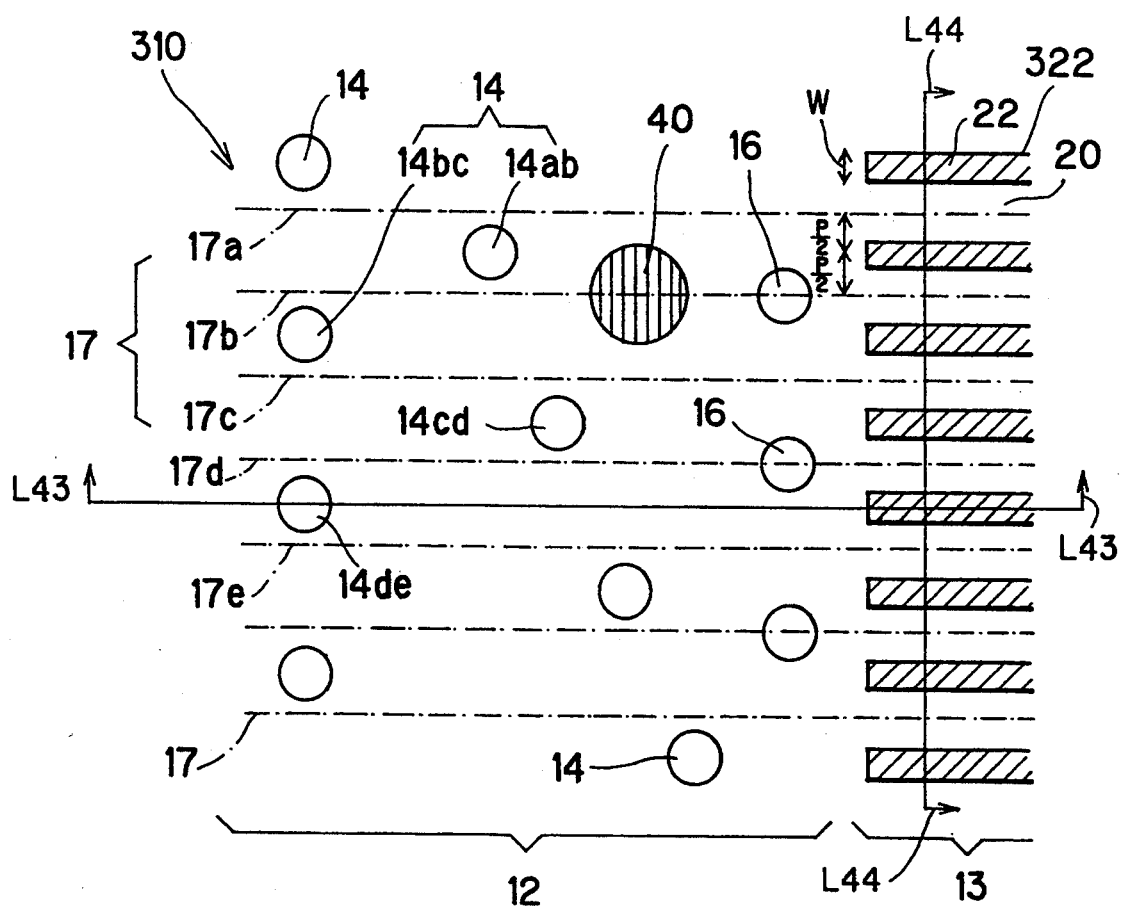
Figure 43:
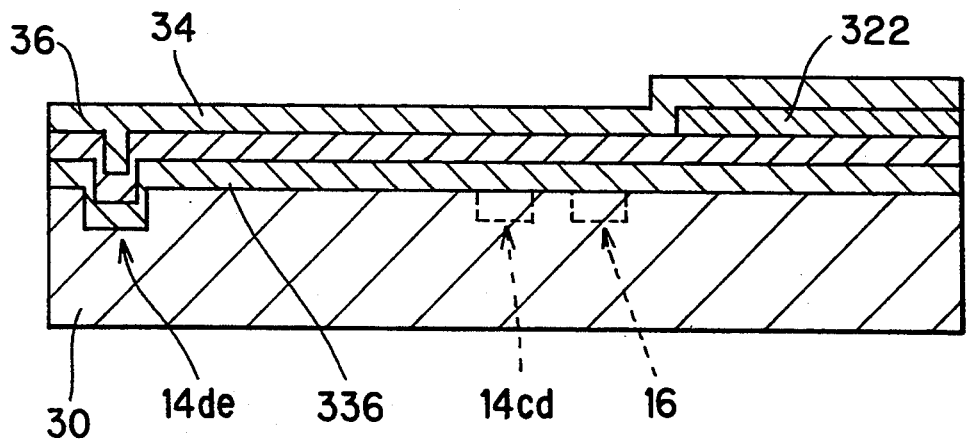
Figure 44:
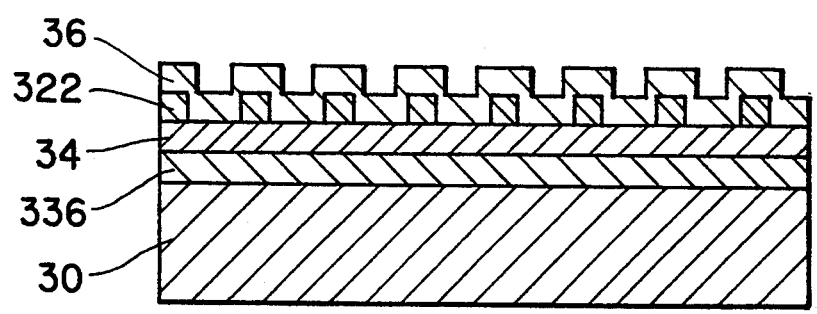
Figure 45:
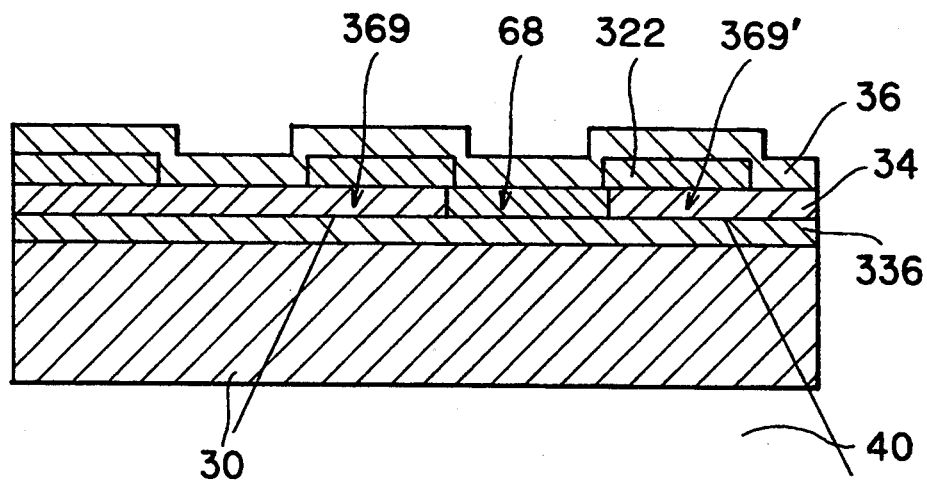
Figure 46:
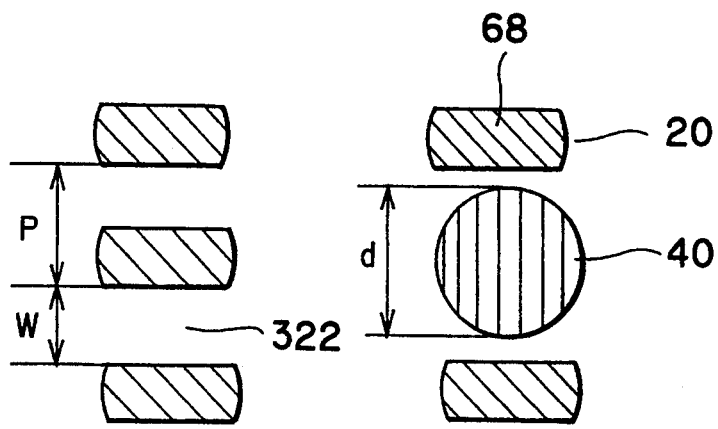
Figure 47:
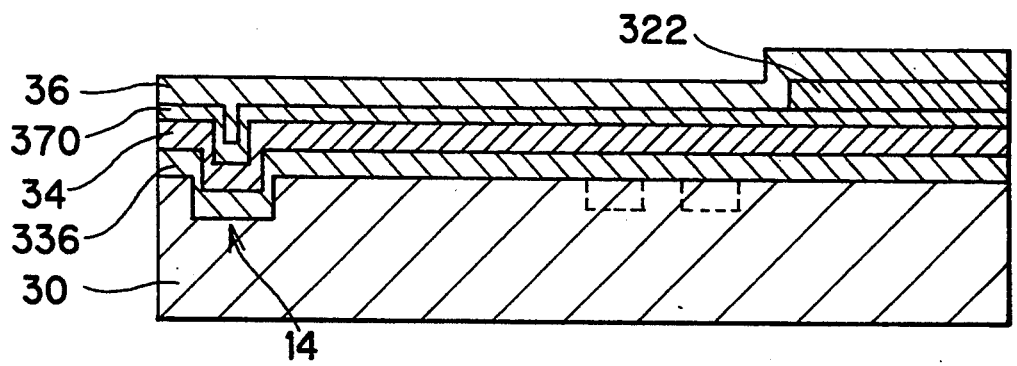
Figure 48:
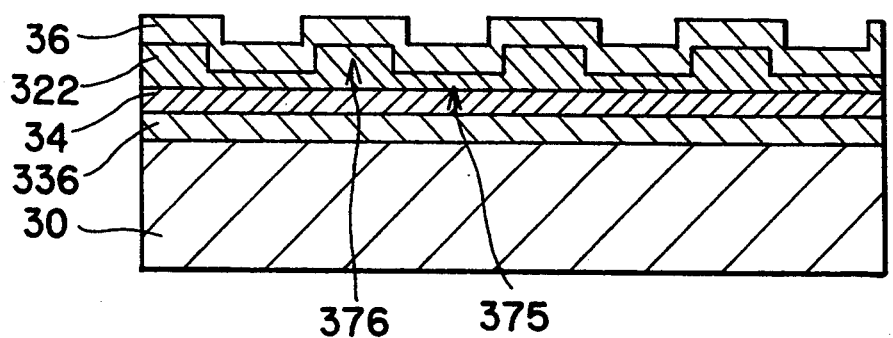
Figures 49A, 49B, 49C:
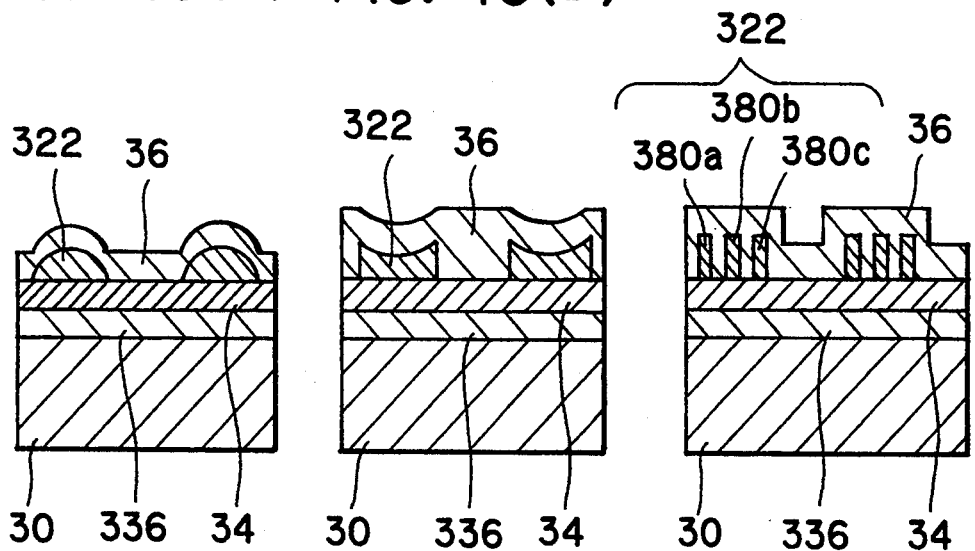
Figures 50A, 50B:
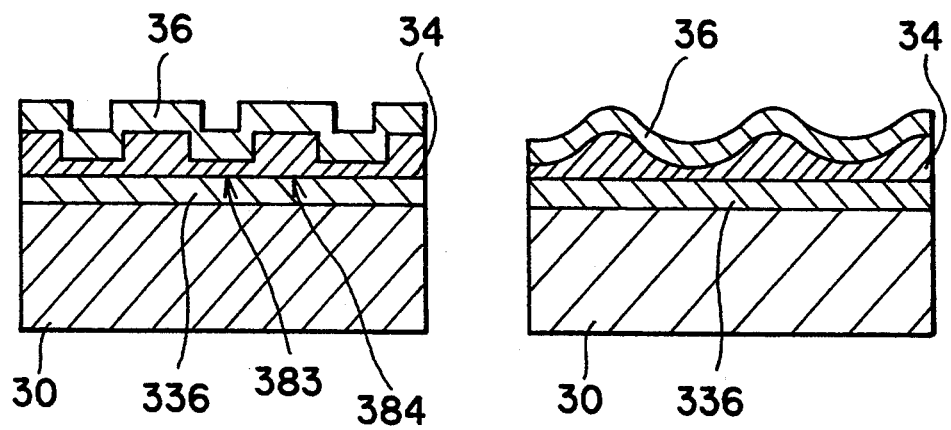
Figure 51:
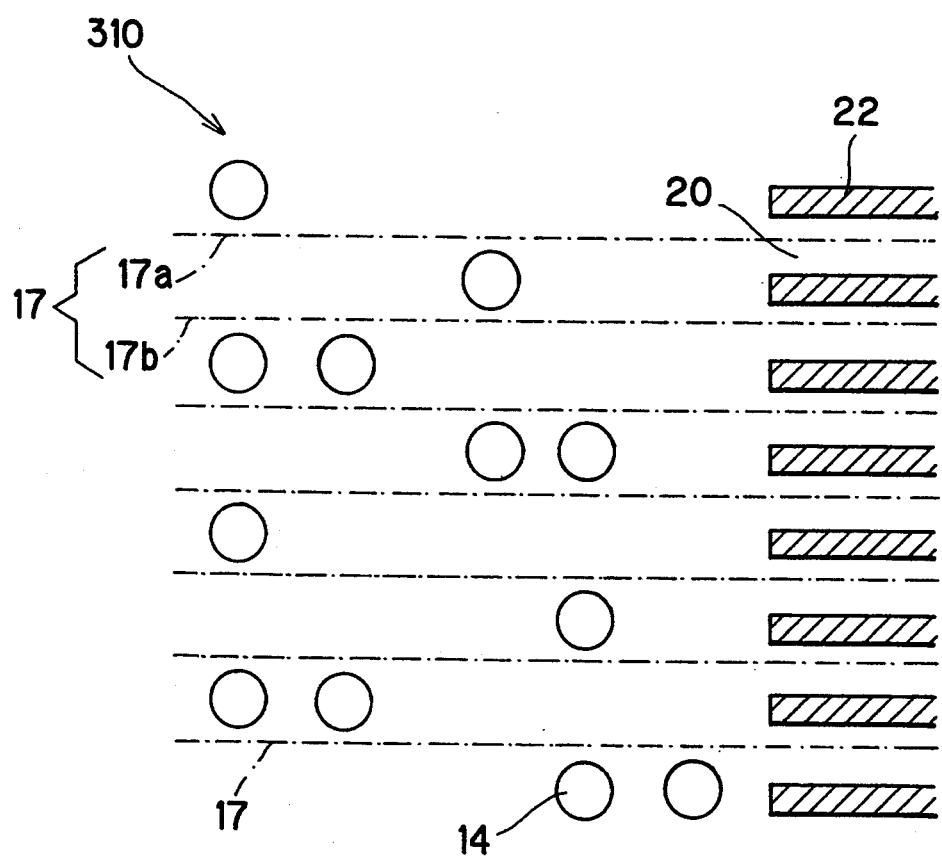
Figure 52:
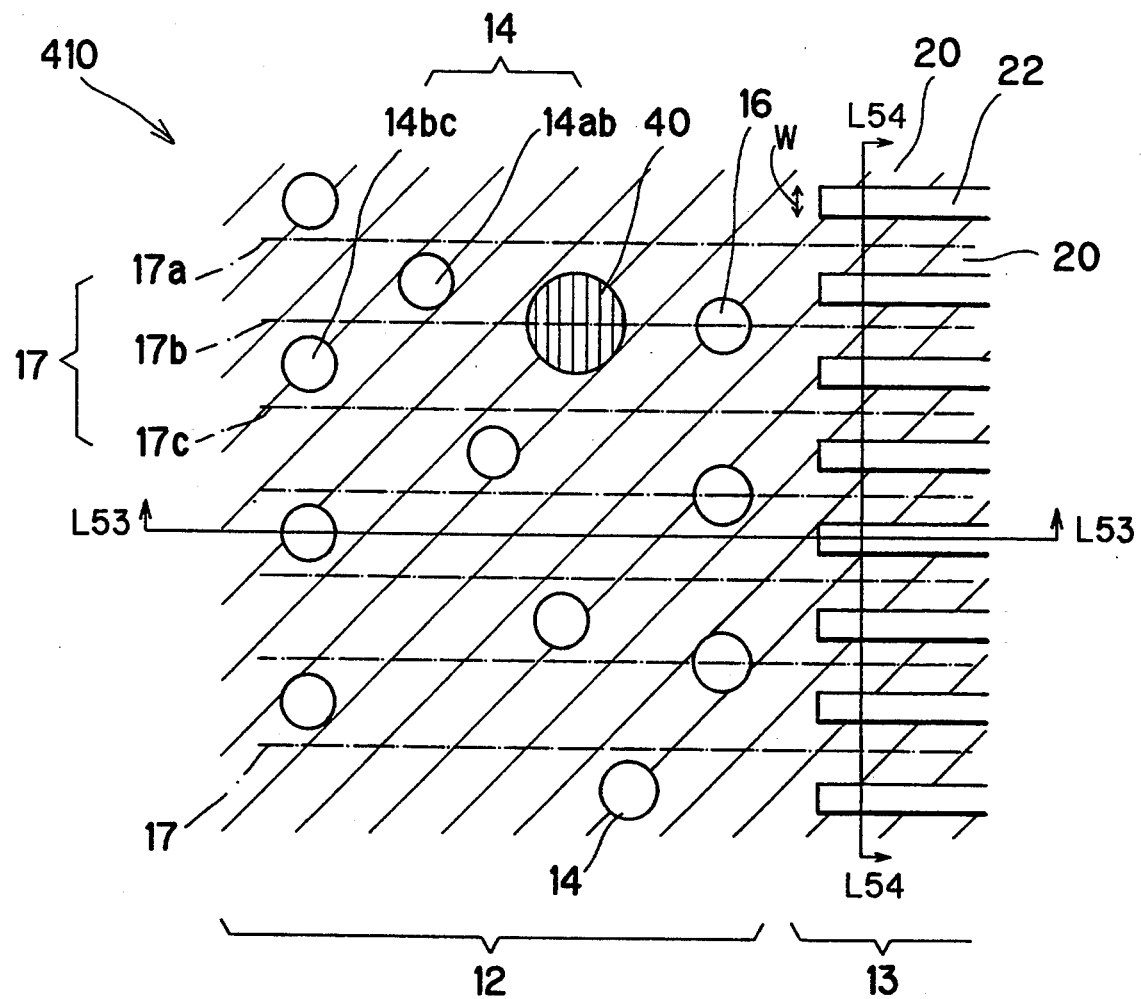
Figure 53:
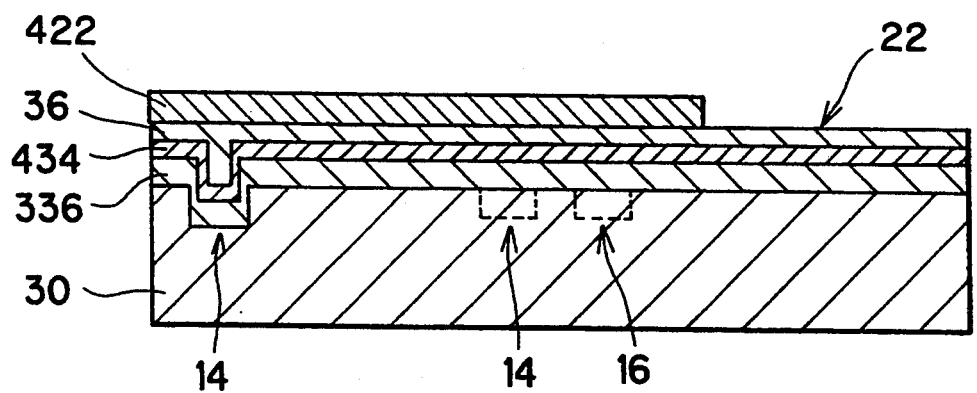
Figure 54:
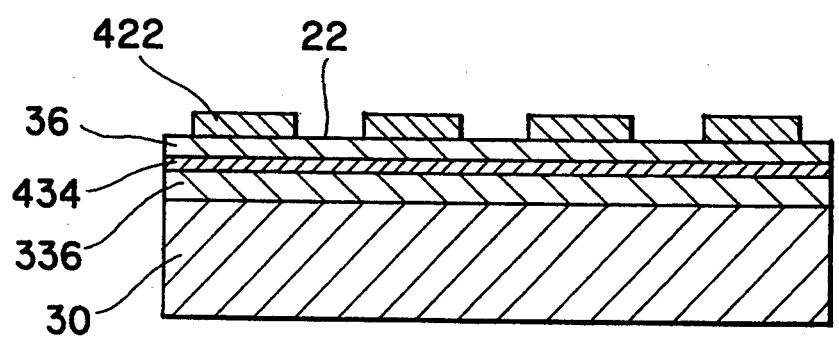
Figure 55:
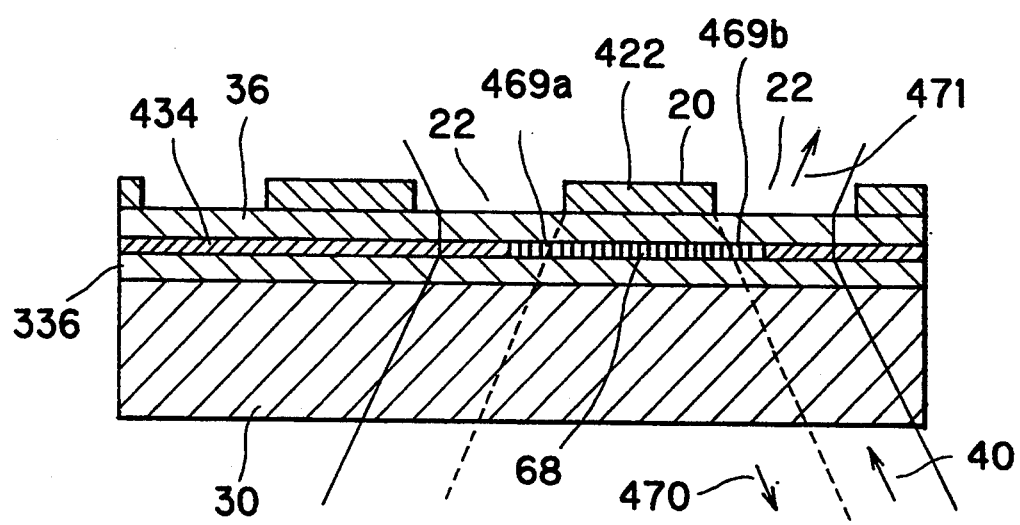
Figure 56:
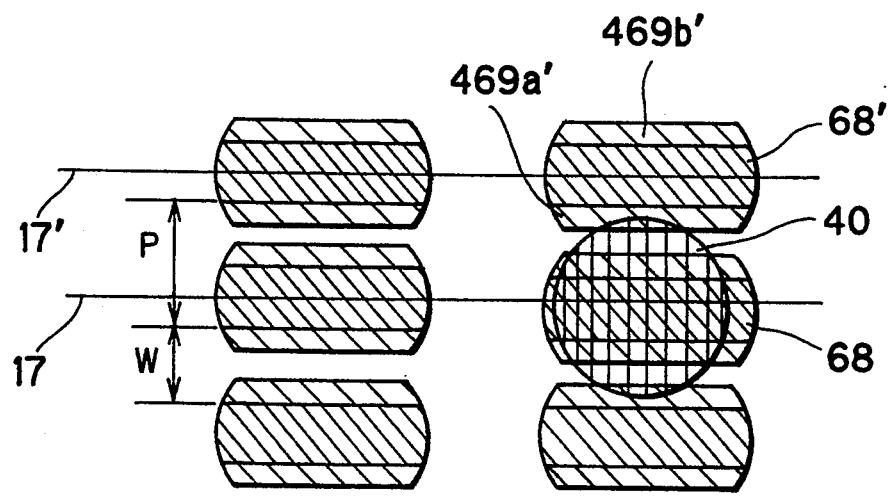
Figure 57:
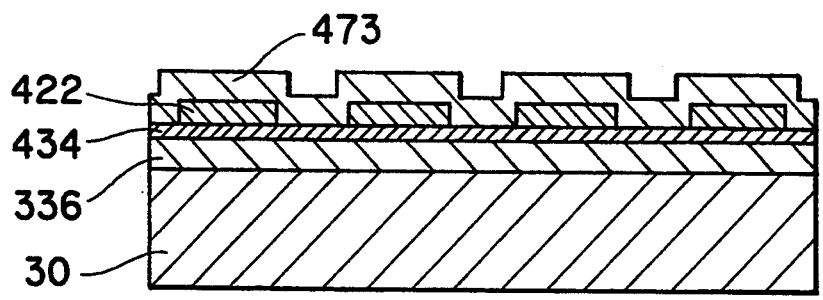
Figure 58:
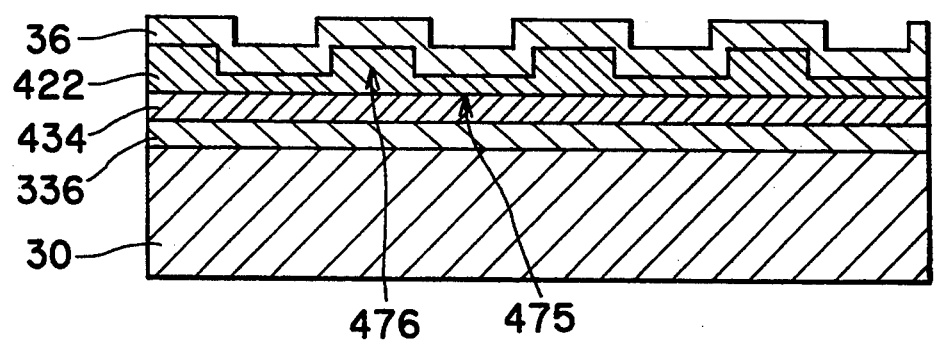
Figure 59:
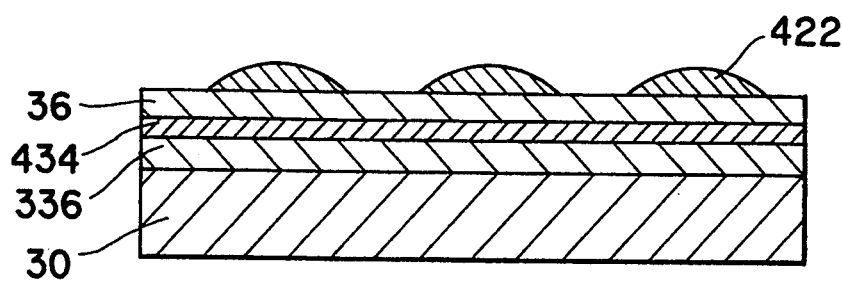
Figure 60:
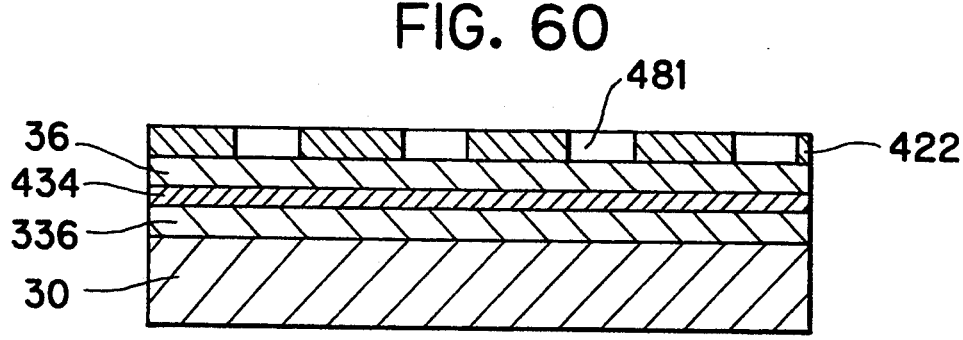
Figure 61:
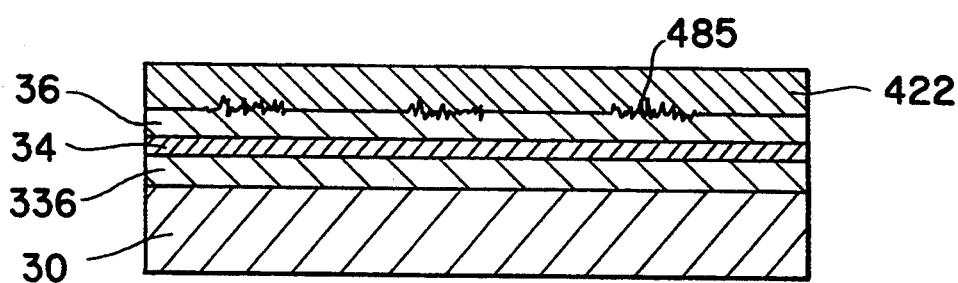
Figure 62:
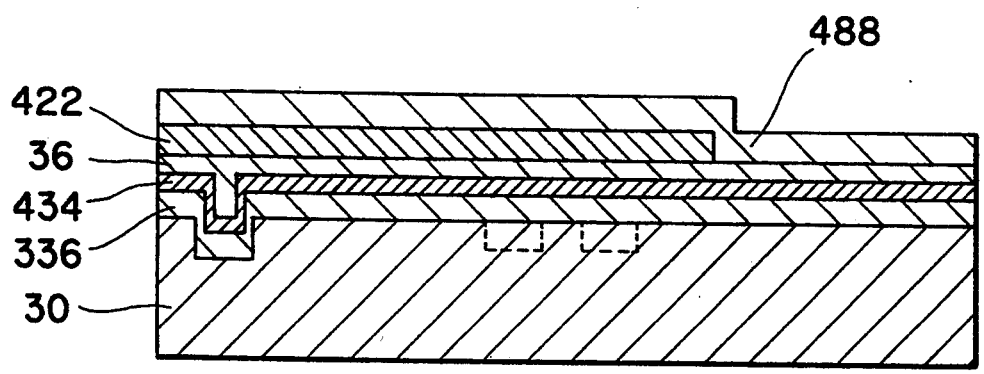
Figure 63:
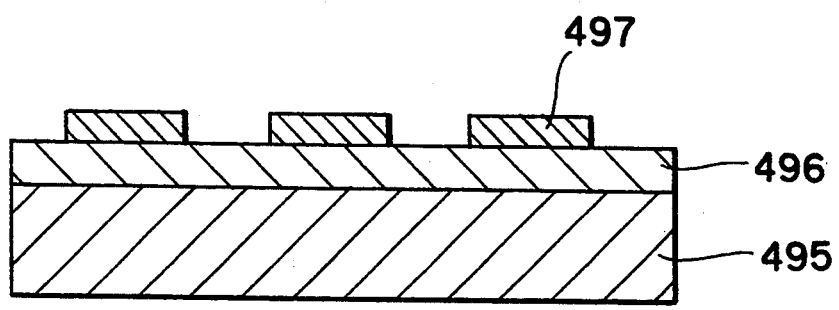
Figure 64:
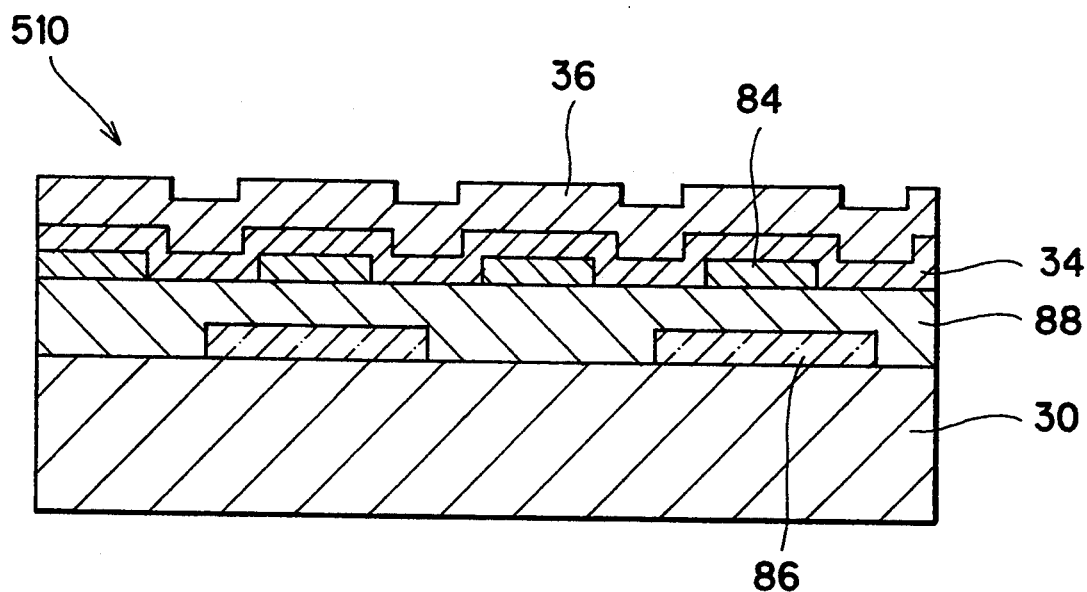
Figure 65:
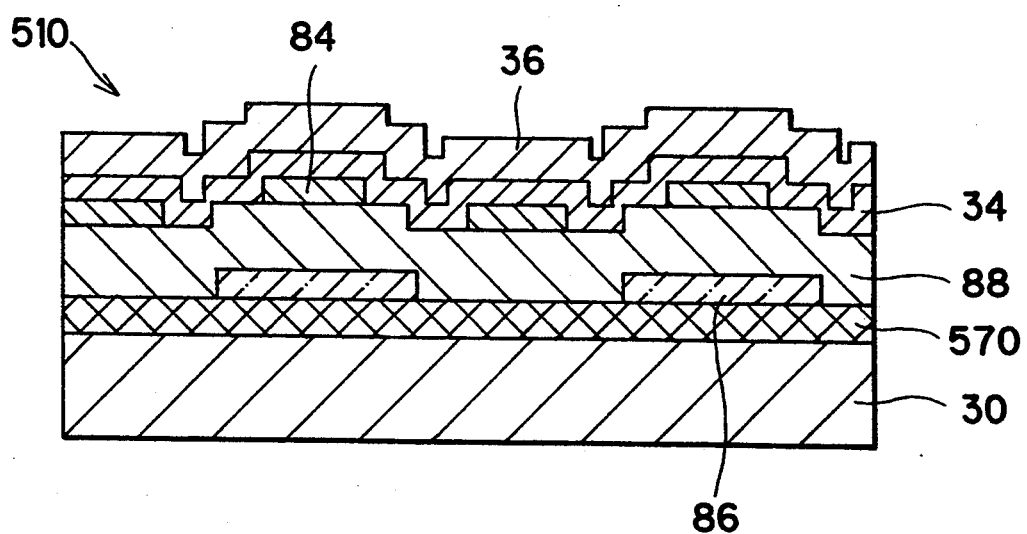
Figure 66:
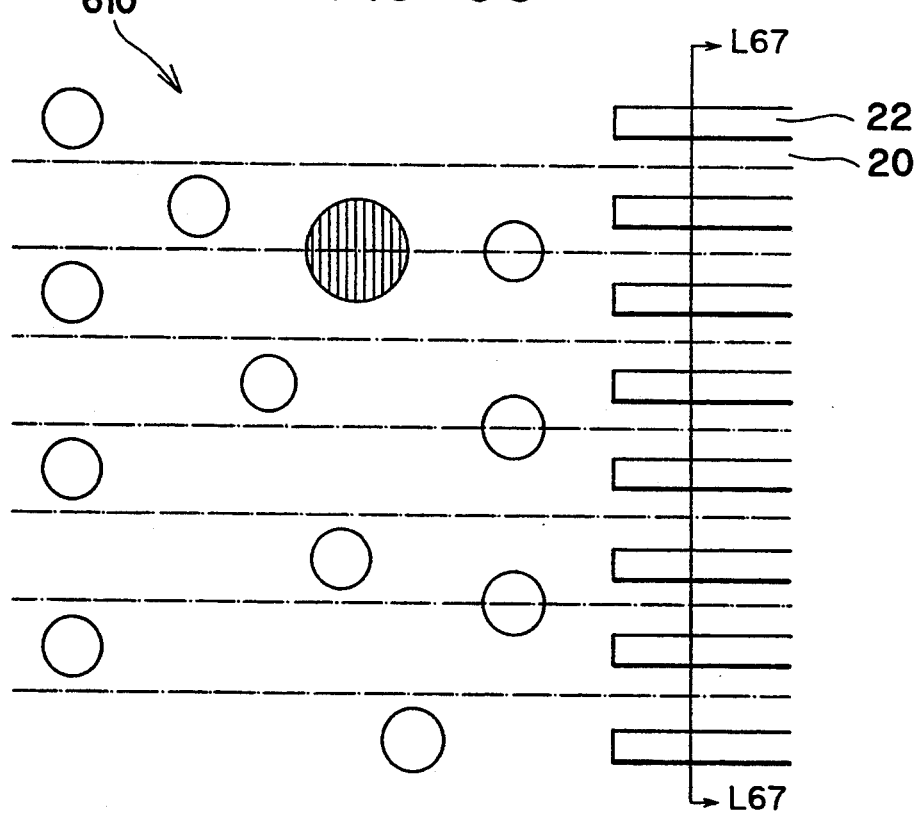
Figure 67:
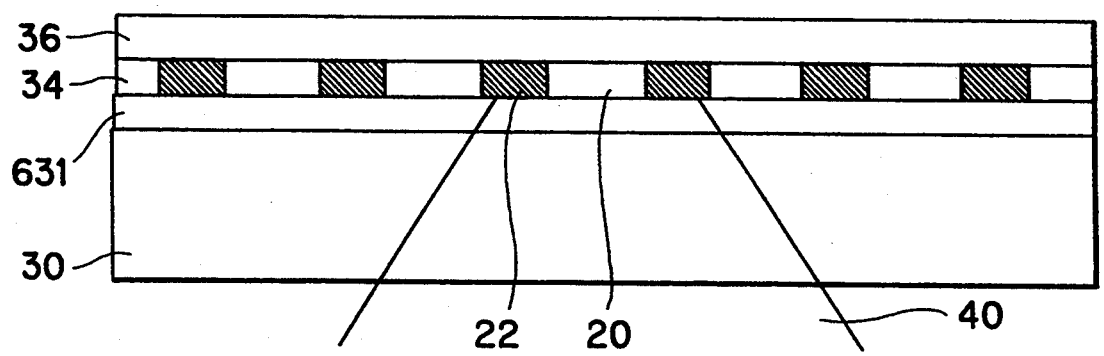
Figure 68:
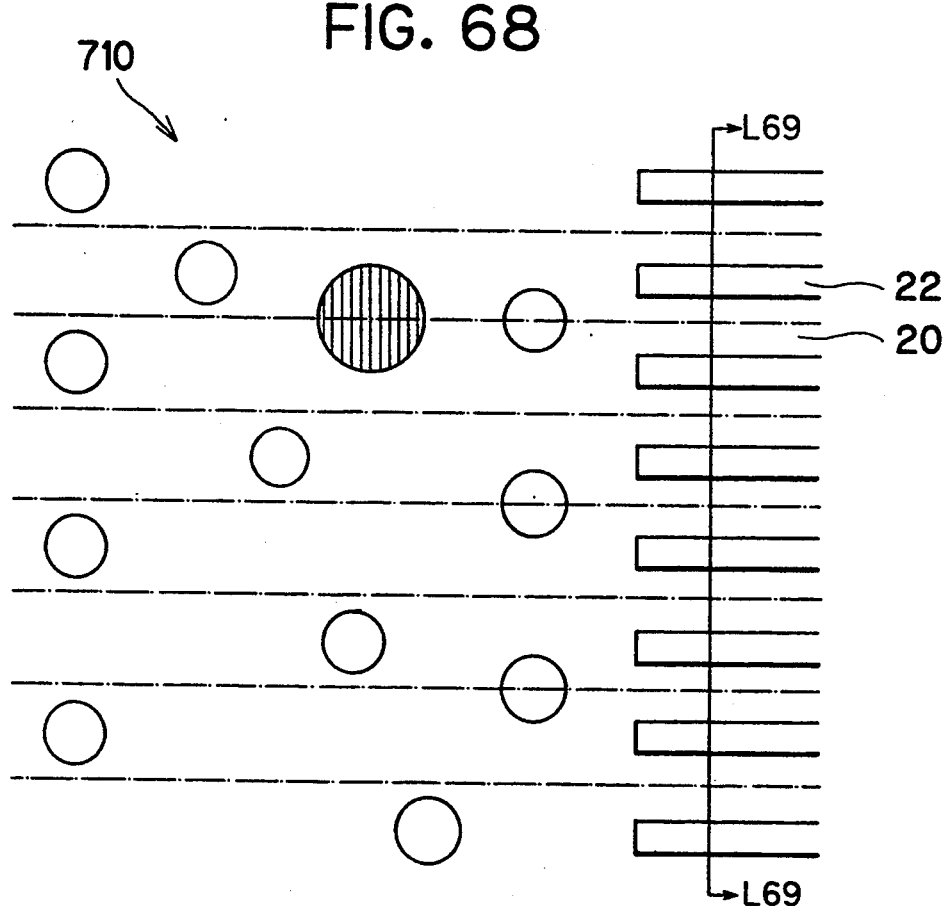
Figure 69:
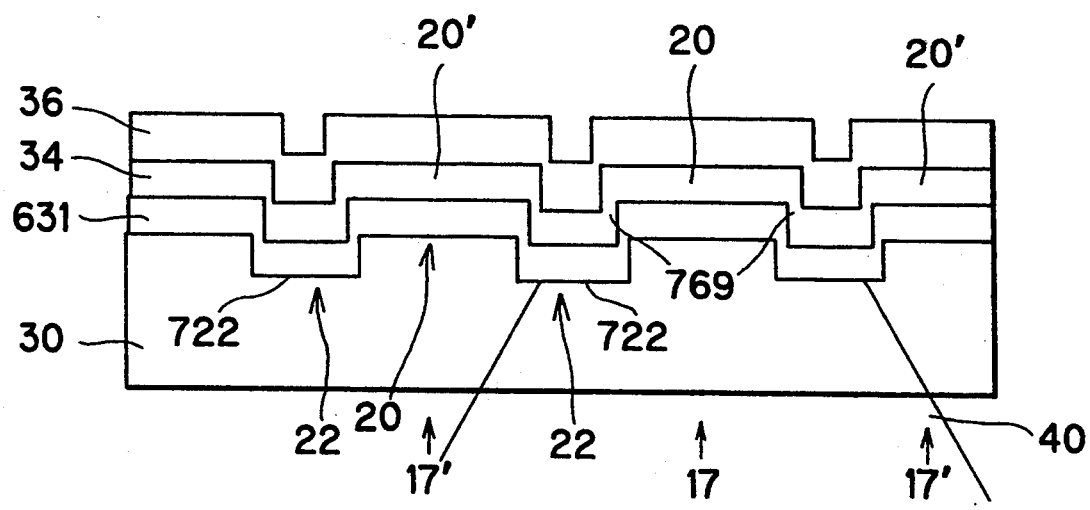

FIGS. 6(a) through 6(e) illustrate intensity decreased amount representing signals generated based on the wobbling pit and the discrimination pit formed on the optical recording medium 10;

FIG. 7 is a block diagram of a tracking servo circuit 49 applicable to the optical recording medium 10;

FIG. 8 is a plan view showing another example of the pit arrangement of the optical recording medium 10 of the first embodiment;

FIG. 9 is a plan view showing a further example of the pit arrangement of the optical recording medium 10 of the first embodiment;

FIG. 10 is a plan view showing another example of the pit arrangement of the optical recording medium 10 of the first embodiment;

FIG. 11 is a plan view showing a further example of the pit arrangement of the optical recording medium 10 of the first embodiment;

FIG. 12 is a plan view showing another example of the pit arrangement of the optical recording medium 10 of the first embodiment;

FIG. 13 is a block diagram of another example of the tracking servo circuit 49 applicable to the optical recording medium 10;

FIG. 14 is a plan view of an optical recording medium 110 according to a second preferred embodiment of the present invention;

FIG. 15 is a cross-sectional side, view of the optical recording medium 110 taken along a line L15—L15 of FIG. 14;

FIGS. 16(a) through 16(i) illustrate intensity decreased amount representing signals generated based on the wobbling pits formed on the optical recording medium 110;

FIG. 17 is a block diagram of a tracking servo circuit 149 applicable to the optical recording medium 110;

FIG. 18 is a plan view showing another example of the pit arrangement of the optical recording medium 110 of the second embodiment;

FIG. 19 is a plan view showing a further example of the pit arrangement of the optical recording medium 110 of the second embodiment;

FIG. 20 is a plan view showing another example of the pit arrangement of the optical recording medium 110 of the second embodiment;

FIG. 21 is a block diagram of another example of the tracking servo circuit 149 applicable to the optical recording medium 110;

FIG. 22 is a plan view of an optical recording medium 210 according to a third preferred embodiment of the present invention;

FIG. 23 is a cross-sectional side view of the optical recording medium 210 taken along a line L23—L23 of FIG. 22;

FIGS. 24(a) through 24(f) illustrate intensity decreased amount representing signals generated based on the wobbling pits formed on the optical recording medium 210;

FIG. 25 is a block diagram of a tracking servo circuit 249 applicable to the optical recording medium 210;

FIG. 26 is a block diagram of a background level detecting circuit employed in the tracking servo circuit 249;

FIG. 27 is a plan view showing another example of the pit arrangement of the optical recording medium 210 of the third embodiment;

FIG. 28 is a plan view showing a further example of the pit arrangement of the optical recording medium 210 of the third embodiment;

FIG. 29(a) and (b) illustrates the intensity decreased amount representing signals generated based on the wobbling pits formed on the optical recording medium 210 of FIG. 28;

FIG. 30 is a plan view showing another example of the pit arrangement of the optical recording medium 210 of the third embodiment;

FIG. 31 is a plan view showing a further example of the pit arrangement of the optical recording medium 210 of the third embodiment;

FIG. 32 is a plan view showing another example of the pit arrangement of the optical recording medium 210 of the third embodiment;

FIG. 33 is a block diagram of another example of the tracking servo circuit 249 applicable to the optical recording medium 210;

FIG. 34 is a plan view schematically showing a bit formed on the optical recording medium 10, 110, 210 of the present invention;

FIG. 35 is a plan view showing another example of the data area 13 of the optical recording medium 10 of the first embodiment;

FIG. 36 is a cross-sectional side view showing another example of the optical recording medium of the present invention taken along a line L36—L36 in FIGS. 35, 37 and 38;

FIG. 37 is a plan view showing another example of the data area 13 of the optical recording medium 110 of the second embodiment;

FIG. 38 is a plan view showing another example of the data area 13 of the optical recording medium 210 of the third embodiment;

FIG. 39 is a plan view showing another example of the data area 13 of the optical recording medium 10 of the first embodiment;

FIG. 40 is a plan view showing another example of the data area 13 of the optical recording medium 110 of the second embodiment;

FIG. 41 is a plan view showing another example of the data area 13 of the optical recording medium 210 of the third embodiment;

FIG. 42 is a plan view of another optical recording medium 310 to which applied is the pit arrangement of the first embodiment of the present invention;

FIG. 43 is a cross-sectional side view of the optical recording medium 310 taken along a line L43—L43 of FIG. 42;

FIG. 44 is a cross-sectional view of the optical recording medium 310 taken along a line L44—L44 of FIG. 42;

FIG. 45 is a cross-sectional view showing the bit formed in the recording layer of the optical recording medium 310;

FIG. 46 is a plan view schematically showing the bit formed in the optical recording medium 310;

FIG. 47 is a cross-sectional side view showing another example of the optical recording medium 310 of the present invention;

FIG. 48 is a cross-sectional side view showing a further example of the optical recording medium 310 of the present invention;

FIGS. 49(a) through (c) are cross-sectional views showing other examples of the optical recording medium 310 of the present invention;

FIGS. 50(a) and (b) are cross-sectional views showing further examples of the optical recording medium 310 of the present invention;

FIG. 51 is a plan view of another optical recording medium 310 to which applied is the pit arrangement of the second embodiment of the present invention;

FIG. 52 is a plan view of another optical recording medium 410 to which applied is the pit arrangement of the first embodiment of the present invention;

FIG. 53 is a cross-sectional side view of the optical recording medium 410 taken along a line L53—L53 of FIG. 52;

FIG. 54 is a cross-sectional view of the optical recording medium 410 taken along a line L54—L54 of FIG. 52;

FIG. 55 is a cross-sectional view showing the bit formed in the recording layer of the optical recording medium 410;

FIG. 56 is a plan view schematically showing the bit formed in the optical recording medium 410;

FIG. 57 is a cross-sectional view showing another example of the optical recording medium 410 of the present invention;

FIG. 58 is a cross-sectional view showing a further example of the optical recording medium 410 of the present invention;

FIG. 59 is a cross-sectional view showing another example of the optical recording medium 410 of the present invention;

FIG. 60 is a cross-sectional view showing a further example of the optical recording medium 410 of the present invention;

FIG. 61 is a cross-sectional view showing another example of the optical recording medium 410 of the present invention;

FIG. 62 is a cross-sectional side view showing a further example of the optical recording medium 410 of the present invention;

FIG. 63 is a cross-sectional view showing another example of the optical recording medium 410 of the present invention;

FIG. 64 is a cross-sectional view of another optical recording medium 510 to which applied is the pit arrangement of the present invention;

FIG. 65 is a cross-sectional view showing another example of the optical recording medium 510 of the present invention;

FIG. 66 is a plan view of another optical recording medium 610 to which applied is the pit arrangement of the first embodiment of the present invention;

FIG. 67 is a cross-sectional view of the optical recording medium 610 taken along a line L67—L67 of FIG. 66;

FIG. 68 is a plan view of another optical recording medium 710 to which applied is the pit arrangement of the first embodiment of the present invention; and FIG. 69 is a cross-sectional view of the optical recording medium 710 taken along a line L69—L69 of FIG. 69.

Throughout the accompanying drawings, the same or like reference numerals or characters refer to the same or like parts.

DETAILED DESCRIPTION OF THE PREFERRED EMBODIMENTS

Preferred embodiments of the present invention will hereinafter be described with reference to the drawings.

In an optical recording medium of the present invention, a plurality of tracks 17 each of which extends in a first direction are arranged in a second direction which is perpendicular to the first direction. The plurality of tracks 17 are apart from one another along the second direction so that an area is formed between each two tracks 17 which are arranged adjacent to each other. The area will be referred to as a "track-track between area 18", hereinafter. According to the present invention, at least one wobbling pit 14 is formed at a track-track between area 18 positioned between each two adjacent tracks 17. The wobbling pit 14 is adapted for tracking operations for both the each two adjacent tracks 17. In other words, a wobbling pit 14 formed on each two track-track between areas 18 which are positioned adjacent to each other with a track 17 sandwiched therebetween is adapted for a tracking operation of the track 17.

The optical recording medium of the present invention is further provided with discrimination means for discriminationg each two adjacent tracks from each other.

The wobbling pit 14 is formed in a track-track between area 18 which is positioned between each two adjacent tracks 17 in such a position that a distance between the wobbling pit and the one of the each two adjacent tracks is equal to a distance between the wobbling pit and the other one of the each two adjacent tracks.

The wobbling pit 14 may preferably be formed of a concave or convex portion formed on a substrate 30 of the optical recording medium or a light reflective material film 86 such as a metal film formed on the substrate 30.

The optical recording medium of the present invention has a non-recording area 22 in each track-track between area 18, at least on its data area 13. The non-recording area 22 is of a strip shape extending in the first direction and has a predetermined width along the second direction.

A first preferred embodiment will be described below with reference to FIGS. 3 through 17.

According to the first embodiment, in order to discriminate between one track and the other track of each two adjacent tracks, a discrimination pit 16 is formed on one of the each two adjacent tracks 17. More specifically to say, in the optical recording medium of the present embodiment, the discrimination pit 16 is formed on every other track 17.

Figure 1:
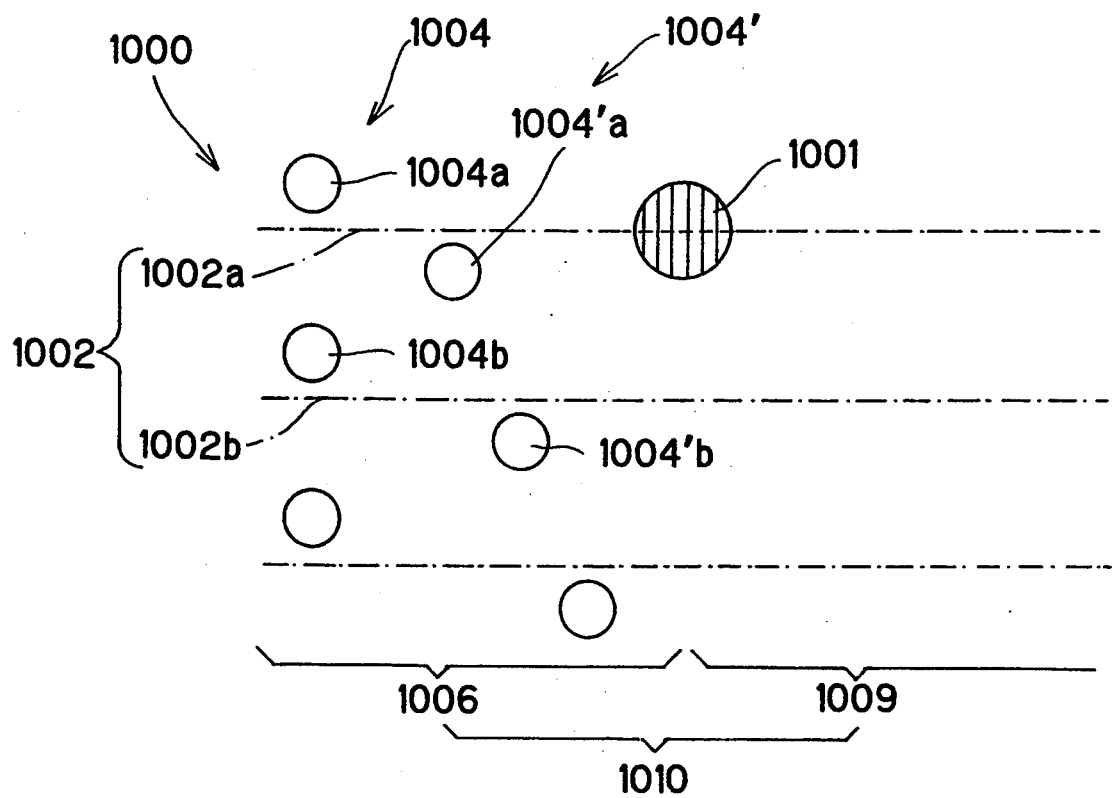
Figure 2A:
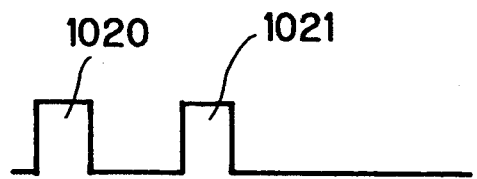
Figure 2B:
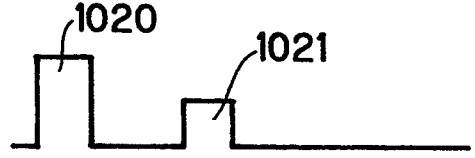
Figure 2C:
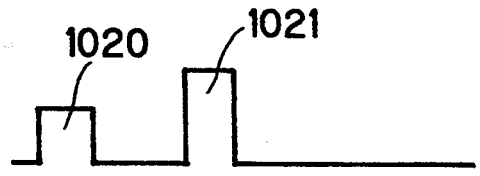
Figure 3:
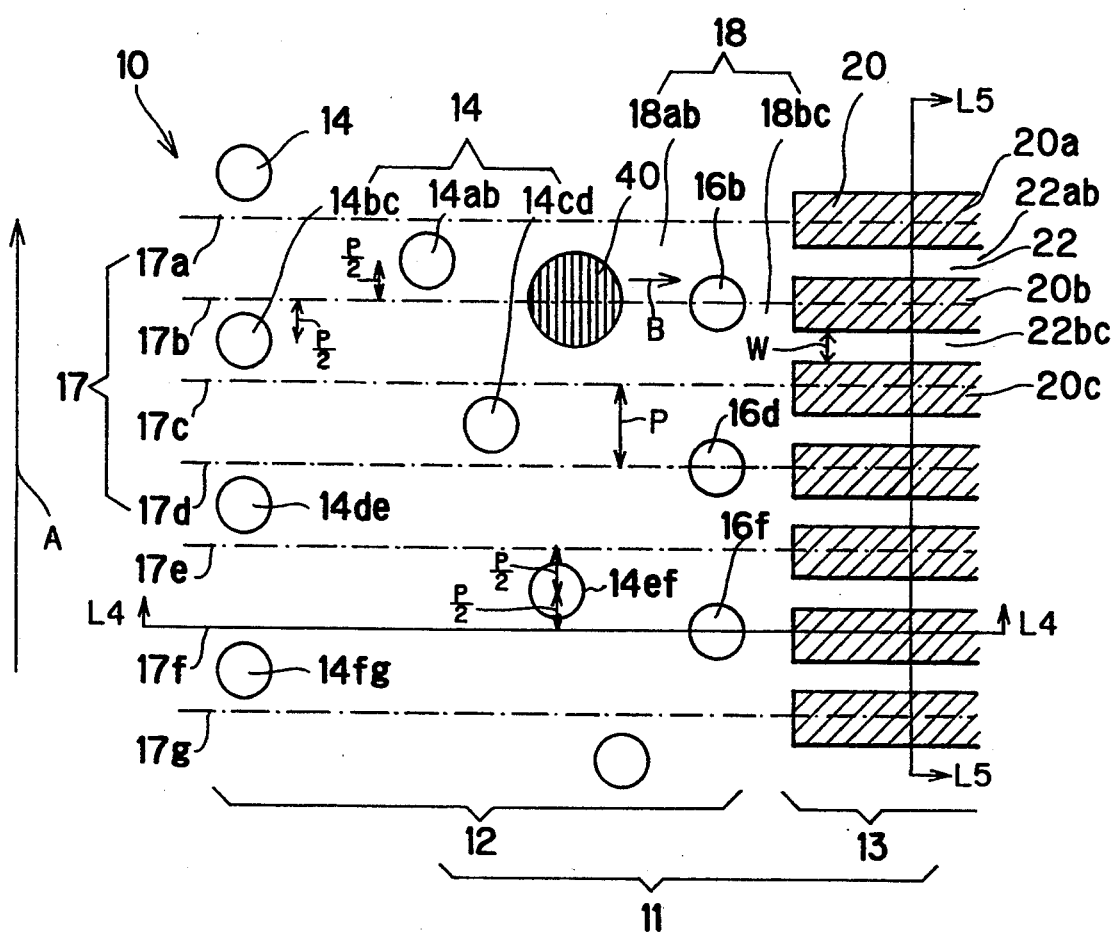
FIG. 3 is a plan view of an optical recording medium 10 according to a first preferred embodiment of the present invention.

FIG. 3 is a plan view of an optical recording medium 10 of the first embodiment of the present invention. The optical recording medium 10 includes a disk-shaped substrate in which tracks 17 are defined to extend in concentrical or spiral fashion around a center point (not shown in FIG. 3) of the disk-shaped substrate. It is noted that the center point of the disk-shaped substrate is positioned downwardly of the tracks 17 in FIG. 3. In other words, an upward direction indicated by arrow A in FIG. 3 extends along a radial direction of the disk-shaped optical recording medium 10 and indicate radially outward direction of the disk-shaped substrate. Track pitches, i.e., distances between respective two adjacent tracks 17 along the radial direction are equal to one another. The track pitch will therefore be referred to as a "track pitch P", hereinafter.

The optical recording medium 10 has a plurality of sector areas 11, each sector area 11 consisting of a servo area 12 adapted for a tracking servo operation and a data area 13 adapted for a data processing operation. The plurality of sector areas 11 are arranged along the tracks 17 in such a manner that the servo areas 12 and the data areas 13 are arranged alternately with each other along the track extending direction.

In the servo area 12 of each sector area 11, there are formed wobbling pits 14 and discrimination pits 16. The wobbling pits 14 are formed in the servo area 12 in such a manner that a single wobbling pit 14 is provided in a track-track between area 18 which is positioned between each two tracks 17 which are positioned adjacent to each other. More specifically to say, a wobbling pit 14 is provided between each two adjacent tracks 17 at such a position that a distance between a center of the wobbling pit 14 and one of the two adjacent tracks is equal to a distance between the center of the wobbling pit 14 and the other one of the two adjacent tracks. Accordingly, the distances between the wobbling pit 14 and the tracks 17 which sandwich therebetween the wobbling pit 14 is set to P/2. In other words, distances between each wobbling pit 14 and corresponding two tracks 17 which sandwich therebetween the each wobbling pit 14 is set to P/2.

For example, as shown in FIG. 3, a wobbling pit 14bc is formed in a track-track between area 18bc positioned between tracks 17b and 17c, at such a position that a distance between the wobbling pit 14bc and the track 17b and a distance between the wobbling pit 14bc and the track 17c are set to P/2. Similarly, a wobbling pit 14ab is placed in another track-track between area 18ab positioned between tracks 17a and 17b, at such a position that a distance between the wobbling pit 14ab and the track 17a and a distance between the wobbling pit 14ab and the track 17b are set to P/2. The wobbling pits 14ab and 14bc are positioned so as to sandwich the track 17b therebetween and are radially outwardly and inwardly apart from the track 17b with the same distance of P/2, respectively. A distance between the wobbling pits 14ab and 14bc along the track extending direction is set to a predetermined value. The wobbling pits 14ab and 14bc serve to cooperate with each other to be adapted for a tracking operation with respect to the track 17b.

In the similar manner as described above, a wobbling pit 14cd is placed between tracks 17c and 17d at such a position that a distance between the wobbling pit 14cd and the track 17c and a distance between the wobbling pit 14cd and the track 17d are both set to P/2. The wobbling pits 14bc and 14cd are positioned so as to sandwich the track 17c therebetween and are apart radially outwardly and inwardly from the track 17c with the same distance of P/2, respectively. A distance between the wobbling pits 14bc and 14cd along the track extending direction is set to another predetermined value. The wobbling pits 14bc and 14cd serve to cooperate with each other to be adapted for a tracking operation with respect to the track 17c.

As apparent from the above, the wobbling pit 14bc is adapted for the tracking operations both for the tracks 17b and 17c. Thus, each wobbling pit 14 positioned between corresponding two adjacent tracks is adapted for tracking operations with respect to both the corresponding two adjacent tracks.

It should be further noted that an address pit for supplying an address information, a clock pit for supplying a clock information and a sector mark pit for supplying an information of the sector area are also formed in the servo area 12, while those pits are not expressly illustrated in FIG. 3.

The discrimination pit 16 is formed on every other track 17. For example, though the tracks 17b and 17d are formed with the discrimination pits 16, the tracks 17a and 17c are not formed with the discrimination pits 16.

In the data area 13, there is formed a strip-shaped recording area 20 on each track 17. Each recording area 20 has a predetermined width and extends along the corresponding track 17. Areas 22 positioned between two adjacent strip-shaped recording areas 20 serve as non-recording areas in which data may not be recorded. Each of the non-recording areas 22 has a predetermined width W and extends along the track extending direction.

Figure 4:
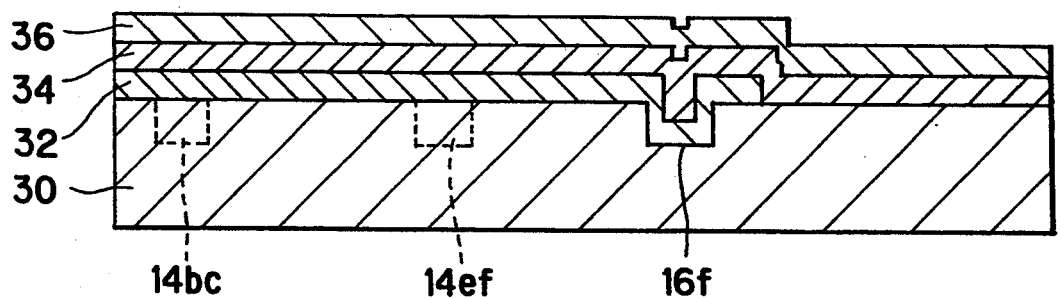
FIG. 4 is a cross-sectional side view of the optical recording medium 10 taken along a line L4—L4 of FIG. 3.

FIG. 4 is a cross-sectional side view taken along a line L4—L4 which extends along a track 17f in FIG. 3. As apparent from FIG. 4, each of the wobbling pits 14 and the discrimination pits 16 is a concave-shaped pit formed on a disk-shaped transparent substrate 30. On the transparent substrate 30, a metal film 32, a recording layer 34 and a protective layer 36 are provided in this order through a conventional thin film forming method such as a sputtering and vacuum deposition method.

FIG. 5 is a cross-sectional view taken along a line L5—L5 which extends along the radial direction of the recording medium 10 in FIG. 3. As apparent from FIG. 5, the metal film 32 is partly removed in the data area 13, through a photolithography process and an etching treatment which are conventionally well known. The metal film 32 is removed at the strip-shaped regions 20 each of which extends on the corresponding track 17 and has a predetermined width. It is possible to record data in the recording layer 34 through the substrate 30, at the strip-shaped areas 20 from which the metal film 32 is thus removed. Accordingly, the strip-shaped areas 20 serve as the recording areas 20 in which data can be recorded. On the other hand, it is impossible to record data in the recording layer 34 at the areas 22 where the metal film 32 remains. Accordingly, the regions 22 of the recording medium 10 on which the metal film 32 is left serve as the non-recording areas 22.

The transparent substrate 30 is formed of acrylic resin, polycarbonate resin, or glass. The metal film 32 is formed of metal such as Ta, Cr, Al, etc. The recording layer 34 is formed of rare earth transitional metal amorphous alloy such as TbFeCo, TbFe, GdTbFe, or a superlattice thin film constituted by multilayers of extremely thin films of Pt, Co, etc, in the case where the optical recording medium 10 serves as a magnetooptic disk. The protective layer 36 is formed of glass, transparent oxide material such as SiO$_2$, nitride material such as AlN, or other material. The protective layer 36 serves to prevent the recording layer 34 from being oxidized.

The sample-servo type tracking operation to be conducted for the above-described optical recording medium 10 of the present embodiment will be described below.

The optical recording medium 10 is rotated so that laser beam spot 40 irradiated on the optical recording medium 10 is moved relatively with respect to the optical recording medium 10 along the extending direction of the track 17 in a rightward direction as indicated by an arrow B in FIG. 3. The laser beam is reflected by the optical recording medium 10, and an intensity of the reflected laser beam is detected by a photo-detecting unit 50 provided in a sample-servo tracking circuit 49 shown in FIG. 7 which will be described later. In the case where the laser beam spot 40 is irradiated on the recording medium 10 at a portion where the wobbling pit 14 or the discrimination pit 16 is not formed, the intensity of the laser beam reflected from the recording medium is at a predetermined level (which will be referred to as a "background level" hereinafter). When the photo-detecting unit 50 detects that the intensity of the reflected light is the background level, it therefore outputs a signal representing the background level. In the case where the laser beam spot is irradiated onto the wobbling pit 14 or the discrimination pit 16, however, since the laser beam is diffracted by the wobbling pit or the discrimination pit, the intensity of the reflected laser beam is decreased from the background level. When the photo-detecting unit 50 detects that the intensity of the reflected light is thus decreased, the photo-detecting unit generates a signal representing the amount with which the intensity of the reflected laser beam is decreased from the background level. (The signal generated by the photo-detecting unit will therefore be referred to as an "intensity decreased amount representing signal", hereinafter.) Accordingly, the photo-detecting unit generates the intensity decreased amount representing signals W and D, at the time when the laser beam spot 40 reaches the positions where the wobbling pit 14 and the discrimination pit 16 are formed.

In order to perform the tracking operation with respect to the track 17b in FIG. 3, for example, the laser beam spot 40 is moved along the track 17b. In this case, the photo-detecting unit 50 generates the intensity decreased amount representing signals Wbc, Wab and Db at the time when the laser beam spot 40 reaches the wobbling pit 14bc, the wobbling pit 14ab and the discrimination pit 16b, respectively. In the case where the laser beam spot 40 is moved exactly on the track 17b, the values of the signals Wbc and Wab are equal to each other, as shown in FIG. 6(a), since the distance between the wobbling pit 14ab and the track 17b is equal to that between the wobbling pit 14bc and the track 17b.

In the case where the laser beam spot 40 is moved along a line which is positioned radially outwardly of the track 17b, i.e., along a line positioned above the track 17 in FIG. 3, the amount of the laser beam diffracted by the wobbling pit 14bc becomes smaller than that of the laser beam diffracted by the wobbling pit 14ab. Accordingly, the value of the signal Wbc becomes smaller than that of the signal Wab, as shown in FIG. 6(b). On the other hand, in the case where the laser beam spot 40 is moved along a line positioned radially inwardly of the track 17b, i.e., along a line positioned below the track 17b in FIG. 3, the amount of the laser beam diffracted by the wobbling pit 14bc becomes larger than that of the laser beam diffracted by the wobbling pit 14ab. Accordingly, the value of the signal Wbc becomes larger than that of the signal Wab, as shown in FIG. 6(c).

In order to perform the tracking operation witch respect to the track 17c, on the other hand, the laser beam spot 40 is moved along the track 17c. In this case, the photo-detecting unit 50 generates the intensity decreased amount representing signals Wbc and Wcd at the time when the laser beam spot 40 reaches the wobbling pits 14bc and 14cd, respectively. Since the track 17c is not provided with a discrimination pit 16, a signal corresponding to the signal Db shown in FIGS. 6(a)-(c) is not generated. In the case where the laser beam spot 40 is moved along a line which is positioned radially outwardly of the track 17c, i.e., along a line positioned above the track 17c in FIG. 3, the amount of the laser beam diffracted by the wobbling pit 14bc becomes larger than that of the laser beam diffracted by the wobbling pit 14cd. Accordingly the value of the signal Wbc becomes larger than that of the signal Wcd, as shown in FIG. 6(d). On the other hand, in the case where the laser beam spot 40 is moved along a line positioned radially inwardly of the track 17c, i.e., along a line positioned below the track 17c in FIG. 3, the value of the signal Wbc becomes smaller than that of the signal Wcd.

The tracking servo circuit of the present embodiment adapted for the tracking operation of the recording medium 10 will be described below with reference to FIG. 7. The tracking servo circuit 49 of the present embodiment processes the intensity decreased amount representing signals W and D generated by the photo-detecting unit 50, to perform a tracking servo operation.

The tracking servo circuit 49 of the present embodiment includes: the photo-detecting unit 50 for detecting intensity of the laser beam reflected from the optical recording medium 10 and for producing the intensity decreased amount representing signals W, D; an amplifier 52 connected to the photo-detecting unit 50 for amplifying the values of the intensity decreased amount representing signals W, D; first, second and third sample-and-hold circuit 56, 57 and 58 for sampling and holding the intensity decreased amount representing signals, the first sample-and-hold circuit 56 sampling the intensity decreased amount representing signal W which is first produced by the photo-detecting unit 50, holding it for a predetermined period of time and outputting it, the second sample-and-hold circuit 57 sampling the intensity decreased amount representing signal W which is second produced by the photo-detecting unit 50, holding it for another predetermined period of time and outputting it, the third sample-and-hold circuit 58 sampling the intensity decreased amount representing signal D which is third produced by the photo-detecting unit 50, holding it for another predetermined period of time, and outputting a signal of 1 in the case where the circuit 58 samples and holds the signal D and outputting a signal of 0 in the case where the circuit 58 does not sample the signal D; a timing signal generator 54 for generating timing signals based on clock pits formed on the recording medium 10 and supplying the first and second sample-and-hold circuits 56 through 57 with the timing signals; a differential amplifier 60 connected to the first and second sample-and-hold circuits 56 and 57 for outputting a differential signal representing a difference value between the values of the signals W and W which are first and second produced by the photo-detecting unit 50 to be sampled and held by the sample-and-hold circuits 56 and 57; an inverting amplifier 62 with a gain of 1 connected to the differential amplifier 60 for outputting an inverted differential signal representing an inverted value of the difference between the values of the signals W and W which are first and second generated by the photo-detecting unit 50; and a switching circuit 64 for selectively outputting either one of the differential signal outputted from the differential amplifier 60 and the inverted differential signal outputted from the inverted amplifier 62, dependently on the signal outputted from the third sample-and-hold circuit 58.

In the tracking servo circuit 49 with the above-described structure, the intensity decreased amount representing signals W and D generated by the photo-detecting unit 50 are amplified in the amplifier 52. For example, for the tracking operation with respect to the track 17b, the signals Wbc, Wab and Db are generated by the photo-detecting unit 50. The signals Wbc, Wab and Db are amplified in the amplifier 52. Thus amplified signals Wbc, Wab and Db are sampled in the first through third sample-and-hold circuits 56, 57 and 58, at respective timings determined dependently on the timing signals which are generated by the timing signal generator 54. Each of the sampled signals Wbc, Wab and Db is held for a corresponding period of time, in the corresponding one of the sample-and-hold circuits 56, 57 and 58. In other words, the signals which are generated first through third are sampled and held in the 56, 57 and 58, respectively.

The differential amplifier 60 generates a differential signal representing a difference between the values of the first and second generated signals W and W. The differential signal obtained by the differential amplifier 60 has a negative value, both in the case where the value of the signal Wbc is smaller than that of the signal Wab as shown in FIGS. 6(b) and in the case where the value of the signal Wbc is smaller than that of the signal Wcd as shown in FIG. 6(e). The differential signal obtained by the differential amplifier 60 has a positive value, both in the case where the value of the signal Wbc is larger than that of the signal Wab as shown in FIGS. 6(c) and in the case where the value of the signal Wbc is larger than that of the signal Wcd as shown in FIG. 6(d). The polarity of the differential signal therefore fails to discriminate between the state where the beam spot 40 is positioned radially outwardly of the track 17b and the state where the beam spot 40 is positioned radially inwardly of the track 17c. Furthermore, the polarity of the differential signal fails to discriminate between the state where the beam spot 40 is positioned radially inwardly of the track 17b and the state where the beam spot 40 is positioned radially outwardly of the track 17c. In order to discriminate between the above-described states, according to the tracking servo circuit 49 of the present embodiment, the signal Db is utilized, as will be described below.

According to the tracking servo circuit 49 of the present embodiment, the inverting amplifier 62 with a gain of 1 is provided for reversing polarities of the differential signals outputted from the amplifier 60, to thereby generate inversed differential signals. The switching circuit 64 switches to selectively output the differential signal or the inversed differential signal, dependently on the state whether or not the discrimination signal D is sampled and held in the third sample-and-hold circuit 58. More specifically to say, in the case where the discrimination signal D is sampled to be held in the sample-and-hold circuit 58, the sample-and-hold circuit 58 outputs a value of 1. In the case where the discrimination signal D is not sampled to be held in the sample-and-hold circuit 58, on the other hand, the sample-and-hold circuit 58 outputs a value of 0. The switching circuit 64 is designed to be switched to output the differential signal when the switching circuit 64 is supplied with a value of 1 from the sample-and-hold circuit 58, and is designed to be switched to output the inverted differential signal when the switching circuit 64 is supplied with a value of 0 from the sample-and-hold circuit 58.

With the above-described structure of the tracking servo circuit, when the tracking operation is achieved with respect to the track 17b, since the discrimination signal Db is sampled and held by the sample-and-hold circuit 58, the switching circuit 64 is switched so as to output the differential signal. Accordingly, the tracking servo circuit 49 issues a signal of a negative polarity in the case where the laser beam spot is positioned radially outwardly of the track 17b, and issues a signal of positive polarity in the case where the laser beam spot is positioned radially inwardly of the track 17b.

On the other hand, when the tracking operation is achieved with respect to the track 17c, since the track 17c is provided with no discrimination pit, no discrimination signal D is inputted into the sample-and-hold circuit 58. Accordingly, the switching circuit 64 is switched to output the inverted differential signal. In the case where the beam spot is positioned radially inwardly of the track 18c, although the differential signal outputted from the differential amplifier 60 has a negative polarity, the tracking servo circuit 49 issues an inverted differential signal which has a positive polarity. In the case where the beam spot is positioned radially outwardly the track 18c, although the differential signal outputted from the differential amplifier 60 has a positive polarity, the tracking servo circuit 49 issues an inverted differential signal which has a negative polarity.

As apparent from the above, the tracking servo circuit 49 of the present embodiment certainly issues a signal of negative polarity in the case where the beam spot is positioned radially outwardly of an objective track 17 subjected to a tracking operation, and issues a signal of positive polarity in the case where the beam spot is positioned radially inwardly of the objective track 17. Accordingly, the polarity of the signal outputted from the tracking servo circuit 49 thus properly represents a direction in which the laser beam spot 40 is shifted from the objective track. The value of the signal outputted from the tracking servo circuit 49 properly represents a shift amount with which the laser beam spot 40 is shifted from the objective track, since the gain of the inverting amplifier 62 is selected to a value of 1. Thus, the signal generated from the tracking servo circuit 49 serves as a tracking error signal representing the state how the laser beam spot is shifted from the objective track. An actuator or a servo motor for positioning an objective lens for condensing the laser beam onto the recording medium 10 is adjusted so that the tracking servo circuit 49 may output a signal having a value of 0, to thereby control the laser beam spot to move exactly on the track.

According to the present embodiment, the positions, the number and shapes of the discrimination pits 16 are not limited to those as described above.

For example, as shown in FIG. 8, the discrimination pit 16 may be provided on a track 17 at such a position that the discrimination pit 16 may be positioned in the track extending direction between two wobbling pits 14 and 14 which are provided in two adjacent track-track between areas 18 which are positioned to sandwich therebetween the track 17.

In FIG. 3, the discrimination pit 16 is positioned on a right side of the wobbling pits 14. In other words, the discrimination pit 16 is positioned rearwardly of the wobbling pits 114 with respect to the laser beam 40 which is moved relative to the recording medium 10 rightwardly so that the laser beam may reach the wobbling pits 14 before it reaches the discrimination pit 16. However, as shown in FIG. 8, the discrimination pit 16 may be positioned on a left side of the wobbling pits 14, i.e., forwardly of the wobbling pits 14 with respect to the laser beam 40 which is moved relative to the recording medium 10 rightwardly so that the laser beam may reach the discrimination pit 16 before it reaches the wobbling pits 14.

Furthermore, as shown in FIG. 10, the number of the discrimination pit 16 provided on one track 17 may be changed on every other track. More specifically to say, as shown in FIG. 10, one discrimination pit 70 may be provided on a track 17a, and two discrimination pits 70 and 71 may be provided on another track 17b which is positioned next to the track 17a. In this case, in the tracking servo circuit 49 shown in FIG. 7 of the present embodiment, the third sample-and-hold circuit 58 is replaced with a counter for counting the number of the discrimination pits 16 on each track. The discrimination pit 70 which is provided on each track 17 may also serve as a clock pit.

As shown in FIG. 11, each track 17 may be provided with two discrimination pits in such a manner that one track 17a is provided with discrimination pits 70 and 73 and another track 17b which is positioned next to the track 17a is provided with discrimination pits 70 and 72. The distance between the discrimination pits 70 and 73 along the track extending direction is different from that between the discrimination pits 70 and 72 along the track extending direction. In other words, each of the tracks may be provided with a pair of discrimination pits in such a manner that the distance between the pair of discrimination pits along the track extending direction is changed on every other track. In this case, in the tracking servo circuit 49 shown in FIG. 7 of the present embodiment, the third sample-and-hold circuit 58 is replaced with a detector for detecting the distance between the pair of discrimination pits.

The length of each discrimination pit 16 along the track extending direction is not limited to that as shown in FIGS. 3 through 11. However, the recording medium 10 of the present embodiment may be formed with a discrimination pit 81 having such a shape as shown in FIG. 12 which extends long in the track extending direction.

According to the present embodiment, positions, shapes, sizes or the like of the wobbling pits 14 are not limited to those as described above. For example, though a single one wobbling pit 14 is provided between each two adjacent tracks 17 in the above description, it is possible to provide a plurality of wobbling pits between each two adjacent tracks 17. As shown in FIG. 12, a plurality of wobbling pits 80 and 80' may be positioned between each two adjacent tracks 17 at the same position with respect to the track extending direction. In other words, the wobbling pits 80 and 80' may be arranged in line along the radial direction of the disk-shaped recording medium 10 between each two adjacent tracks 17. The plural pits 80 and 80' may be overlapped with each other as shown in FIG. 12. Or otherwise, the plural pits 80 and 80' may be positioned apart from each other along the radial direction of the disk-shaped recording medium 10. To summarize, according to the present embodiment, at least one wobbling pit may be provided between each two adjacent tracks.

The tracking servo circuit 49 of the present embodiment is not limited to that as shown in FIG. 7. The tracking servo circuit 49 may be designed as shown in FIG. 13 which is provided with a pair of differential amplifiers 92 and 93 for producing the differential signal and the inverted differential signal, respectively. To summarize, the tracking servo circuit of the present embodiment is designed so as to control the polarity of the tracking error signal dependently on the intensity decreased amount representing signal D generated based on the discrimination pit formed on the recording medium 10.

The second preferred embodiment of the present invention will be described below with reference to FIGS. 14 through 21.

According to the second embodiment, in order to discriminate between one track 17 and the other track 17 of each two adjacent tracks 17, the wobbling pits 14 are arranged such that the number of the wobbling pits 14 formed on two track-track between areas 18 which are arranged adjacent to each other with one track 17 of the each two adjacent tracks 17 sandwiched therebetween is different from the number of the wobbling pits 14 formed on two track-track between areas 18 which are arranged adjacent to each other with the other track 17 of the each two adjacent tracks 17 sandwiched therebetween.

More specifically to say, the number of the wobbling pits 14 formed on a track-track between area 18 is changed at every two track-track between areas 18.

Accordingly, the number of the intensity decreased amount representing signals W generated based on the wobbling pits 14 during a tracking operation for one track of the each two adjacent tracks 17 is made different from the the number of the intensity decreased amount representing signals W generated based on the wobbling pits 14 during a tracking operation for the other track of the each two adjacent tracks 17.

FIG. 14 is a plan view of the optical recording medium 110 of the second embodiment. In the servo area 12 of each sector area 11, there are formed wobbling pits 14. The wobbling pits 14 are formed in the servo area 12 in such a manner that a single wobbling pit 140 or a pair of wobbling pits 141 and 141' are provided between two adjacent tracks 17. Similarly as in the first embodiment, each of the wobbling pits 14 is positioned between corresponding two adjacent tracks 17 so that a distance between the wobbling pit and one track of the two adjacent tracks 17 is equal to a distance between the wobbling pit and the other track of the two adjacent tracks 17. In other words, the distances between a center of each wobbling pit 14 and the corresponding tracks 17 which sandwich the each wobbling pit therebetween are set to P/2, where the track pitch is defined as P.

For example, as shown in FIG. 14, there are formed a pair of wobbling pits 141bc and 141'bc in a track-track between area 18bc which is positioned between tracks 17b and 17c, at such positions that distances between the wobbling pits 141bc and 141'bc and the track 17b and distances between the wobbling pits 141bc and 141'bc and the track 17c are both set to P/2. The wobbling pits 141bc and 141bc' are apart from each other along a track extending direction, with a predetermined distance. Between tracks 17a and 17b, on the other hand, there is formed a single wobbling pit 140ab, at such a position that a distance between the wobbling pit 140ab and the track 17a and a distance between the wobbling pit 140ab and the track 17b are both set to P/2. The wobbling pit 140ab is positioned apart form the wobbling pits 141bc and 141bc' along a track extending direction, with another predetermined distance. The wobbling pits 141bc and 141'bc and 140ab are therefore positioned so as to sandwich the track 17b therebetween, and are radially inwardly and outwardly apart from the track 17b, respectively, with the same distance of P/2. Accordingly, the wobbling pits 141bc and 141'bc and 140ab will cooperate with one another to be adapted for a tracking operation with respect to the track 17b.

In the similar manner as described above, a pair of wobbling pits 141cd and 141'cd are placed in a track-track between area 18cd which is positioned between tracks 17c and 17d, at such positions that distances between the wobbling pits 141cd and 141'cd and the track 17c and distances between the wobbling pits 141cd and 141'cd and the track 17d are both set to P/2. Accordingly, the wobbling pits 141bc and 141'bc and 141cd and 141'cd are positioned so as to sandwich the track 17c therebetween and are radially outwardly and inwardly apart from the track 17c, respectively, with the same distance of P/2. The wobbling pits 141bc and 141'bc and 141cd and 141'cd will cooperate with one another to be adapted for a tracking operation with respect to the track 17c.

As apparent from the above, for example, the wobbling pits 141bc and 141'bc are adapted for the tracking operations with respect to both the tracks 17b and 17c. Similarly, the wobbling pit 140ab is adapted for the tracking operations with respect to both the tracks 17a and 17b. Thus, each of the wobbling pits 14 positioned between corresponding two adjacent tracks 17 are adapted for tracking operations with respect to both the corresponding two adjacent tracks 17.

The above-described wobbling pits 140 through 142 are arranged in the servo area 12 of the present enbodiment, as will be described below. As shown in FIG. 14, a single wobbling pit 140ab is provided at a track-track between area 18ab which is defined between two adjacent tracks 17a and 17b, two wobbling pits 141bc and 141'bc are provided at a track-track between area 18bc defined between two adjacent tracks 17b and 17c, two wobbling pits 141cd and 141'cd are provided at a track-track between area 18cd defined between two adjacent tracks 17c and 17d, a single wobbling pit 140de is provided at a track-track between area 18de defined between two adjacent tracks 17d and 17e, and a single wobbling pit 140ef is provided at a track-track between area 18ef defined between two adjacent tracks 17e and 17f. To summerize, the wobbling pits 14 are arranged in the track-track between areas 18 defined between two adjacent tracks 17, in such a manner that the number of the wobbling pits 14 provided on a track-track between area 18 is changed at every two track-track between areas 18.

FIG. 15 is a cross-sectional side view taken along a line L15—L15 which extends along a track 17f in FIG. 14.

The sample-servo type tracking operation to be conducted for the above-described optical recording medium 110 of the present embodiment will be described below.

Similarly as in the first embodiment, the optical recording medium 110 is rotated so that laser beam spot 40 irradiated on the optical recoring medium 110 is moved relatively with respect to the optical recording medium 110 along the extending direction of the track 17 in a rightward direction in FIG. 14. The laser beam is reflected by the optical recording medium 110, and an intensity of the reflected laser beam is detected by the photo-detecting unit 50 in a sample-servo tracking circuit 149 shown in FIG. 17 which will be described later. Similarly as in the above-described first embodiment, the photo-detecting unit 50 generates the intensity decreased amount representing signals W, at the time when the laser beam spot 40 reaches the wobbling pits 14.

Figure 16A:
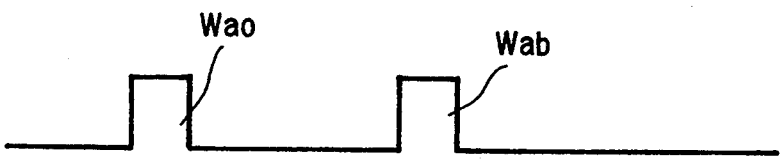

In order to perform the tracking operation with respect to the track 17a, for example, the laser beam spot 40 is moved along the track 17a. In this case, the photo-detecting unit 50 generates intensity decreased amount representing signals Wa0 and Wab at the time when the laser beam spot 40 reaches the wobbling pits 140a0 and 140ab, the wobbling pits 140a0 and 140ab being positioned so as to sandwich the track 17a therebetween. In the case where the laser beam spot 40 is moved exactly on the track 17a, the values of the signals Wa0 and Wab are equal to each other, as shown in FIG. 16(a).

Figure 16B:
Figure 16C:

In the case where the laser beam spot 40 is moved along a line which is positioned radially outwardly of the track 17a, i.e., along a line positioned above the track 17a in FIG. 14, the value of the signal Wa0 becomes larger than that of the signal Wab, as shown in FIG. 16(b). On the other hand, in the case where the laser beam spot 40 is moved along a line positioned radially inwardly of the track 17a, i.e., along a line positioned below the track 17a in FIG. 14, the value of the signal Wa0 becomes smaller than that of the signal Wab, as shown in FIG. 16(c).

Figure 16D:
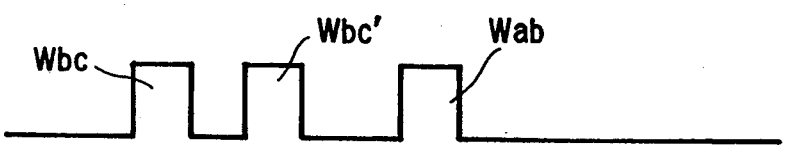

In order to perform the tracking operation with respect to the track 17b, on the other hand, the laser beam spot 40 is moved along the track 17b. In this case, the photo-detecting unit 50 generates the intensity decreased amount representing signals Wbc, Wbc' and Wab at the time when the laser beam spot 40 reaches the wobbling pits 141bc, 141'bc and 140ab, respectively. In the case where the laser beam spot 40 is moved exactly on the track 17b, the values of the signals Wbc and Wbc' become equal to the value of the signal Wab, as shown in FIG. 16(d).

Figure 16E:
Figure 16F:
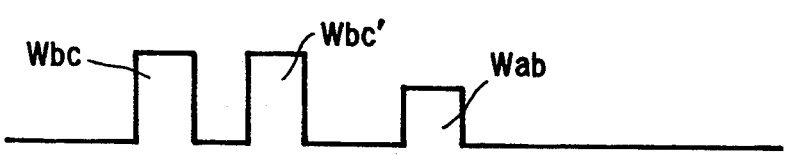

On the other hand, in the case where the laser beam spot 40 is moved along a line which is positioned radially outwardly of the track 17b, i.e., along a line positioned above the track 17b in FIG. 14, the values of the signals Wbc and Wbc' become smaller than the value of the signal Wab, as shown in FIG. 16(e). In the case where the laser beam spot 40 is moved along a line positioned radially inwardly of the track 17b, i.e., along a line positioned below the track 17b in FIG. 14, the values of the signal Wbc and Wbc' become larger than the value of the signal Wab, as shown in FIG. 16(f).

Figure 16G:
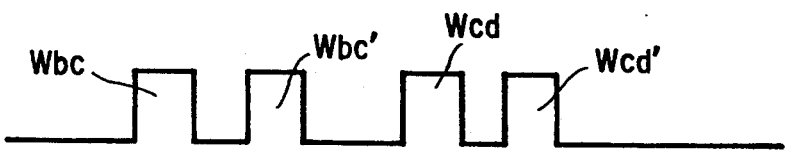

Similarly, in order to perform the tracking operation with respect to the track 17c, the laser beam spot 40 is moved along the track 17c. In this case, the photo-detecting unit 50 generates intensity decreased amount representing signals Wbc, Wbc', Wcd and Wcd' at the time when the laser beam spot 40 reaches the wobbling pits 141bc, 141'bc, 141cd and 141'cd, respectively. In the case where the laser beam spot 40 is moved exactly on the track 17c, the values of the signals Wbc and Wbc' become equal to those of the signals Wcd and Wcd', as shown in FIG. 16(g).

Figure 16H:
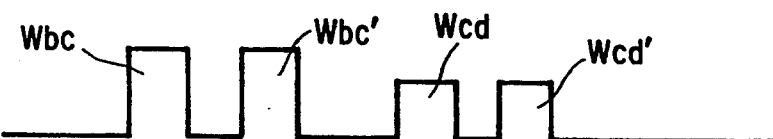
Figure 16I:
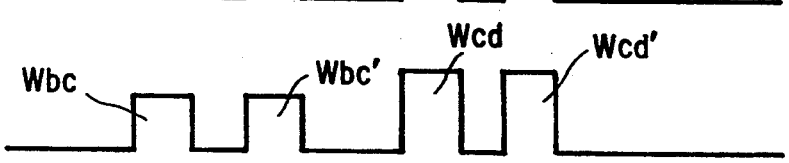

On the other hand, in the case where the laser beam spot 40 is moved along a line which is positioned radially outwardly of the track 17c, i.e., along a line positioned above the track 17c in FIG. 14, the values of the signals Wbc and Wbc' become larger than those of the signals Wcd and Wcd', as shown in FIG. 16(h). In the case where the laser beam spot 40 is moved along a line positioned radially inwardly of the track 17c, i.e., along a line positioned below the track 17c in FIG. 14, the values of the signals Wbc and Wbc' become smaller than those of the signals Wcd and Wcd', as shown in FIG. 16(i).

The tracking servo circuit 149 of the present embodiment adapted for the tracking operation of the above-described recording medium 110 will be described below with reference to FIG. 17. The tracking servo circuit 149 of the present embodiment processes the intensity decreased amount representing signals W generated by the photo-detecting unit 50 to perform a tracking servo operation.

The tracking servo circuit 149 is almost the same as that of the tracking servo circuit 49 of the first embodiment except the following point. In the tracking servo circuit 149 of the present embodiment, the third sample-and-hold circuit 58 in the tracking servo circuit 49 of the first embodiment is replaced with a counter 158 for counting the number of the intensity decreased amount representing signals W occurred during the tracking operation. In the case where the counter 158 detects that the number of the intensity decreased amount representing signals W is an even number, it outputs a signal of 0. In the case where the counter 158 detects that the number of the intensity decreased amount representing signals is an odd number, it outputs a signal of 1. The switching circuit 64 selectively outputs either one of the differential signal outputted from the differential amplifier 60 and the inverted differential signal outputted from the inverting amplifier 62, dependently on the signal outputted from the counter 158.

In the tracking servo circuit 149 with the above-described structure, the intensity decreased amount representing signals W generated by the photo-detecting unit 50 are amplified in the amplifier 52. For example, for the tracking operation with respect to the track 17a, the signals Wa0 and Wab are generated by the photo-detecting unit 50 at the time when the laser beam reaches the wobbling pits 140a0 and 140ab, respectively. The signals Wa0 and Wab are amplified in the amplifier 52. Thus amplified signals Wa0 and Wab are sampled in the first and second sample-and-hold circuits 56 and 57, at respective timings which are determined dependently on the timing signals generated by the timing signal generator 54. Each of the sampled signals Wa0 and Wab is held for a corresponding period of time, in the corresponding sample-and-hold circuit. The differential amplifier 60 generates a differential signal representing a difference between the values of the signals Wa0 and Wab.

Similarly as described above, for the tracking operation with respect to the track 17b, the signals Wbc, Wbc' and Wab are generated by the photo-detecting unit 50 at the time when the laser beam reaches the wobbling pits 141bc, 141'bc and 140ab, respectively. In this case, since the values of the signals Wbc and Wbc' are equal to each other, either one of the signals Wbc and Wbc' is sampled and held by the first sample-and-hold circuit 56. The differential amplifier 60 generates a differential signal representing a difference between the value of the one of the signals Wbc and Wbc' which is sampled and held by the sample-and-hold circuit 56 and the value of the signal Wab which is sampled and held by the sample-and-hold circuit 57.

Similarly as described above, for the tracking operation with respect to the track 17c, the signals Wbc, Wbc', Wcd and Wcd' are generated by the photo-detecting unit 50 at the time when the laser beam reaches the wobbling pits 141bc, 141'bc, 141cd and 141'cd, respectively. In this case, since the values of the signals Wbc and Wbc' are equal to each other, either one of the signals Wbc and Wbc' is sampled and held by the first sample-and-hold circuit 56. Similarly, since the values of the signals Wcd and Wcd' are equal to each other, either one of the signals Wcd and Wcd' is sampled and held by the second sample-and-hold circuit 57. The differential amplifier 60 generates a differential signal representing a difference between the value of the one of the signals Wbc and Wbc' which is sampled and held by the sample-and-hold circuit 56 and the value of the one of the signals Wcd and Wcd' which is sampled and held by the sample-and-hold circuit 57.

The differential signal obtained by the differential amplifier 60 has a positive value, both in the case where the value of the signal Wa0 is larger than that of the signal Wab as shown in FIGS. 16(b) and in the case where the value of the signals Wbc and Wbc' are larger than that of the signal Wab as shown in FIG. 16(f). The differential signal obtained by the differential amplifier 60 has a negative value, both in the case where the value of the signal Wa0 is smaller than that of the signal Wab as shown in FIGS. 16(c) and in the case where the values of the signals Wbc and Wbc' are smaller than that of the signal Wab as shown in FIG. 16(e). The polarity of the differential signal therefore fails to discriminate between the state where the beam spot 40 is positioned radially outwardly of the track 17a and the state where the beam spot 40 is positioned radially inwardly of the track 17b. In addition, the polarity of the differential signal fails to discriminate between the state where the beam spot 40 is positioned radially inwardly of the track 17a and the state where the beam spot 40 is positioned radially outwardly of the track 17b. In other words, the polarity of the differential signal fails to judge the direction in which the laser beam spot is shifted from a track.

In order to discriminate between the above-described states, according to the tracking servo circuit 149 of the present embodiment, the number of the signals W obtained during the tracking operation is utilized, as will be described below.

The tracking servo circuit 149 of the present embodiment is provided with the inverting amplifier 62 with a gain of 1 for reversing polarities of the differential signals outputted from the differential amplifier 60 to generate inverted differential signals, similarly as in the first embodiment. In addition, the tracking servo circuit 149 is provided with the counter 158. The counter 158 counts the number of the intensity decreased amount representing signals W outputted from the photo-detecting unit 50. The counter 158 outputs a signal of 0 in the case where the counted number of the signals W is an even number, and outputs a signal of 1 in the case where the counted number of the signals W is an odd number. The switching circuit 64 provided in the tracking servo circuit 149 switches to selectively output the differential signal or the inverted differential signal, dependently on the signal outputted from the counter 158. More specifically to say, the switching circuit 64 is so designed as to be switched to output the differential signal when the switching circuit 64 is supplied with a value of 0 from the counter 158 and to be switched to output the inverted differential signal when the switching circuit 64 is supplied with a value of 1 from the counter 158. The counter 158 preferably is a flip-flop serving as a binary counter. It is noted that the timing signal generator 54 also supplies a resetting pulse signal to the counter 158 before when the photo-detecting unit 50 generates the intensity decreased amount representing signals W, to thereby reset the flip-flop 158 in advance.

With the above-described structure of the tracking servo circuit 149, when the tracking operation is achieved with respect to the track 17a, since the signals Wa0 and Wab are generated by the photo-detecting unit 50, the number of the signals W counted by the counter 158 is 2, i.e., an even number. Accordingly, the counter 158 outputs a signal of 0, and the switching circuit 64 outputs a differential signal outputted from the differential amplifier 60. In the case where the laser beam spot 40 is moved along a line radially outwardly of the track 17a, since the differential signal is positive, as apparent from FIG. 16(b), the tracking servo circuit 149 issues a signal of a positive polarity. On the other hand, in the case where the laser beam spot 40 is moved along a line radially inwardly of the track 17a, since the differential signal is negative, as apparent from FIG. 16(c), the tracking servo circuit 149 issues a signal of a negative polarity.

When the tracking operation is achieved with respect to the track 17b, since the signals Wbc, Wbc' and Wab are generated by the photo-detecting unit 50, the number of the signals W counted by the counter 158 is 3, i.e., an odd number. Accordingly, the counter 158 outputs a signal of 1, and the switching circuit 64 outputs an inverted differential signal outputted from the inverting amplifier 62. In the case where the laser beam spot 40 is moved along a line radially outwardly of the track 17b, since the differential signal is negative, as apparent from FIG. 16(e), the tracking servo circuit 149 issues a signal of a positive polarity. On the other hand, in the case where the laser beam spot 40 is moved along a line radially inwardly of the track 17b, since the differential signal is positive, as apparent from FIG. 16(f), the tracking servo circuit 149 issues a signal of a negative polarity.

Similarly as described above, when the tracking operation is achieved with respect to the track 17c, since the signals Wbc, Wbc', Wcd and Wcd' are generated by the photo-detecting unit 50, the number of the signals W counted by the counter 158 is 4, i.e., an even number. Accordingly, the counter 158 outputs a signal of 0, and the switching circuit 64 outputs a differential signal outputted from the differential amplifier 60. In the case where the laser beam spot 40 is moved along a line radially outwardly of the track 17c, since the differential signal is positive, as apparent from FIG. 16(h), the tracking servo circuit 149 issues a signal of a positive polarity. On the other hand, in the case where the laser beam spot 40 is moved along a line radially inwardly of the track 17c, since the differential signal is negative, as apparent from FIG. 16(i), the tracking servo circuit 149 issues a signal of a negative polarity.

As apparent from the above, the tracking servo circuit 149 certainly issues a signal of positive polarity in the case where the beam spot is positioned radially outwardly of an objective track subjected to a tracking operation and issues a signal of negative polarity in the case where the beam spot is positioned radially inwardly of the objective track. The polarity of the signal outputted from the tracking servo circuit 149 therefore properly represents a direction in which the laser beam spot 40 is shifted from the objective track. The value of the signal outputted from the tracking servo circuit 149 properly represents a shift amount with which the laser beam spot 40 is shifted from the track, since the gain of the inverting amplifier 62 is 1.

The signal generated from the tracking servo circuit 149 therefore serves as a tracking error signal representing the state how the laser beam spot is shifted from the track. An actuator or a servo motor for positioning an objective lens for the laser beam is adjusted so that the tracking servo circuit 149 may output a signal having a value of 0, to thereby control the laser beam spot to move exactly along the track.

According to the present embodiment, positions, shapes, sizes, etc. of the wobbling pits 14 are not limited to those described above. The positions of the wobbling pits 14 defined along the track extending direction may be freely selected, if the number of the wobbling pits 14 provided in a track-track between area 18 is changed at every two track-track between areas 18. The positions of the wobbling pits 14 along the track extending direction are not particularly limited. For example, the pair of wobbling pits 141 and 141' may be positioned in a track-track between area 18 so that the distance between the wobbling pits 141 and 141' along the track extending direction may be made large, as shown in FIG. 18.

In order to easily detect sequence of the tracks 17, the wobbling pits 14 may be arranged in a predetermined pattern. For example, as also shown in FIG. 18, one of the pair of wobbling pits 14 to be provided in a track-track between area 18 may be placed at a position 172 and the other one of the pair of wobbling pits 14 may be placed at an either position within a region 172'. In this case, it is possible to detect which track 17 is now irradiated with the laser beam 40 during an access operation of the laser beam 40 toward a desired track, by detecting a period of time from the time when the signal W is generated by the wobbling pit 14 placed at the position 172 until the time when the signal W' is generated by the wobbling pit 14 placed at the region 172'.

The number of the wobbling pits 14 placed in a track-track between area 18 is not limited to those as described above. For example, as shown in FIG. 19, two or three wobbling pits 14 may be placed in a track-track between area 18. In this case, both the pair of wobbling pits 14 placed at the positions 173 and 173' and the pair of wobbling pits 14 placed at the positions 174 and 174' can be used for the sample servo tracking operation. Accordingly, in the case where either one of the wobbling pits 14 placed on the positions 173 and 173' has a defect and is unable to provide a signal W of a proper value, it is possible to perform the tracking operation with the use of the pair of wobbling pits 14 provided on the positions 174 and 174'. Similarly, in the case where either one of the wobbling pits 14 provided on the positions 174 and 174' has a defect and is unable to provide a signal W of a proper value, it is possible to perform the tracking operation with the use of the pair of wobbling pits 14 provided on the positions 173 and 173'.

In the above description, the wobbling pits 14 are arranged such that the number of the intensity decreased amount representing signals W to be obtained during a tracking operation for one track of each two adjacent tracks 17 may become an even number, and the number of the intensity decreased amount representing signals W obtained during a tracking operation for the other track of the each two adjacent tracks 17 may become an odd number. However, the wobbling pits may be arranged so that the even and odd number may not be produced for each two adjacent tracks, respectively. For example, each of the track-track between area 18ab positioned between the tracks 17a and 17b and the track-track between area 18bc positioned between the tracks 17b and 17c may be formed with two wobbling pits. Each of the track-track between area 18cd positioned between the tracks 17c and 17d and the track-track between area 18de positioned between the tracks 17d and 17e may be formed with four wobbling pits. Similarly, each of the track-track between areas 18ef and 18fg may be formed with two wobbling pits, and each of the track-track between areas 18gh and 18hi may be formed with four wobbling pits. To summarize, the number of the wobbling pits 14 provided in a track-track between area is changed between two and four, at every two track-track between areas. In this case, four signals W are generated during the tracking operation for the track 17b, six signals W are generated during the tracking operation for the track 17c, eight signals W are generated during the tracking operation for the track 17d, six signals W are generated during the tracking operation for the track 17e. In other words, during the tracking operation for either one of each two adjacent tracks 17, six signals W are obtained. Accordingly, it is possible to discriminate between the tracking operations for each two adjacent tracks 17, by detecting whether or not the number of the signals W generated in the tracking operation is six. More specifically to say, in the tracking servo circuit 149, the counter 158 is so designed as to detect whether or not the number of the signals W generated by the photo-detecting unit 50 is six and to control the switching circuit 64 based on the detected result.

Positions, shapes, sizes or the like of the wobbling pits 14 are not limited to those as described above. For example, there is provided a single wobbling pit 14 between each two adjacent tracks 17 at a single position with respect to the track extending direction in the above description. However, it is possible to provide a plurality of wobbling pits 14 between each two adjacent tracks 17, at the same or single position with respect to the track extending direction, as shown in FIG. 20. In other words, the plural pits 180 and 180' may be provided between two adjacent tracks to be arranged in line extending along the radial direction of the disk-shaped recording medium 110. In this case, the plural pits 180 and 180' may be overlapped with each other as shown in FIG. 20. Or otherwise, the plural pits 180 and 180' may be positioned apart from each other in the radial direction of the disk-shaped recording medium 110. To summerize, according to the present embodiment, at least one wobbling pit is provided between two adjacent tracks at a single position with respect to the track extending direction.

The tracking servo circuit 149 of the present embodiment is not limited to that as shown in FIG. 17. The tracking servo circuit may be designed as shown in FIG. 21 which is provided with a pair of differential amplifiers 192 and 193 for producing the differential signal and the inverted differential signal, respectively. To summerize, the tracking servo circuit of the present embodiment is designed so as to control the polarity of the tracking error signal, dependently on the number of the the intensity decreased amount representing signals W generated based on the wobbling pits formed on the recording meidum 10.

The third preferred embodiment of the present invention will be described below with reference to FIGS. 22 through 33.

According to the third embodiment, in order to discriminate between one track and the other track of each two adjacent tracks, the wobbling pits 14 are arranged such that a positional or a dimensional relationship in the first direction (track extending direction) between the wobbling pit 14 formed on one track-track between area 18 and the wobbling pit 14 formed on another track-track between area 18 which are arranged adjacent to each other with one track 17 of the each two adjacent tracks 17 sandwiched therebetween is different from a positional or a dimensional relationship in the first direction between the wobbling pit 14 formed on one track-track between area 18 and the wobbling pit 14 formed on another track-track between area 18 which are arranged adjacent to each other with the other track 17 of the each two adjacent tracks 17 sandwiched therebetween.

More specifically to say, the wobbling pits 14 are arranged so that a positional or a dimensional relationship in the first direction between a wobbling pit 14 formed on each track-track between area 18 and a wobbling pit 14 formed on a track-track between area 18 which is adjacent to the each track-track between area 18 with a track 17 sandwiched therebetween is different from a positional or a dimensional relationship in the first direction between the wobbling pit 14 formed on the each track-track between area 18 and a wobbling pit 14 formed on another track-track between area 18 which is adjacent to the each track-track between area 18 with another track 17 sandwiched therebetween.

Accordingly, a wave form of an intensity decreased amount representing signal S produced based on the wobbling pits 14 during a tracking operation for one track of the each two adjacent tracks 17 is made different from a wave form of the intensity decreased amount representing signal S produced based on the wobbling pits 14 during a tracking operation for the other track of the each two adjacent tracks 17. For example, either one of the intensity decreased amount signals S produced during the tracking operations for the each two adjacent tracks has a value corresponding to the background level.

FIG. 22 is a plan view of the optical recording medium 210 of the third embodiment. In the servo area 12 of each sector area 11, there are formed wobbling pits 14. The wobbling pits 14 are formed in the servo area 12 in such a manner that a single wobbling pit 14 is provided in a track-track between area 18 positioned between each two adjacent tracks 17. Similarly as in the first and second embodiments, each wobbling pit 14 is positioned between corresponding two adjacent tracks 17 so that a distance between a center of the wobbling pit and one track of the two adjacent tracks is equal to a distance between the center of the wobbling pit and the other track of the two adjacent tracks. In other words, the distances of each wobbling pit 14 between the corresponding tracks 17 which sandwich the each wobbling pit therebetween are set to P/2, where the track pitch is defined as P.

According to the third embodiment, for example, as shown in FIG. 22, for example, a wobbling pit 14ab provided between two adjacent tracks 17a and 17b and a wobbling pit 14bc provided between two adjacent tracks 17b and 17c are positioned so that the wobbling pits 14ab and 14bc may partly overlap with each other along the track extending direction. On the other hand, a wobbling pit 14cd provided between the two adjacent tracks 17c and 17d is positioned apart from the wobbling pit 14bc along the track extending direction, and therefore the wobbling pits 14bc and 14cd do not overlap with each other in the track extending direction. In other words, according to the present embodiment, a positional relationship along the track extending direction of two wobbling pits 14 which are positioned to sandwich therebetween a track 17 is changed at every other track.

The wobbling pits 14ab and 14bc are positioned to sandwich the track 17b therebetween, and are apart from the track 17b with the same distance of P/2. Accordingly, the wobbling pits 14ab and 14bc will be adapted for a tracking operation with respect to the track 17b. Similarly, the wobbling pits 14bc and 14cd are positioned to sandwich the track 17c therebetween and are apart from the track 17c with the same distance of P/2, and therefore the wobbling pits 14bc and 14cd will be adapted for a tracking operation with respect to the track 17c.

Accordingly, for example, the wobbling pit 14ab is adapted for the tracking operations both for the tracks 17a and 17b. Thus, each wobbling pit 14 positioned between corresponding two adjacent tracks 17 is adapted for tracking operations with respect to both the corresponding two adjacent tracks.

FIG. 23 is a cross-sectional side view taken along a line L23—L23 which extends along a track 17c in FIG. 22.

The sample-servo type tracking operation to be conducted for the above-described optical recording medium 210 of the present embodiment will be described below.

Similarly as in the first embodiment, the optical recording medium 210 is rotated so that laser beam spot 40 irradiated on the optical recoring medium 210 is moved relatively with respect to the optical recording medium 210 along the extending direction of the track 17 in a rightward direction in FIG. 22. Similarly as in the above-described first and second embodiments, the photo-detecting unit 50 in a tracking servo circuit 249 of the present embodiment which will be described later generates the intensity decreased amount representing signals S, at the time when the laser beam spot 40 reaches the wobbling pits 14.

In order to perform the tracking operation with respect to the track 17b, for example, the laser beam spot 40 is moved along the track 17b. In this case, as the laser beam spot 40 is moved along the track 17b, the beam spot is first irradiated onto the wobbling pit 14bc. Then, the beam spot is irradiated onto both the wobbling pit 14bc and 14ab, since the wobbling pits 14bc and 14ab are partly overlapped with each other along the track extending direction. Thereafter, the beam spot is irradiated only on the wobbling pit 14ab. Accordingly, the photo-detecting unit 50 generates an intensity decreased amount representing signal Sb which consists of three signal portions Wbc, Wabc and Wab, as shown in FIG. 24. The signal portion Wbc is generated during when the laser beam spot 40 is irradiated only on the wobbling pit 14bc. The signal portion Wabc is generated during when the laser beam spot 40 is irradiated both on the wobbling pit 14bc and on the wobbling pit 14ab. The signal portion Wab is generated during when the laser beam spot 40 is irradiated only on the wobbling pit 14ab. The value of the signal portion Wabc is larger than those of the signal portions Wbc and Wab, since the intensity of the reflected beam from the recording medium 210 obtained at the time when the beam is diffracted by both the wobbling pits 14bc and 14ab is made smaller than that of the reflected beam obtained at the time when the beam is diffracted only by the wobbling pit 14bc or 14ab.

In the case where the laser beam spot 40 is moved exactly on the track 17b, the values of the signal portions Wbc and Wab are equal to each other, as shown in FIG. 24(a). In the case where the laser beam spot 40 is moved along a line which is positioned radially outwardly of the track 17b, i.e., along a line positioned above the track 17b in FIG. 22, the value of the signal portion Wbc becomes smaller than that of the signal portion Wab, as shown in FIG. 24(b). On the other hand, in the case where the laser beam spot 40 is moved along a line positioned radially inwardly of the track 17b, i.e., along a line positioned below the center line of the track 17b in FIG. 22, the value of the signal portion Wbc becomes larger than that of the signal portion Wab, as shown in FIG. 24(c).

In order to perform the tracking operation with respect to the track 17c, the laser beam spot 40 is moved along the track 17c. In this case, the photo-detecting unit 50 generates an intensity decreased amount representing signal Sc which consists of three signal portions Wbc, Wbcd and Wcd, as shown in FIG. 24. The signal portion Wbc is generated during when the laser beam spot 40 is irradiated on the wobbling pit 14bc. The signal portion Wbcd is generated during when the laser beam spot 40 is irradiated on the recording medium 210 at a portion positioned between the wobbling pits 14bc and 14cd. Since the wobbling pits 14bc and 14cd are not overlapped with each other along the track extending direction, the value of the signal portion Wbcd is small to be at the background level. The signal portion Wcd is generated during when the laser beam spot 40 is irradiated on the wobbling pit 14cd.

In the case where the laser beam spot 40 is moved exactly on the track 17c, the value of the signal portion Wbc becomes equal to the value of the signal portion Wcd, as shown in FIG. 24(d). In the case where the laser beam spot 40 is moved along a line which is positioned radially outwardly of the track 17c, i.e., along a line positioned above the track 17c in FIG. 22, the value of the signal portion Wbc becomes larger than the value of the signal portion Wcd, as shown in FIG. 24(e). On the other hand, in the case where the laser beam spot 40 is moved along a line positioned radially inwardly of the track 17c, i.e., along a line positioned below the track 17c in FIG. 22, the value of the signal portion Wbc becomes smaller than the value of the signal portion Wcd, as shown in FIG. 24(f).

The tracking servo circuit of the present embodiment adapted for the tracking operation of the above-described recording medium 210 will be described below with reference to FIG. 25. The tracking servo circuit 249 of the present embodiment processes the intensity decreased amount representing signals W generated by the photo-detecting unit 50 to perform a tracking servo operation.

The tracking servo circuit 249 is almost the same as that of the tracking servo circuit 149 of the second embodiment except the following point. In the tracking servo circuit 249 of the present embodiment, the counter 158 in the tracking servo circuit 149 of the second embodiment is replaced with a background level detecting circuit 263 for detecting whether or not the value of the intensity decreased amount representing signal S generated by the photo-detecting unit 50 reaches the background level. In the case where the background level detecting unit 263 detects that the value of the intensity decreased amount representing signal S reach the background level, it outputs a signal of 1. In the case where the background level detecting unit 263 does not detect that the value of the intensity decreased amount representing signal S reaches the background level, it outputs a signal of 0. The switching circuit 64 selectively outputs either one of the differential signal outputted from the differential amplifier 60 and the inverted differential signal outputted from the inverting amplifier 62, dependently on the signal outputted from the background level detecting circuit 263.

In the tracking servo circuit 249 with the above-described structure, the intensity decreased amount representing signal portions W generated by the photo-detecting unit 50 are amplified in the amplifier 52. For example, for the tracking operation with respect to the track 17b, the signal portions Wbc, Wabc and Wab of the signal Wa generated by the photo-detecting unit 50 are amplified in the amplifier 52. Then, the amplified signal portions Wbc and Wab are sampled in the first and second sample-and-hold circuits 56 and 57, respectively, at respective timings which are determined dependently on timing signals generated by the timing signal generator 54. Each of the sampled signals Wbc and Wab is held for a corresponding period of time, in the corresponding sample-and-hold circuit. The differential amplifier 60 generates a differential signal representing a difference between the values of the signal portions Wbc and Wab.

Similarly as described above, for the tracking operation with respect to the track 17c, the signal portions Wbc and Wcd generated by the photo-detecting unit 50 and amplified in the amplifier 52 are sampled and held by the first and second sample-and-hold circuits 56 and 57. The differential amplifier 60 generates a differential signal representing a difference between the values of the signal portions Wbc and Wcd which are sampled and held by the sample-and-hold circuits 56 and 57.

The differential signal obtained by the differential amplifier 60 has a positive value, both in the case where the value of the signal portion Wbc is larger than that of the signal portion Wab as shown in FIGS. 24(c) and in the case where the value of the signal portion Wbc is larger than that of the signal portion Wab as shown in FIG. 24(e). The differential signal obtained by the differential amplifier 60 has a negative value, both in the case where the value of the signal portion Wbc is smaller than that of the signal portion Wab as shown in FIGS. 24(b) and in the case where the value of the signal portion Wbc is smaller than that of the signal portion Wcd as shown in FIG. 24(f). The polarity of the differential signal therefore fails to discriminate between the state where the beam spot 40 is positioned radially outwardly of the track 17b and the state where the beam spot 40 is positioned radially inwardly of the track 17c. In addition, the polarity of the differential signal fails to discriminate between the state where the beam spot 40 is positioned radially inwardly of the track 17b and the state where the beam spot 40 is positioned radially outwardly of the track 17c. In other words, the polarity of the differential signal fails to judge the direction in which the laser beam spot is shifted from the track.

In order to discriminate between the above-described states, according to the tracking servo circuit 249 of the present embodiment, the shape or wave form of the signal S obtained during the tracking operation is utilized, as will be described below.

The tracking servo circuit 249 of the present embodiment is provided with the inverting amplifier 62 with a gain of 1 for reversing polarities of the differential signals generated from the differential amplifier 60 to thereby generate inverted differential signals, similarly as in the first and second embodiments. In addition, the tracking servo circuit 249 is provided with the background level detecting circuit 263. The background level detecting circuit 263 detects whether or not the value of the intensity decreased amount representing signal S is lowered to reach the background level. The background level detecting circuit 263 outputs a signal of 1 in the case where it detects that the value of the intensity decreased amount representing signal S reaches the background level, and outputs a signal of 0 in the case where the value of the intensity decreased amount representing signal S does not reach the background level. The switching circuit 64 provided in the tracking servo circuit 249 switches to selectively output the differential signal or the inverted differential signal, dependently on the signal outputted from the background level detecting circuit 263. More specifically to say, the switching circuit 64 is so designed as to be switched to output the differential signal when the switching circuit 64 is supplied with a value of 0 from the background level detecting circuit 263 and to be switched to output the inverted differential signal when the switching circuit 64 is supplied with a value of 1 from the background level detecting circuit 263.

The background level detecting circuit 263 preferably includes a comparator 265 and a flip-flop 266, as shown in FIG. 26. In the comparator 265, a threshold having a value which is sufficiently lower than the values of any of the signal portions Wbc, Wab, Wabc and Wcd and is larger than the background level. The comparator 265 continues issuing a signal of 0, during when the value of the signal portion W is not lower than the threshold value. In this case, the flip-flop 266 continues issuing a signal of 0. At the time when the value of the signal portion W reaches the background level and becomes lower than the threshold value, the comparator outputs a signal of 1. The flip-flop 266 is therefore supplied with the signal of 1, so that the flip-flop 266 starts outputting a signal of 1. After when the flip-flop 266 thus starts outputting the signal of 1, even in the case where the value of the signal portion W again becomes higher than the threshold value and the comparator 265 again starts outputting a signal of 0, the flip-flop 265 continues outputting the signal of 1.

It is noted that the flip-flop 266 is previously supplied with a resetting signal from the timing signal generator 54 to be reset to issue a signal of 0, before when the photo-detecting unit 50 generates the intensity decreased amount representing signal S.

With the above-described structure of the tracking servo circuit 249, when the tracking operation is achieved with respect to the track 17*b*, since any of the signals Wbc, Wabc and Wab do not reach the background level, the background level detecting circuit 263 issues a signal of 0. Accordingly, the switching circuit 64 outputs a differential signal generated by the differential amplifier 60. In the case where the laser beam spot 40 is moved along a line radially outwardly of the track 17*b*, since the differential signal is negative, as apparent from FIG. 24(*b*), the tracking servo circuit 249 of the present embodiment issues a signal of a negative polarity. On the other hand, in the case where the laser beam spot 40 is moved along a line radially inwardly of the track 17*b*, since the differential signal is positive, as apparent from FIG. 24(*c*), the tracking servo circuit 249 of the present embodiment issues a signal of a positive polarity.

When the tracking operation is achieved with respect to the track 17*c*, on the other hand, since the signal portion Wbcd reaches the background level, the background detecting circuit 263 issues a signal of 1. Accordingly, the switching circuit 64 outputs an inverted differential signal generated by the inverting amplifier 62. In the case where the laser beam spot 40 is moved along a line radially outwardly of the track 17*c*, since the differential signal is positive, as apparent from FIG. 24(*e*), the tracking servo circuit 249 of the present embodiment issues a signal of a negative polarity. On the other hand, in the case where the laser beam spot 40 is moved along a line radially inwardly of the track 17*c*, since the differential signal is negative, as apparent from FIG. 24(*f*), the tracking servo circuit 249 of the present embodiment issues a signal of a positive polarity.

As apparent from the above, the tracking servo circuit 249 of the present embodiment certainly issues a signal of negative polarity in the case where the beam spot is positioned radially outwardly of an objective track subjected to a tracking operation and issues a signal of positive polarity in the case where the beam spot is positioned radially inwardly of the objective track. The polarity of the signal outputted from the tracking servo circuit 249 thus properly represents a direction in which the laser beam spot 40 is shifted from the objective track. The value of the signal outputted from the tracking servo circuit 249 properly represents a shift amount with which the laser beam spot 40 is shifted from the track center, since the gain of the inverting amplifier 62 is 1.

The signal generated from the tracking servo circuit 249 therefore serves as a tracking error signal representing the state how the laser beam spot is shifted from the track. An actuator or a servo motor for positioning an objective lens for the laser beam is adjusted so that the tracking servo circuit 249 may output a signal having a value of 0, to thereby control the laser beam spot to move exactly on the track.

As apparent from the above description, a main concept of the present embodiment is that the wobbling pits 14 are arranged so that the wave forms of the intensity decreased amount representing signal S obtained for each two adjacent tracks 17 may be made different from each other. Accordingly, the positions, shapes, sizes, etc. of the wobbling pits 14 are not limited to those as described above with reference to FIG. 22.

For example, as shown in FIG. 27, the lengths of the wobbling pits 14*ab*, 14*bc*, etc. along the track extending direction may be made different from one another. In this case, as shown in FIG. 27, the lengths of the wobbling pits 14*a*0, 14*bc* and 14*de* may be selected such that a length of the wobbling pit 14*a*0 is smaller than that of the wobbling pit 14*bc*, and the length of the wobbling pit 14*bc* is smaller than that of the wobbling pit 14*de*. In other words, the length of the wobbling pit 14 increases toward the center of the disk-shaped recording medium 210. In this case, it is possible to judge which track is now irradiated with the laser beam during an access operation of the laser beam toward a desired track, by detecting pulse widths of the signal portions W obtained from the wobbling pits.

Figure 29B:
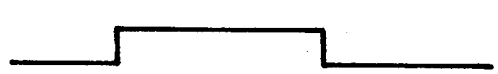

The positions of the wobbling pits 14 along the track extending direction is not limited to those as described above, but may be freely selected if the waveforms of the signals obtained from the wobbling pits for each two adjacent tracks are made different from each other. For example, as shown in FIG. 28, the length of the overlapping portion between the wobbling pits 14*a*0 and 14*ab* along the track extending direction may be different from the length of the overlapping portion of the wobbling pits 14*ab* and 14*bc*. In this case, during the tracking operation for the track 17*a*, the intensity decreased amount representing signal S as shown in FIG. 29(*a*) is obtained. During the tracking operation for the track 17*b*, on the other hand, the intensity decreased amount representing signal S as shown in FIG. 29(*b*) is obtained. Accordingly, by detecting whether or not the obtained pulse width is larger than a predetermined value, it is possible to discriminate one track from other track of each two adjacent tracks. To summarize, the length of the overlapping portion between two wobbling pits 14 which are arranged to sandwich a track therebetween may be changed for every other track.

Furthermore, as shown in FIG. 30, the wobbling pits 14 may be arranged so that a distance between two wobbling pits 14*ab* and 14*bc* along the track extending direction is made different from a distance between two wobbling pits 14*bc* and 14*cd* along the track extending direction. In other words, a distance between two wobbling pits arranged to sandwich a track therebetween may be changed for every other track. In this case, it is possible to discriminate between one track and the other track of each two adjacent tracks, by detecting a period of time from the time when a signal portion W is first detected until the time when a signal portion W is again detected and by judging whether or not the detected period of time is longer than a predetermined value.

In addition, though a single wobbling pit 14 is provided between each two adjacent tracks 17 in the above description, the number of the wobbling pits 14 provided between each two adjacent tracks is not limited to the above description. For example, as shown in FIG. 31, two wobbling pits 14 may be provided between each two adjacent tracks 17. In this case, the wobbling pits 14*ab* and 14*ab'* formed between the tracks 17*a* and 17*b* and the wobbling pits 14*bc* and 14*bc'* formed between the tracks 17*b* and 17*c* are arranged such that the wobbling pit 14*ab'* and the wobbling pit 14*bc* are positioned in line extending along the radial direction of the disk-shaped recording medium 210. On the other hand, the wobbling pits 14bc and 14bc' formed between the tracks 17b and 17c and wobbling pits 14cd and 14cd' formed between the tracks 17c and 17d are arranged such that any of the wobbling pits 14bc and 14bc' and any of the wobbling pits 14cd and 14cd' are not positioned in line along the radial direction. With such an arrangement of the wobbling pits, three pulses of signals are generated during the tracking operation of the track 17b, but four pulses of signals are generated during the tracking operation of the track 17c. Accordingly, it is possible discriminate between the tracks 17b and 17c. To summerize, positional relationship between wobbling pits positioned so as to sandwich a track therebetween may be changed at every other track.

Furthermore, though a single one wobbling pit 14 is provided between each two adjacent tracks 17 at a single position with respect to the track extending direction in the above description, it is possible to provide a plurality of wobbling pits between each two adjacent tracks 17, at the same position with respect to the track extending direction, as shown in FIG. 32. In other words, the plural pits 280 and 280' may be provided between each two adjacent tracks to be arranged in line along the radial direction of the disk-shaped recording medium 210. In this case, the plural pits 280 and 280' may be overlapped with each other as shown in FIG. 32. Or otherwise, the plural pits 280 and 280' may be positioned apart from each other in the radial direction of the disk-shaped recording medium 210. To summerize, according to the present embodiment, at least one wobbling pit is provided between each two adjacent tracks at a single position with respect to the track extending direction.

The tracking servo circuit 249 of the present embodiment is not limited to that as shown in FIG. 25. The tracking servo circuit may be designed as shown in FIG. 33 which is provided with a pair of differential amplifiers 292 and 293 for producing the differential signal and the inverted differential signal, respectively. To summerize, the tracking servo circuit 249 of the present embodiment is designed so as to control the polarity of the tracking error signal, dependently on the wave form of the the intensity decreased amount representing signal S generated based on the wobbling pits.

For recording data onto the recording medium 10, 110 and 210 of the above-described embodiments, at the track 17b for example, in the case where the recording layer 34 is formed of magnetooptic material, as shown in FIG. 5, laser beam 40 having a predetermined output or intensity is applied through the substrate 30 onto the recording layer 34 at the recording area 20b corresponding to the track 17b, to thereby heat the recording layer 34. Simultaneously with the irradiation of the laser beam 40 onto the recording layer 34, magenetic field is applied to the recording layer 34 at the recording area 20b for aligning magnetizing direction. Thereafter, the applied magnetic field direction is reversed, and the laser beam 40 which is now modulated in accordance with information to be recorded to the recording medium 10 (110, 210) is irradiated onto the recording layer 34 to heat it. As a result, the magnetizing direction is inverted in the recording area 20b in accordance with the modulated laser beam 40, so that a bit 68 is formed in the recording layer 34 on the recording area 20b, as shown in FIG. 34.

It should be noted that the non-recording areas 22ab and 22bc which are positioned between two adjacent recording areas 20a and 20b and between two adjacent recording areas 20b and 20c, respectively are also irradiated with the laser beam 40 to be heated, as shown in FIG. 5. However, since the metal film 32 is provided under the recording layer 34, at the non-recording areas 22ab and 22bc, the recording layer 34 at the non-recording areas 22ab and 22bc provides a small temperature elevation. In addition, the metal film 32 provided at the non-recording areas 22ab and 22bc prevent heat generated in the recording layer 34 at the recording area 20b from being transmitted or conducted to the recording areas 20a and 20c of the recording layer 34. Accordingly, increase in the bit area 68 can be retrained, and the width of the bit area 68 can be made equal to a width of the recording area 20, as shown in FIG. 34. Thus, the data is prevented from being recorded in the recording layer 34 at the non-recording area 22.

Especially, according to the present invention, as shown in FIG. 34, a total width (P+W) of the track pitch P and the width W of the non-recording area 22 is preferably set to be approximately equal to the spot diameter d of the laser beam 40. When the laser beam 40 is irradiated for data reproduction operation onto a recording area 20 formed on each track 17, the laser beam 40 can be prevented from being erroneously partly irradiated onto recording area 20 formed on tracks 17 which are positioned next to the each track, as shown in FIG. 34. Accordingly, it is possible to make the track pitch P smaller than the laser spot diameter d to achieve high density recordation, while avoiding increase in cross-talk.

According to the present invention, since the wobbling pits 14 (and the discrimination pits 16) are arranged as described above, it becomes possible to perform a stable tracking operation even in the case where the track pitch P is decreased to attain a high density recordation. Accordingly, it becomes possible to provide such an optical recording medium as restraining increase in cross-talk while achieving high density recordation.

As apparent from the above, a main concept of the present invention is directed to the arrangement of the wobbling pits 14 (and the discrimination pits 16) in the servo area 12. In the above-described embodiments, the pit arrangement of the present invention is applied to one type of optical recording medium expressly shown in FIGS. 4, 5, 15 and 23.

However, the pit arragement of the present invention can be applicable to other types of optical recording medium having the various types of structure, as follows:

(1) For example, the method of producing the non-recording area 22 at a position between each two adjacent tracks 17 so that the non-recording area 22 may have a width of the predetermined value W is not limited to that as described in the above-described embodiments. For example, as shown in FIGS. 35 and 36, a strip-shaped metal film 84 with its width having the predetermined value W may be provided on the substrate 30 at a position between each two adjacent tracks 17, and then the recording layer 34 may be provided on the substrate 30 in such a manner that the metal film 84 is sandwiched between the substrate 30 and the recording layer 34. Though FIG. 35 shows the present modification to which applied is the pit arrangement of the first embodiment, FIGS. 37 and 38 show the present modification to which applied are the pit arrangements of the second and third embodiments.

(2) The wobbling pit 14 (and the discrimination pit 16) are not limited to the concave-shaped or convex-shaped pit formed on the substrate 30. The wobbling pit 14 (and the discrimination pit 16) may be a convex-shaped pit formed on the substrate 30. Furthermore, as shown in FIG. 36, a pit 86 made of metal film (light reflective material film) such as Al, Ta, Cr or the like may be formed on the substrate 30, for each of the wobbling pit 14 (and the discrimination pit 16). In this case, it is preferable to provide a protective layer 88 between the metal film 86 and the recording layer 34 so that the laser beam irradiated onto the recording medium 10 may be effectively diffracted by the pit 86. The wobbling pit 14 (and the discrimination pit 16) made of the metal film pit 86 are suitable for the substrate 30 made of glass, since it is difficult to perform injection molding operation onto the glass substrate. In other words, in the case where the wobbling pit 14 (and the discrimination pit 16) are formed of the metal film pits 86, it is possible to easily form the wobbling pit and the pit discrimination pit even on the substrate 30 made of glass. It should be further noted that another protective layer may be provided between the substrate 30 and the film pit 86.

(3) The present embodiment is applicable to an optical recording medium of a type such as CD-ROM exclusively used for data reproduction. In this case, as shown in FIGS. 39, 40 and 41, an information may be previously recorded in the data area 13 in the form of pits 90.

(4) Though the recording layer 34 of the above-described embodiments is formed of magnetooptic material, the material of the recording layer 34 is not limited to the magnetooptic recording material. As the material of the recording layer 34, organic pigment, pit-formable material such as Te, and phase-changeable material such as GeteSb may be applied. The protective layer 36 may be covered with a reflective layer formed of metal such as Al. Materials and thickness of the substrate 30, the metal film 32, the protective layer 36 and the reflective layer are not limited to those as described in the above-described embodiments. Thickness of the recording layer 34 is not limited to particular value.

(5) The depth of the concave-shaped wobbling pit 14 is not particularly defined or limited. The protective layer 36 is unnecessarily provided. It is possible to eliminate the protective layer 36 from the recording medium. It is preferable that the metal film 32 and the recording layer 34 have reflectivies with their values being equal to each other. However, the values of the reflectivities of the metal film 32 and the recording layer 34 may be different from each other.

(6) A protective layer may be provided between the recording layer 34 and the metal film 32 or between the metal film 32 and the substrate 30.

(7) According to the above-described embodiments, the track pitch P is set to the fixed value of P. However, the track pitch may be changed in accordance with the positions of the tracks. According to the above-described embodiments, the width of each recording area 20 is set to the fixed value. However, the recording area width may also be changed in accordance with the position of the track on which the recording area is formed. For example, the recording medium may be formed such that the recording area width and the track pitch P determined for each track may be increased toward the center position of the disk-shaped optical recording medium. In such a case, it is unnecessary to provide the wobbling pit 14 between each two adjacent tracks such that the distances between the wobbling pit and the two tracks may be equal to each other. The wobbling pit 14 may be positioned between each two adjacent tracks such that the distances between the wobbling pit and the two tracks may be different from each other.

(8) The non-recording area 22 may be provided not only in the data area 13 but also in the servo area 12 in such a manner that the non-recording area 22 in the servo area 12 may be continuously formed with that in the data area 13.

(9) The configuration of the optical recording medium 10 is not limited to a disk or circular shape. In the case where the optical recording medium of the above-described embodiments is applied to an optical card, for example, the non-recording areas 22 and the recording areas 20 may linearly extend along the tracks.

(10) FIGS. 42 through 51 show another type of optical recording medium 310 to which applied is the pit arrangement of the present invention. FIGS. 42 through 50 show the optical recording medium of the type to which the pit arrangement of the first embodiment is applied, and FIG. 51 shows the optical recording medium of the type to which the pit arrangement of the second embodiment is applied. As apparent from FIGS. 43 and 44, the optical recording medium 310 of the present modification includes the substrate 30 and a protective layer 336, the recording layer 34, a plurality of strip-shaped heat-absorbing films 322 and the protective layer 36 which are provided on the substrate 30 in this order, through the thin film forming method such as the sputtering method or vacuum deposition method, as in the above-described embodiments. In other words, the heat-absorbing films 322 are provided on a surface of the recording layer 34 which is opposite to a surface of the recording layer 34 which confronts the substrate 30 through the protective layer 336.

Each of the wobbling pits 14 and the discrimination pits 16 is a concave-shaped pit formed on the disk-shaped transparent substrate 30.

The strip-shaped heat-absorbing film 322 with its width having the predetermined value W is formed on the recording layer 34 in the data area 13, at the non-recording areas 22 each of which is defined between each two adjacent tracks 17. The strip-shaped heat-absorbing film 322 is formed on the recording layer 34, through photolithography method and the etching treatment method which are conventionally well known. The strip-shaped heat-absorbing film 322 is provided between each two adjacent tracks 17 at such a position that a distance between the film 322 and one of the two adjacent tracks is equal to the distance between the film 322 and the other one of the two adjacent tracks.

The heat-absorbing film 322 is made of material with its heat capacity having a large value. The heat-absorbing film 322 is preferably made of metal such as Ta, Cr, Al, etc. The material of the protective layer 336 is the same as that of the protective layer 36, and therefore serves to prevent the recording layer 34 from being oxidized. The strip-shaped heat-absorbing film 322 serves as the non-recording area 22, as will be described in detail below.

For recording data onto the recording medium 310 of the present modification, in the case where the recording layer 34 is formed of magnetooptic material, for example, as shown in FIG. 45, laser beam 40 having a predetermined output or intensity is applied through the substrate 30 onto the recording layer 34, to thereby heat the recording layer 34. Simultaneously with the irradiation of the laser beam 40 onto the recording layer 34, magenetic field is applied to the recording layer 34 for aligning magnetizing direction thereof. Thereafter, the applied magnetic field direction is reversed, and the laser beam 40 which is now modulated in accordance with information to be recorded to the recording medium 310 is irradiated onto the recording layer 34 to heat the recording layer 34. As a result, the magnetizing direction is inverted in the recording layer in accordance with the modulated laser beam 40, so that a bit 68 is formed in the recording layer 34. In this case, the temperature of the bit portion 68 is elevated to high temperature, and heat generated in the bit portion 68 is transmitted or conducted to portions 369 and 369' of the recording layer 34 which are positioned adjacent to the bit portion 68. Furthermore, as apparent from FIG. 45, the laser beam 40 is irradiated not only on the bit portion 68 but also on the portions 369 and 369' which are positioned adjacent to the bit portion 68. Accordingly, the portions 369 and 369' are supplied with heat not only from the bit portion 68 but also directly from the laser beam spot 40. According to the present modification, however, the heat generated in the portions 369 and 369' is absorbed by the heat-absorbing films 322 which are provided on the portions 369 and 369', since the heat-absorting films 322 have a thermal conductivity of large value. Accordingly, the temperature elevation occurred in the portions 369 and 369' is made small, and therefore the bit portion 68 does not spread over the portions 369 and 369'. Thus, increase in the bit area 68 can be effectively restrained, and the width of the bit area 68 is made equal to the width of the area defined between the two strip-shaped heat-absorbing films 322 and 322 positioned adjacent to each other. The area defined between each two adjacent strip-shaped heat-absorting films 322 therefore serves as the recording area 20 shown in FIG. 42.

More specifically to say, as shown in FIG. 46, the width of the bit portion 68 is made equal to the width of the recording area 20. In this case, a total width (P+W) of the track pitch P and the width W of the heat-absorbing film 322 is preferably set to be approximately equal to the spot diameter d of the laser beam 40. Accordingly, when the laser beam 40 is irradiated or data reproduction operation onto each track 17, it is possible to prevent the laser beam 40 from being erroneously partly irradiated onto adjacent tracks which are positioned next to the each track. Thus, it is possible to make the track pitch P smaller than the laser spot diameter d to achieve high density recordation, while avoiding increase in cross-talk.

The above-described heat-absorbing film 322 may be formed between the substrate 30 and the recording layer 34 and between the protective layer 336 and the recording layer 34. The heat-absorbing film 322 may be formed of a thin film of diamond which has a high thermal conductivity.

As shown in FIG. 47, a protective layer 370 may be provided between the recording layer 34 and the heat-absorbing film 322. In the case where the protective layer 370 is sufficiently thin, the protective layer 370 can effectively transmit or conduct heat from the recording layer 34 to the heat-absorbing film 322. The protective layer 370 can prevent the recording layer 34 from being oxidized or damaged during when the heat-absorbing film 322 is formed on the protective layer 370.

Though the heat-absorbing film 322 is provided only at a position defined between each two adjacent tracks 17 in the above description, the heat-absorbing film 322 may be provided on entire surface of the data area 13, as shown in FIG. 48. In this case, the thickness of the heat-absorbing film 322 may be changed so that the thickness is small on portions 75 corresponding to the recording areas 20 and the thickness is large on portions 76 corresponding to the non-recording areas 22. The heat-absorbing film 322 thus provided on the recording layer 34 also serves to protect the recording layer 34. The cross-sectional shape of the heat-absorbing layer 322 is not limited to that as shown in FIG. 48. For example, the thickness of the heat-absorbing layer 322 may be continuously changed, although the thickness is discontinuously changed in FIG. 48.

The cross-sectional shape of the strip-shaped heat-absorbing film 322 may be freely selected. For example, as shown in FIGS. 49(a), the thickness of the heat-absorbing film 322 may be continuously changed so that the thickness may be the largest at a center portion of the heat-absorbing film. As shown in FIGS. 49(b), the thickness of the heat-absorbing film 322 may be continuously changed so that the thickness may be the smallest at a center portion of the heat-absorbing film. Or otherwise, as shown in FIG. 49(c), each heat-absorbing film 322 consists of a plurality of heat-absorbing films 380a through 380c.

As shown in FIG. 50(a), instead of providing the heat-absorbing film 322 on the recording medium 310, the thickness of the recording layer 34 may be changed so as to be small at portions 383 corresponding to the recording areas 20 and to be large at portions 384 corresponding to the non-recording areas 22. In this case, it becomes unnecessary to provide the heat-absorbing film 322 on the recording medium 310. The cross-sectional shape of the recording layer 34 is not particularly limited to that as shown in FIG. 50(a). For example, the thickness of the recording layer 34 may be continuously changed, as shown in FIG. 50(b).

FIG. 51 shows the state where the present modification is applied to the second embodiment of the present invention. Though the state where the present modification is applied to the third embodiment is not expressly shown by the drawings, it will be apparent to one skilled in the art.

(11) FIGS. 52 through 63 show another type of optical recording medium to which applied is the pit arrangement of the present invention. FIGS. 52 through 63 show the optical recording medium of the type to which the pit arrangement of the first embodiment is applied, for example. As apparent from FIGS. 53 and 54, the optical recording medium 410 of the present modification includes the substrate 30 and the protective layer 336, the recording layer 434, the protective layer 36 and a reflective layer 422 which are provided on the substrate 30 in this order, through the thin film forming method such as the sputtering method or vacuum deposition method, as in the above-described embodiments.

Each of the wobbling pits 14 and the discrimination pits 16 is a concave-shaped pit formed on the disk-shaped transparent substrate 30.

The recording layer 434 is sufficiently thin so that light beam may transmit therethrough. In other words, the thickness of the recording layer 434 is selected to such a value that the recording layer 434 may have a light transmittance of high value.

The reflective layer 422 is provided on the protective layer 36. The reflection layer 422 is partly removed at the data area 13, as shown in FIGS. 53 and 54, through the well known photolithography and etching treatment methods. In other words, the reflection layer 422 is partly removed, so that the protective layer 36 is exposed outside at a strip-shaped portion 22 which is positioned between each two adjacent tracks 17 and has a predetermined value of width W. The reflective layer 422 is made of metal such as Ta, Cr, Al, etc.

The strip-shaped portion 22 from which the reflective layer 422 is removed serves as the non-recording area 22, as will be described below. For recording data onto the recording medium 410 of the present modification, in the case where the recording layer 434 is formed of magnetooptic material, for example, as shown in FIG. 55, laser beam 40 having a predetermined output or intensity is applied through the substrate 30 onto the recording layer 434, to thereby heat the recording layer 434. Simultaneously with the irradiation of the laser beam 40 onto the recording layer 434, magenetic field is applied to the recording layer 434 for aligning magnetizing direction thereof. Thereafter, the applied magnetic field direction is reversed, and the laser beam 40 which is now modulated in accordance with information to be recorded to the recording medium 410 is irradiated onto the recording layer 434 to heat the recording layer 434. As a result, the magnetizing direction is inverted in the recording layer in accordance with the modulated laser beam 40, so that a bit 68 is formed in the recording layer 434. In this case, the temperature of the bit portion 68 is elevated to high temperature, and the heat generated in the bit portion 68 is transmitted to portions 469a and 469b of the recording layer 434 which are positioned adjacent to the bit portion 68. In addition, as apparent from FIG. 55, the laser beam 40 is irradiated not only on the bit portion 68 but also on the portions 469a and 469b positioned adjacent to the bit portion 68. Accordingly, the portions 469a and 469b are supplied with heat not only from the bit portion 68 but also directly from the laser beam 40. Accordingly, the bit portion 68 spreads over the portions 469a and 469b.

As shown in FIG. 55, a part of the laser beam 40 irradiated on the recording layer 434 is reflected by the recording layer 434, but almost all of the laser beam 40 is transmitted through the recording layer 434. The laser beam thus transmitted through the recording layer 434 is partly reflected by the reflection layer 422 to form a reflection laser beam 470. More specifically to say, a part of the laser beam 40 irradiated onto the track 17 and the vicinity thereof is reflected by the remaining reflection layer 422, to form the reflection beam 470. On the other hand, a remaining part of the laser beam which is irradiated onto the area 22 from which the reflection layer 422 is removed is not reflected toward the substrate 30, as indicated by the numeral 471 in FIG. 55. Accordingly, the width of the bit portion 68 thus formed in the recording layer 434 becomes larger than the width of the reflection layer 422.

In order to reproduce the bit portion 68 thus formed on a track 17, as shown in FIG. 56, the laser beam 40 is irradiated on the bit portion 68. In this case, as shown in FIG. 56, the laser beam 40 is partly irradiated on a bit portion 68' formed on a track 17' which is positioned next to the track 17 on which the objective bit portion 68 is formed. In this case, according to the present modification, a total width (P+W) of a track pitch P and the width W of the area 22 from which the reflection layer 422 is removed is set to be approximately equal to or larger than the spot diameter d of the laser beam 40. Accordingly, as apparent from FIG. 56, the laser beam 40 is irradiated only on a portion 469a' of the bit portion 68' from which the reflection layer 422 is removed. Accordingly, the part of the laser beam 40 irradiated on the portion 469a' of the bit portion 68' is not reflected by the reflective layer 422. In this respect, it should be noted that the laser beam 40 irradiated onto the recording medium 410 at the portion 469a' is partly reflected by a surface of the recording layer 434, but the intensity of the beam reflected from the recording layer surface is quite small relative to that of the laser beam which is irradiated onto the bit portion 68 and is reflected by the reflection layer 422. Accordingly, for reproducing data recorded on each track 17, it is possible to prevent the laser beam 40 from erroneously reading out the information recorded on neighboring tracks, and therefore it is possible to decrease a cross-talk. Thus, in this case, it is possible to make the track pitch P smaller than the laser spot diameter d to achieve high density recordation, while avoiding increase in cross-talk.

As shown in FIG. 57, the reflective layer 422 may be provided directly on the recording layer 434. The reflective layer 422 may be covered with a protective layer 473. In this case, heat generated in the recording layer 434 based on the laser beam irradiated thereon is absorbed by the reflective layer 422, to thereby restrain increase in bit formation 68.

Though the reflective layer 422 is removed at a region 22 positioned between each two adjacent tracks 17 in the above description, the reflective layer 422 may be provided on entire surface of the data area 13, as shown in FIG. 58. In this case, the thickness of the reflective layer 422 may be changed so that the thickness is considerably small on a region 475 corresponding to the non-recording region 22 and the thickness is large on a region 476 positioned on each track 17 and the vicinity thereof. The reflective layer 422 at the region 475 with the thickness being thus very small has a small light reflectivity. The reflective layer 422 thus provided on the recording layer 434 serves to protect the recording layer 434. The cross-sectional shape of the reflective layer 422 is not limited to that shown in FIG. 58. For example, the thickness of the reflective layer 422 may be continuously changed, although the thickness is discontinuously changed in FIG. 58.

The cross-sectional shape of the reflective layer 422 which is partly removed at the areas 22 may be freely selected. For example, as shown in FIG. 59, the thickness of the reflective layer 422 may be continuously changed so that the thickness may be the largest at a center portion thereof corresponding to each track 17.

In order to decrease the light reflectivity of the recording medium 401 at the areas 22, instead of removing the reflective layer 422 at the non-recording areas 22, as shown in FIG. 60, it is possible to change portions 481 of the reflective layer 422 corresponding to the areas 22 into transparent state or to increase light transmittance of the portions 481 of the reflective layer 422 corresponding to the areas 22, through oxidization method or the like. In this case, the reflective layer 422 has a low reflectivity at the non-recording areas 22. Furthermore, as shown in FIG. 61, a surface of the protective layer 36 may be formed with a plurality of fine concave and convex portions 485 at each of the non-recording areas 22, and the reflective layer 422 may be provided on the protective layer 36 such that the concave and convex portions 485 may confront the reflective layer 422. In this case, the fine convex and concave portions 485 serve to decrease the reflectivity of the reflective layer 422 at the non-recording areas 22.

As shown in FIG. 62, a light absorbing layer 488 may be provided on the reflective layer 422. The light absorbing layer 488 is made of pigments for absorbing light of a predetermined wavelength.

As shown in FIG. 63, a recording layer 496 having a high light transmittance made of organic pigment may be provided on a substrate 495 having a smooth surface, and a plurality of strip-shaped reflective layers 497 may be formed on the recording layer 496. In this case, the reflective layers 497 may be patterned into the sample patterns of the present invention.

To summarize, according to the present modification, the reflective layer 422 which is provided on the recording layer 434 has a portion with its reflectivity having a small value. More specifically, the reflective layer 422 has a reflectivity of a small value at a strip-shaped area 22 which is positioned between each two adjacent tracks 17 and which has a predetermined width W and extends along the track extending direction. The strip-shaped area 22 in which the reflectivity has a small value may be produced, by removing the reflective layer 422 at the strip-shaped area 22 from the optical recording medium or by decreasing the thickness of the reflective layer 422 at the strip-shaped area 22.

The width W of the strip-shaped area 22 is set to be smaller than a diameter d of the laser beam spot 40 formed on a surface of the recording layer 434, the laser beam being utilized for data recording and data reproducing operations. More specifically, the total value (P+W) of the width W of the low reflectivity portion 22 and the track pitch P is selected to be approximately equal or larger than the spot diameter d. The recording layer 434 applied in the present modification has a high light transmittance or is very thin so that light may transmit therethrough.

(12) FIGS. 64 and 65 show another modification of the optical recording medium 510 to which the pit arrangement of the present invention is applied. FIG. 64 is a cross-sectional view of the optical recording medium 510 at its servo area 12. As shown in FIG. 64, each wobbling pit 14 is made of a metal film 86 and each non-recording area 22 is made of a strip-shaped metal film 84, similarly as in FIGS. 35 through 38. In the present modification, the non-recording area 22 formed of the metal film 84 is formed not only in the data area 13 but also in the servo area 12 so that the non-recording area 22 is continuously formed from the data area 13 to the servo area 12. In the present modification, as shown in FIG. 64, the metal films 84 serving as the pits 14, the protective layer 88, the strip-shaped metal films 84, the recording layer 34, and the protective layer 36 are provided in this order on the transparent substrate 30. In the recording medium 510 shown in FIG. 64, the protective layer 88 has a flattened upper surface. However, the cross-sectional shape of the protective layer 88 may be selected as shown in FIG. 65 in which the protective layer 88 has an uniform thickness and therefore the protective layer 88 is corrugated in accordance with the metal films 86. In this case, another protective layer 570 is provided between the substrate 30 and the metal films 86 and the protective layer 88.

(13) FIGS. 66 and 67 show a further modification of the optical recording medium 610 to which applied is the pit arrangement of the present invention. As shown in FIGS. 66 and 67, a protective layer 631, the recording layer 34 and a protective layer 36 are provided on a substrate 30. In the data area 13, the recording layer 34 includes a plurality of recording areas 20 and non-recording areas 22. The recording area 20 is formed to extend along each track 17, and the non-recording area 22 is formed between each two adjacent recording areas 20. In the present modification, the non-recording areas 22 are formed in the recording layer 34, in the following manner.

The non-recording areas 22 are formed in the recording layer 34 through heat treatment. More specifically to say, laser beam or the like is irradiated onto the recording layer 34 at the portions 22 positioned between each two adjacent tracks 17, so that the recording layer at the portions 22 is heated. A rare-earth element such as Tb which is the material for the recording layer 34 is partly oxidized in the portions 22 of the recording layer. As a result, there is occurred a magnetization which extends horizontally, i.e., parallel with upper and lower surfaces of the recording layer 34. In the portions 22 of the recording layer 34 where the magnetization extending parallel to the surfaces of the recording layer is occurred, a magnetic domain magnetized perpendicularly to the recording layer surface may not be formed. Accordingly, data may not be recorded in the portions 22 of the recording layer 34, and therefore the portions 22 serve as the non-recording areas 22. Thus, data may be recorded in the recording layer 34, only at the portion 20 positioned between each two adjacent non-recording areas 22, and therefore the portions 20 serve as the recording areas 20. Since optical characteristics such as reflectivity of the recording layer 34 are hardly changed through the heat treatment, the reflectivity of the non-recording areas 22 is substantially the same as those of the recording areas 20. Accordingly, it is possible to prevent noise from occurring which will occur due to difference of the reflectivities of the recording areas 20 and the non-recording areas 22.

(14) FIGS. 68 and 69 show a further modification of the optical recording medium 710 to which applied is the pit arrangement of the present invention. As shown in FIGS. 68 and 69, the optical recording medium 710 includes the transparent substrate 30, the protective layer 631, the recording layer 34 and the protective layer 36.

In the data area 13, there is formed a groove 722 between each two adjacent tracks 17. A portion defined between each two adjacent grooves 722 serves as the recording area 20. The depth of the groove 722 is almost equal to that of the wobbling pit 14 and the discrimination pit 16. Side walls for defining the groove 722 extend substantially perpendicularly to an upper surface of the substrate 730.

As shown in FIG. 69, the thickness of the recording layer 34 is small at the portions 769 which extend along the side walls of the groove 722. Therefore, heat conductivity of the portions 769 is very low. When the laser beam 40 is irradiated for data recording operation on the recording area 20 positioned between the two adjacent grooves 722, the recording layer 34 is heated at the recording area 20. In this case, heat thus generated in the recording area 20 of the recording layer 34 is not transmitted through the portions 769 to other recording areas 20' of the recording layer 34 which are positioned at the neighboring tracks 17'. Accordingly, bit expansion toward the neighboring tracks does not occur.

While the present invention has been described in detail and with reference to specific embodiments thereof, it will be apparent to one skilled in the art that various changes and modifications can be made therein without departing from the spirit and scope thereof.

I claim:

1. An optical recording medium for recording data therein, in which a plurality of tracks each extending in a first direction are arranged in a second direction which is different from the first direction so that the plurality of tracks are apart from one another along the second direction with a track-track between area being formed between each pair of adjacent tracks, the optical recording medium comprising:
   at least one wobbling pit formed in each of the track-track between area positioned between each pair of adjacent tracks, each wobbling pit of said at least one wobbling pit adapted for tracking operations for both tracks of the pair of adjacent tracks; and
   means formed in said optical recording medium for discriminating between a first track of each pair of adjacent tracks and a second track of each pair of adjacent tracks, said means comprising each wobbling pit of said at least one wobbling pit arranged such that a total number of said wobbling pits formed on a first pair of track-track between areas sandwiching the first track is different from a total number of said wobbling pits formed on a second pair of track-track between areas sandwiching the second track, said wobbling pits formed on the first pair of track-track between areas that sandwich the first track providing information on a tracking error amount in the second direction with respect to the first track and said wobbling pits formed on the second pair of track-track between areas that sandwich the second track providing information on a tracking error amount in the second direction with respect to the second track.

2. The optical recording medium as claimed in claim 1, wherein a number of wobbling pits of said at least one wobbling pit formed on each track-track between area is changed every second track-track between area.

3. An optical recording medium as claimed in claim 1, wherein said means for discriminating between the first track and the second track of each pair of adjacent tracks includes each wobbling pit of said at least one wobbling pit arranged such that a positional relationship in the first direction between a wobbling pit formed on one track-track between area and a wobbling pit formed on another track-track between area which are arranged adjacent to each other with the first track of the each pair of adjacent tracks sandwiched therebetween is different from a positional relationship in the first direction between a wobbling pit formed on one track-track between area and a wobbling pit formed on another track-track between area which are arranged adjacent to each other with the second track of the each pair of adjacent tracks sandwiched therebetween.

4. An optical recording medium as claimed in claim 3, wherein each wobbling pit of said at least one wobbling pit are arranged so that a positional relationship in the first direction between a wobbling pit formed on a first track-track between area and a wobbling pit formed on a second track-track between area which is adjacent to the first track-track between area with a first track sandwiched therebetween is different from a positional relationship in the first direction between the wobbling pit formed on the first track-track between area and a wobbling pit formed on a third track-track between area which is adjacent to the first track-track between area with a second track sandwiched therebetween.

5. An optical recording medium as claimed in claim 1, wherein said means for discriminating between the first track and the second track of each pair of adjacent tracks includes each wobbling pit of said at least one wobbling pit arranged such that a dimensional relationship in the first direction between a wobbling pit formed on one track-track between area and a wobbling pit formed on another track-track between area which are arranged adjacent to each other with the first track of the each pair of adjacent tracks sandwiched therebetween is different from a dimensional relationship in the first direction between a wobbling pit formed on one track-track between area and a wobbling pit formed on another track-track between area which are arranged adjacent to each other with the second track of the each pair of adjacent tracks sandwiched therebetween.

6. An optical recording medium as claimed in claim 5, wherein each wobbling pit of said at least one wobbling pit are arranged so that a dimensional relationship in the first direction between a wobbling pit formed on a first track-track between area and a wobbling pit formed on a second track-track between area which is adjacent to the first track-track between area with a first track sandwiched therebetween is different from a dimensional relationship in the first direction between the wobbling pit formed on the first track-track between area and a wobbling pit formed on a third track-track between area which is adjacent to the first track-track between area with a second track sandwiched therebetween.

7. The optical recording medium as claimed in claim 1, further comprising a substrate and a recording layer formed on the substrate for recording data therein, and wherein each wobbling pit of said at least one wobbling pit includes a concave portion formed on said substrate.

8. The optical recording medium as claimed in claim 7, wherein each wobbling pit of said at least one wobbling pit includes a light reflecting material formed on said substrate.

9. The optical recording medium as claimed in claim 7, further comprising a metal film formed between said substrate and said recording layer at least in a part of each track-track between area for preventing data from being recorded in said recording layer at the part of each track-track between area.

10. The optical recording medium as claimed in claim 7, further comprising a layer of material with a high heat capacity formed on said recording layer at least in a part of each track-track between area for preventing data from being recorded in said recording layer at the part of each track-track between area.

11. The optical recording medium as claimed in claim 7, wherein said recording layer can transmit light therethrough, and further comprising a reflective layer provided on said recording layer for reflecting light which has transmitted through said recording layer, said reflective layer has a low reflectivity at least in a part of each track-track between area for preventing data from being reproduced from said recording layer at the part of each track-track between area.

12. The optical recording medium as claimed in claim 7, wherein said recording layer has a heat-treated non-recording area at least in a part of each track-track between area for preventing data from being recorded in said recording layer at the part of each track-track between area.

13. The optical recording medium as claimed in claim 7, wherein said substrate is formed with a groove in each track-track between area, the groove extending in the first direction.

14. The optical recording medium of claim 1, wherein said at least one wobbling pit is formed in the track-track between area positioned between a pair of adjacent tracks, said at least one wobbling pit is positioned equidistant from each track of the pair of adjacent tracks associated with the track-track between area in the second direction.

15. The optical recording medium of claim 2, wherein the number of wobbling pits formed on a track-track between area is alternated every second track-track between area between a first number of wobbling pits and a second number of wobbling pits.

16. The optical recording medium of claim 15, wherein the first number is an odd number and the second number is an even number.

17. The optical recording medium of claim 1, wherein a position of said at least one wobbling pit is changed with respect to the first direction every track-track between area.

18. The optical recording medium of claim 1, wherein each of said at least one wobbling pit comprises a plurality of wobbling pit portions which are located at the same position with respect to the first direction.

19. The optical recording medium of claim 18, wherein said plurality of wobbling pit portions are separated from one another in the second direction.

20. The optical recording medium of claim 18, wherein said plurality of wobbling pit portions partly overlap with one another in the second direction.

21. An optical recording medium for recording data therein, comprising:
a plurality of tracks, each extending in a first direction, arranged in a second direction different from the first direction;
a plurality of track-track between areas arranged in the second direction such that two adjacent tracks of said plurality of tracks are separated in the second direction by one of the plurality of track-track between areas; and
a plurality of wobbling pits being formed in the plurality of track-track between areas such that at least one wobbling pit is formed on each track-track between area, each of said plurality of wobbling pits positioned equidistant from each track of the pair of adjacent tracks associated with the track-track between area in the second direction, and each of said plurality of wobbling pits used for tracking operations for each track of the pair of adjacent tracks associated with the track-track between area, a total number of wobbling pits formed on each pair of adjacent track-track between areas alternated every track between a first state and a second state different from the first state,
wherein said at least one wobbling pit formed on a first track-track between area between a first track of said pair of adjacent tracks and a second track of said pair of adjacent tracks is used for the tracking operations such that said at least one wobbling pit formed on the first track-track between area and said at least one wobbling pit formed on a second track-track between area, which is positioned adjacent to the first track-track between area with the first track being sandwiched therebetween, provides information on a tracking error amount with respect to the first track, a total number of said wobbling pits formed on the first and the second track-track between areas providing information on a tracking error direction with respect to the first track, and wherein said at least one wobbling pit formed on the first track-track between area and said at least one wobbling pit formed on a third track-track between area, which is positioned adjacent to the first track-track between area with the second track sandwiched therebetween, provides information on a tracking error amount with respect to the second track, a total number of said wobbling pits formed on the first and the third track-track between areas providing information on a tracking error direction with respect to the second track.

22. The optical recording medium of claim 21, wherein said plurality of wobbling pits are arranged such that a position with respect to the first direction of said at least one wobbling pit in each track-track between area is alternated every track-track between area between a first position and a second position that is different relative to the first position by a distance in the first direction; and
wherein one of said at least one wobbling pit located at the first position in the first track-track between area and one of said at least one wobbling pit located at the second position in the second track-track between area provide information on a tracking error amount with respect to the first track.

23. The optical recording medium of claim 1, wherein the total number of said wobbling pits formed on said pair of adjacent track-track between areas located to sandwich one track therebetween is alternated every track between an even number and an odd number.

24. The optical recording medium of claim 21, wherein the number of said at least one wobbling pit formed on a track-track between area is alternated every second track-track between area between a first number and a second number different from the first number.

25. The optical recording medium of claim 24, wherein the number of said at least one wobbling pit formed on a track-track between area is alternated every second track-track between area between an even number and an odd number.

26. The optical recording medium of claim 21, wherein each of said at least one wobbling pit formed in the track-track between area includes a plurality of wobbling pit portions located at the same position with respect to the first direction.

27. The optical recording medium of claim 26, wherein said plurality of wobbling pit portions located at the same position with respect to the first direction are separated from one another in the second direction.

28. The optical recording medium of claim 26, wherein said plurality of wobbling pit portions located at the same position with respect to the first direction are partly overlapped with one another in the second direction.

29. A tracking servo circuit for generating a tracking error signal representing a tracking error state with respect to a track formed on an optical recording medium, the optical recording medium having a plurality of tracks, each extending in a first direction, arranged in a second direction which is different from the first direction so that the plurality of tracks are separated along the second direction with a track-track between area to form a pair of adjacent tracks, and having at least one wobbling pit formed in each track-track between area, and each wobbling pit of the at least one wobbling pit used for tracking operations for each track of the pair of adjacent tracks, each wobbling pit of the at least one wobbling pit arranged such that a total number of wobbling pits surrounding a first track of each pair of adjacent tracks is different from a total number of wobbling pits surrounding a second track of each pair of adjacent tracks, said tracking servo circuit comprising:

- wobbling pit detecting means for detecting wobbling pits formed on two adjacent track-track between areas sandwiching one of the plurality of tracks and for generating a first signal representing a number and an intensity of wobbling pits formed on a first of the two adjacent track-track between areas and a second signal representing a number and an intensity of wobbling pits formed on a second of the two adjacent track-track between areas;
- calculating means for calculating a difference signal representing a difference between the intensities of the wobbling pits in the first signal and the second signal, the difference indicating a tracking error amount with respect to said one track;
- number detecting means for detecting the total number of wobbling pits surrounding said one track based on the number of wobbling pits detected in the first signal and the second signal to provide information on a tracking error direction with respect to said one track; and
- polarity changing means for changing a polarity of a value of the difference signal, based on the total number detected by the number detecting means, and for generating the tracking error signal representing a tracking error state with respect to the one track based on the tracking error amount and the tracking error direction.

30. The tracking servo circuit as claimed in claim 29, wherein the number of the wobbling pits formed on each track-track between area is changed every second track-track between area of the optical recording medium.

31. The tracking servo circuit of claim 30, wherein the number of wobbling pits formed on each track-track between area is alternated every second track-track between area between an even number and an odd number, and wherein the polarity changing means further comprises judging means for determining whether the total number of wobbling pits in the first and second signals is an even number, and said polarity changing means changes the polarity of the value of the difference signal based on the determination of the judging means.

32. The tracking servo circuit of claim 30, wherein the number of said at least one wobbling pit formed on each track-track between area is alternated every second track-track between area between a first number and a second number different from the first number, and wherein the polarity changing means further comprises judging means for determining whether the total number of wobbling pits in the first and second signals is equal to a third number which is a sum of the first number and the second number, said polarity changing means changing the polarity of the value of the difference signal based on the determination of the judging means.

* * * * *